(12) United States Patent
Klug et al.

(10) Patent No.: US 11,971,549 B2
(45) Date of Patent: Apr. 30, 2024

(54) VERY HIGH INDEX EYEPIECE SUBSTRATE-BASED VIEWING OPTICS ASSEMBLY ARCHITECTURES

(71) Applicant: Magic Leap, Inc., Plantation, FL (US)

(72) Inventors: Michael Anthony Klug, Austin, TX (US); Kevin Richard Curtis, Boulder, CO (US); Vikramjit Singh, Pflugerville, TX (US); Kang Luo, Austin, TX (US); Michal Beau Dennison Vaughn, Round Rock, TX (US); Samarth Bhargava, Saratoga, CA (US); Shuqiang Yang, Austin, TX (US); Michael Nevin Miller, Austin, TX (US); Frank Y. Xu, Austin, TX (US); Kevin Messer, Fort Lauderdale, FL (US); Robert D. Tekolste, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 757 days.

(21) Appl. No.: 16/979,486

(22) PCT Filed: Mar. 12, 2019

(86) PCT No.: PCT/US2019/021884
§ 371 (c)(1),
(2) Date: Sep. 9, 2020

(87) PCT Pub. No.: WO2019/178120
PCT Pub. Date: Sep. 19, 2019

(65) Prior Publication Data
US 2021/0294103 A1    Sep. 23, 2021

Related U.S. Application Data
(60) Provisional application No. 62/641,976, filed on Mar. 12, 2018.

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0023* (2013.01); *G02B 6/005* (2013.01);
(Continued)

(58) Field of Classification Search
CPC ............ G02B 27/0172; G02B 27/0149; G02B 6/0065; G02B 6/0076
(Continued)

(56) References Cited

U.S. PATENT DOCUMENTS 6,023,373 A   2/2000  Inoguchi et al.
6,134,051 A   10/2000 Hayakawa et al.
(Continued)

FOREIGN PATENT DOCUMENTS

CN    104155760 A    11/2014
CN    105911700 A    8/2016
(Continued)

OTHER PUBLICATIONS

Decision to Grant a Patent in Japanese Appln. No. 2020-529490, dated Jan. 18, 2023, 5 pages (with English translation).
(Continued)

*Primary Examiner* — Jerry L Brooks
(74) *Attorney, Agent, or Firm* — Fish & Richardson P.C.

(57) ABSTRACT

Very high refractive index (n>2.2) lightguide substrates enable the production of 70° field of view eyepieces with all three color primaries in a single eyepiece layer. Disclosed herein are viewing optics assembly architectures that make
(Continued)

use of such eyepieces to reduce size and cost, simplifying manufacturing and assembly, and better-accommodating novel microdisplay designs.

22 Claims, 23 Drawing Sheets

(51) Int. Cl.
  *G02B 5/20* (2006.01)
  *G02B 25/00* (2006.01)
(52) U.S. Cl.
  CPC ......... *G02B 6/0065* (2013.01); *G02B 6/0076* (2013.01); *G02B 25/001* (2013.01); *G02B 27/0149* (2013.01); *G02B 5/201* (2013.01); *G02B 2027/012* (2013.01); *G02B 2027/0123* (2013.01); *G02B 2027/0154* (2013.01); *G02B 2027/0178* (2013.01); *G02B 2027/0185* (2013.01)
(58) Field of Classification Search
  USPC .......................................................... 359/630
  See application file for complete search history.

(56) References Cited

U.S. PATENT DOCUMENTS

| | | |
|---|---|---|
| 6,222,677 B1 | 4/2001 | Budd et al. |
| 6,633,350 B2 | 10/2003 | Sasakura et al. |
| 6,714,331 B2 | 3/2004 | Lewis et al. |
| 6,850,221 B1 | 2/2005 | Tickle |
| 7,206,107 B2 | 4/2007 | Levola |
| 8,310,764 B2 | 11/2012 | Tanijiri |
| 9,081,426 B2 | 7/2015 | Armstrong |
| 9,400,395 B2 | 7/2016 | Travers et al. |
| 9,671,615 B1 | 6/2017 | Vallius et al. |
| 10,261,318 B2 | 4/2019 | Tekolste et al. |
| 10,302,946 B2 | 5/2019 | Aiki |
| 10,564,533 B2 | 2/2020 | Trisnadi et al. |
| 10,712,570 B2 | 7/2020 | Freedman et al. |
| 11,249,309 B2 | 2/2022 | Schaefer et al. |
| 11,256,093 B2 | 2/2022 | Curtis et al. |
| 2002/0024708 A1 | 2/2002 | Lewis et al. |
| 2002/0167733 A1 | 11/2002 | Roest |
| 2002/0191297 A1 | 12/2002 | Gleckman et al. |
| 2007/0159673 A1 | 7/2007 | Freeman et al. |
| 2007/0177275 A1 | 8/2007 | McGuire, Jr. |
| 2008/0232133 A1 | 9/2008 | Segawa |
| 2010/0079865 A1 | 4/2010 | Saarikko et al. |
| 2010/0128155 A1 | 5/2010 | Ahn et al. |
| 2010/0201953 A1 | 8/2010 | Freeman et al. |
| 2011/0134017 A1 | 6/2011 | Burke |
| 2012/0127062 A1 | 5/2012 | Bar-Zeev et al. |
| 2013/0082922 A1 | 4/2013 | Miller |
| 2013/0117377 A1 | 5/2013 | Miller |
| 2013/0125027 A1 | 5/2013 | Abovitz |
| 2013/0222384 A1 | 8/2013 | Futterer |
| 2013/0250207 A1 | 9/2013 | Bohn |
| 2014/0071539 A1 | 3/2014 | Gao |
| 2014/0140653 A1 | 5/2014 | Brown et al. |
| 2014/0160543 A1 | 6/2014 | Putilin et al. |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2015/0002528 A1 | 1/2015 | Bohn et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0248015 A1 | 9/2015 | Schwedt et al. |
| 2015/0293358 A1 | 10/2015 | De Matos Pereira Vieira et al. |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0018639 A1 | 1/2016 | Spitzer et al. |
| 2016/0026253 A1 | 1/2016 | Bradski et al. |
| 2016/0077338 A1 | 3/2016 | Robbins et al. |
| 2016/0154243 A1 | 6/2016 | Aiki |
| 2017/0131460 A1 | 5/2017 | Lin et al. |
| 2017/0242264 A1 | 8/2017 | Sissom |
| 2017/0248750 A1 | 8/2017 | Curtis et al. |
| 2017/0248790 A1 | 8/2017 | Cheng |
| 2017/0293145 A1 | 10/2017 | Miller et al. |
| 2017/0322418 A1* | 11/2017 | Lin ...................... H04N 13/344 |
| 2017/0339398 A1 | 11/2017 | Woodgate et al. |
| 2018/0059297 A1 | 3/2018 | Peroz et al. |
| 2018/0120559 A1 | 5/2018 | Yeoh et al. |

FOREIGN PATENT DOCUMENTS

| | | |
|---|---|---|
| CN | 107544117 A | 1/2018 |
| CN | 107561698 A | 1/2018 |
| DE | 102016225016 A1 | 12/2017 |
| JP | 102207214 A | 8/1990 |
| JP | H03175390 A | 7/1991 |
| JP | H11337863 A | 12/1999 |
| JP | 2001264682 A | 9/2001 |
| JP | 2003337298 A | 11/2003 |
| JP | 2005148468 A | 6/2005 |
| JP | 4078985 A | 4/2008 |
| JP | 2015194654 A | 11/2015 |
| JP | 2016020831 A | 2/2016 |
| JP | 2016519327 A | 6/2016 |
| JP | 2017531840 A | 10/2017 |
| WO | 2014209431 A1 | 12/2014 |
| WO | 2015170505 A1 | 11/2015 |
| WO | 2016179246 A1 | 11/2016 |
| WO | WO 2017/120334 | 7/2017 |
| WO | 2017134412 A1 | 8/2017 |
| WO | 2017147534 A1 | 8/2017 |
| WO | WO 2019/178120 | 9/2019 |

OTHER PUBLICATIONS

Extended European Search Report in European Appln. No. 18889627.8, dated Jul. 2, 2021, 8 pages.
Extended European Search Report in European Appln. No. 19746976.0, dated Feb. 19, 2021, 6 pages.
Extended European Search Report in European Appln. No. 19768535.7, dated Nov. 12, 2021, 13 pages.
First Search in Chinese Appln. No. 201980010805.5, dated Mar. 27, 2021, 1 page.
Office Action in Chinese Appln. No. 202110733353.2, dated Nov. 3, 2022, 13 pages (with English translation).
Office Action in Indian Appln. No. 202047024935, dated Apr. 29, 2022, 8 pages.
Office Action in Indian Appln. No. 202047027052, dated Mar. 31, 2022, 6 pages.
Office Action in Israeli Appln. No. 276099, dated Dec. 5, 2022, 3 pages.
Office Action in Japanese Appln. No. 2020-529490, dated Oct. 17, 2022, 10 pages (with English translation).
Office Action in Japanese Appln. No. 2020-539090, dated Dec. 27, 2022, 5 pages (with English translation).
Office Action in Japanese Appln. No. 2020-547343, dated Feb. 3, 2023, 9 pages (with English translation).
Notice of Allowance in Japanese Appln. No. 2020-547343, dated Jun. 2, 2023, 5 pages (with English translation).
International Search Report and Written Opinion for PCT Application No. PCT/US2019/021884, dated Jul. 3, 2019.
Office Action in Israeli Appln. No. 274907, dated May 30, 2023, 9 pages.
Office Action in European Appln. No. 19766933.6, dated Oct. 27, 2023, 11 pages.

* cited by examiner

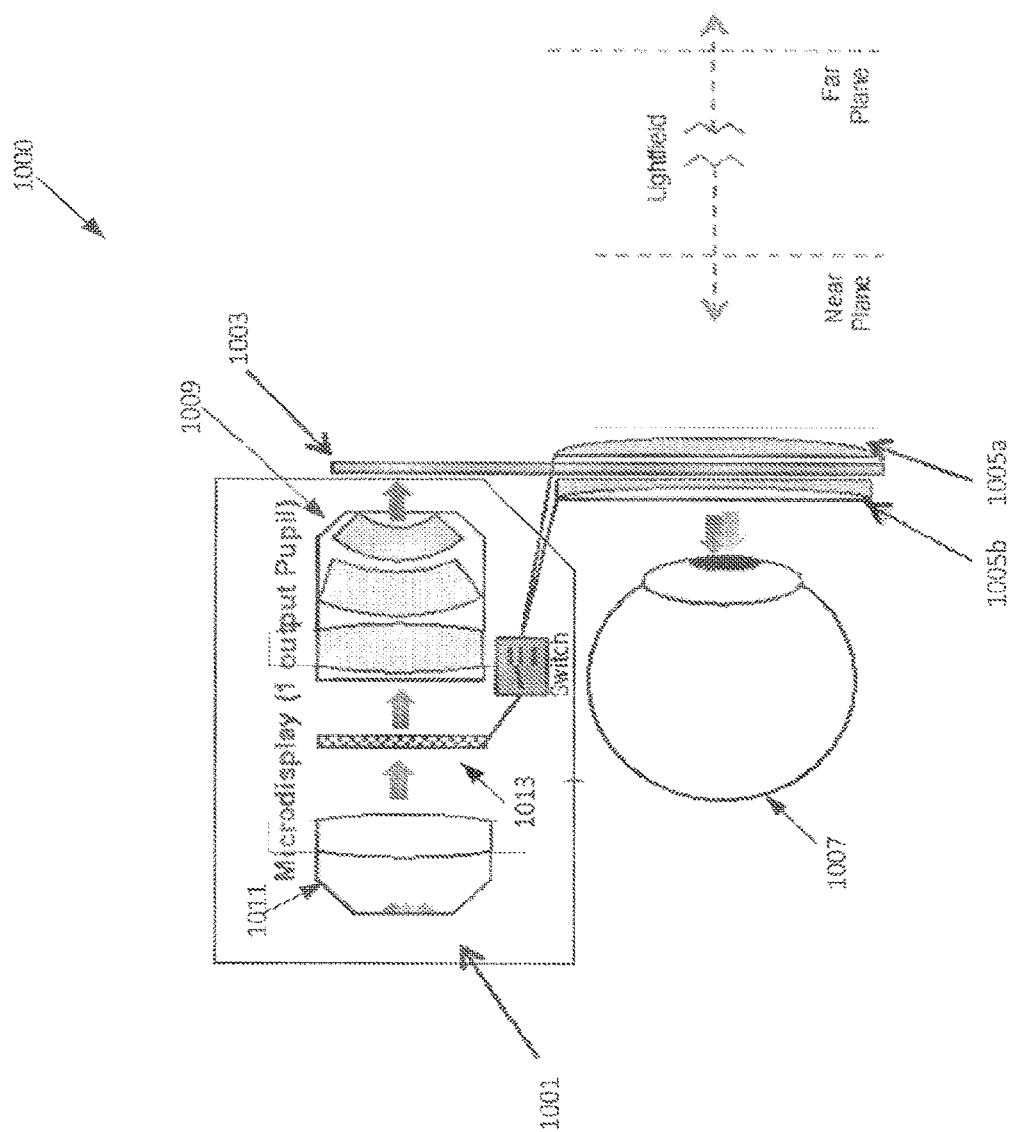

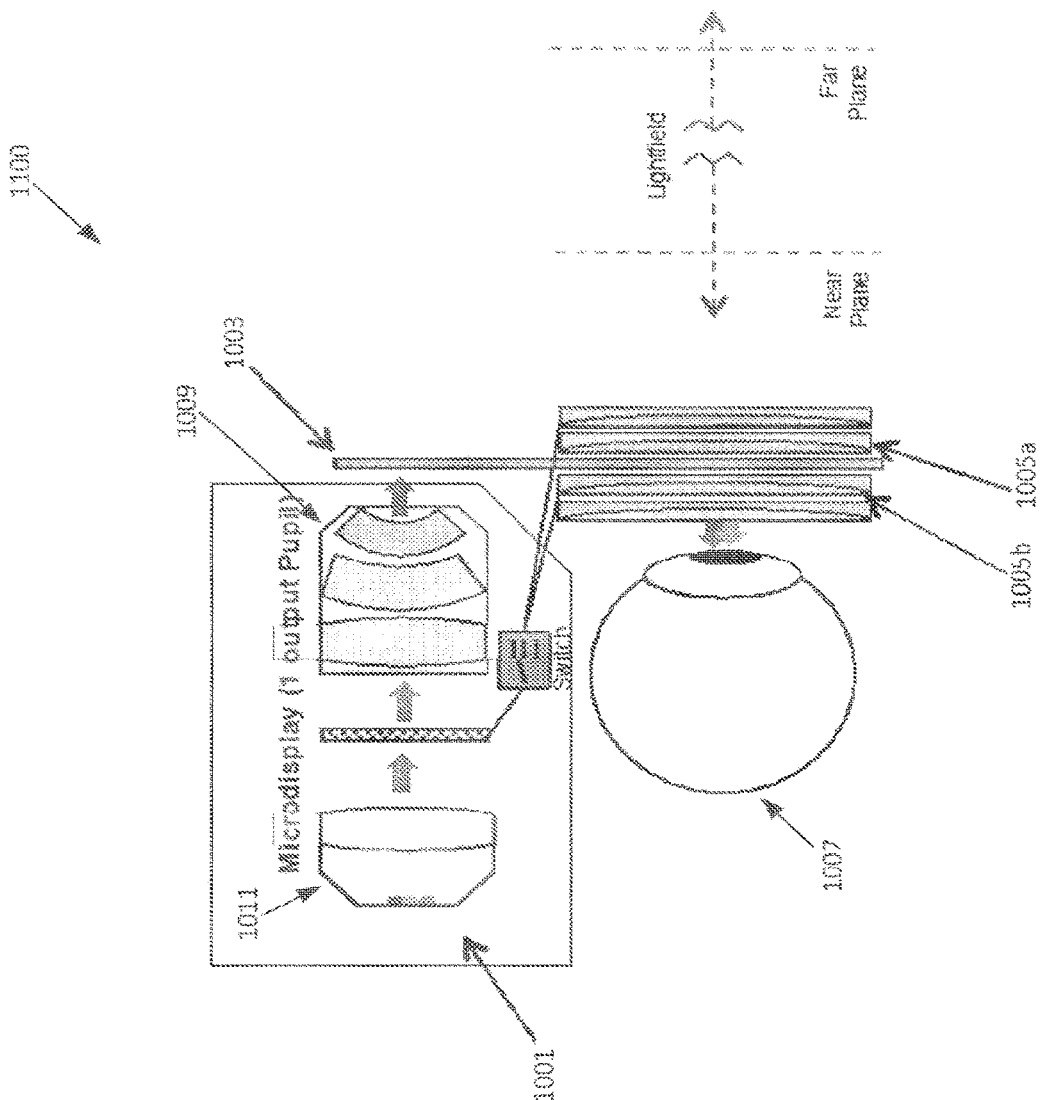

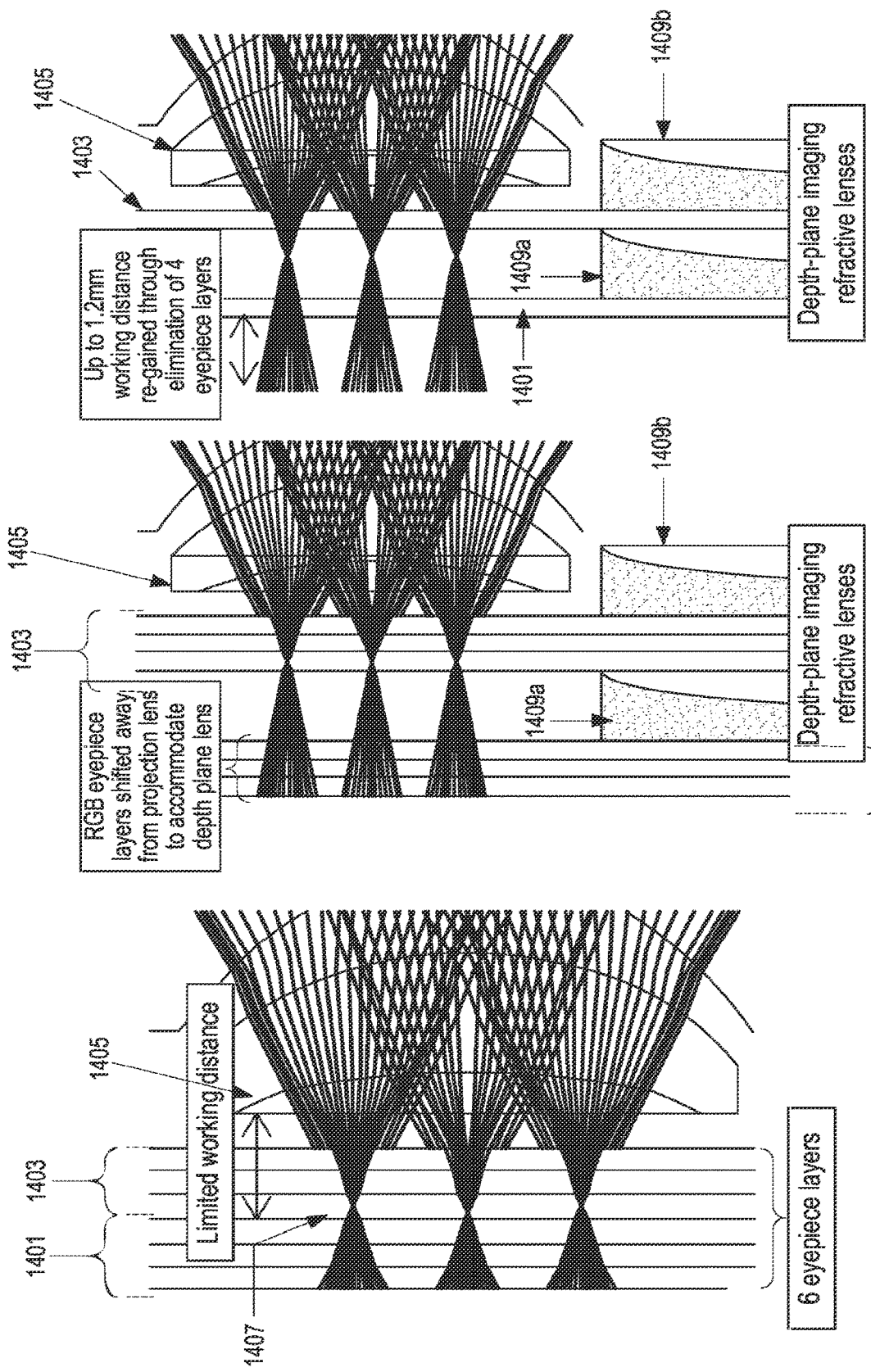

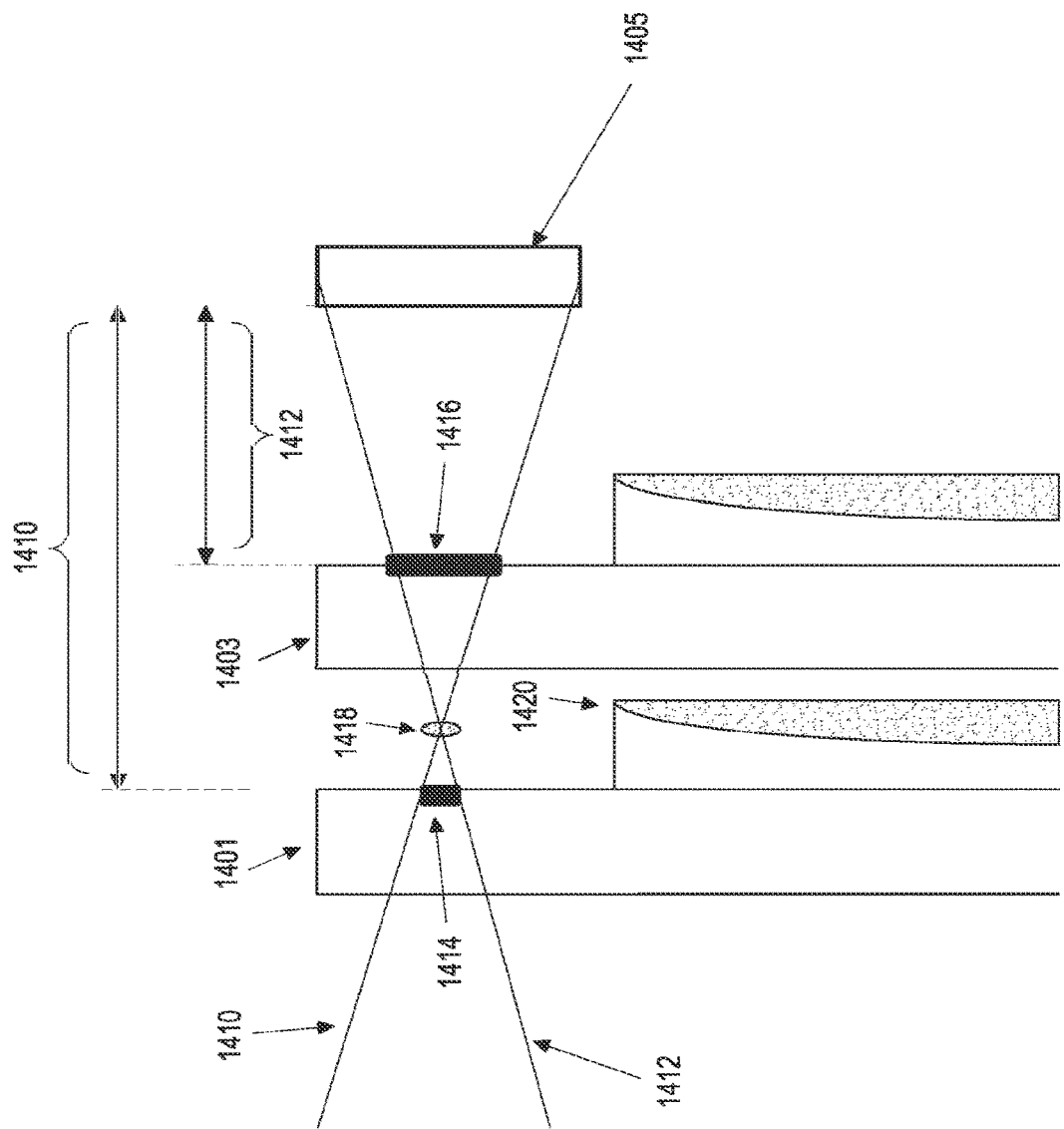

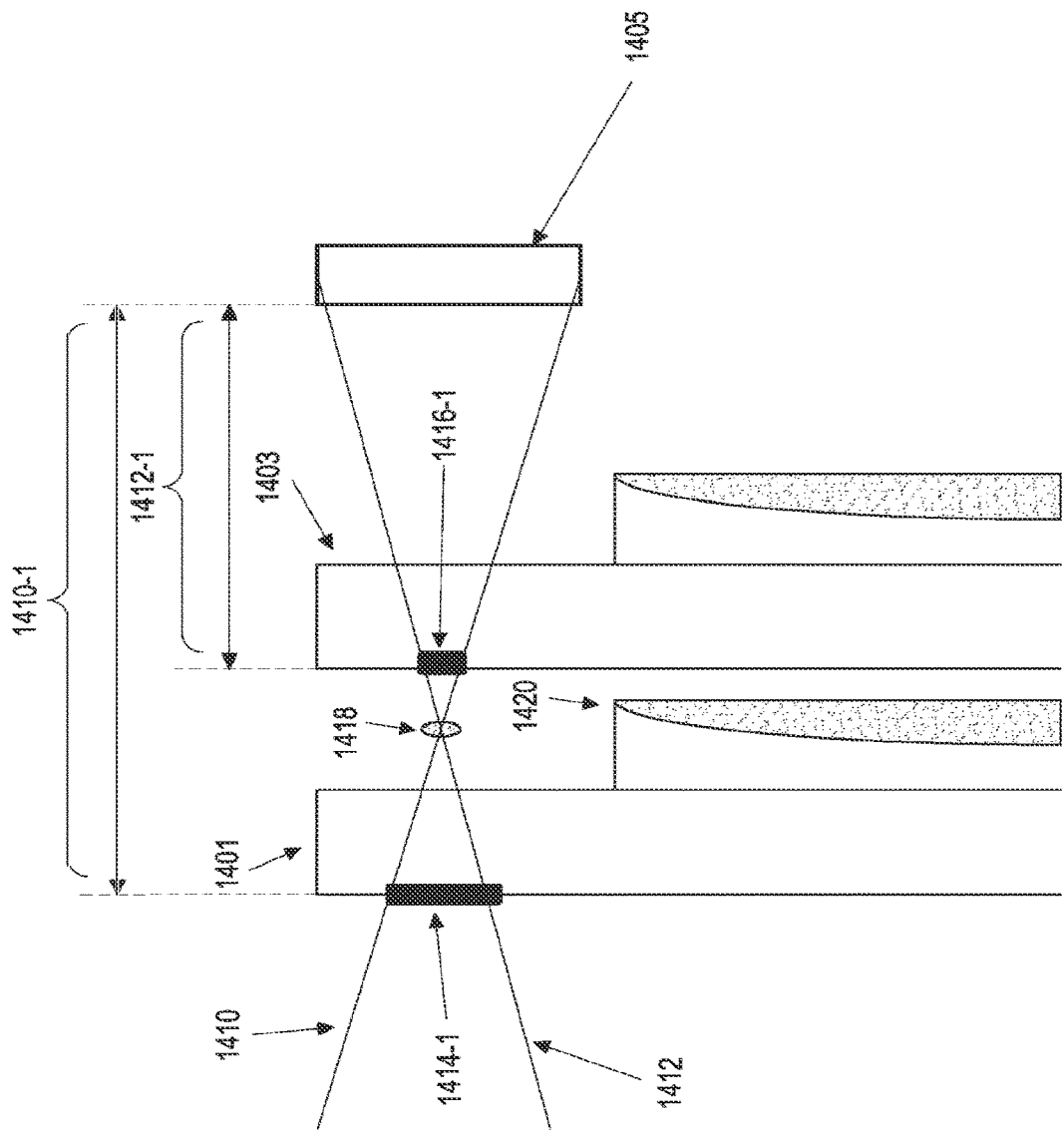

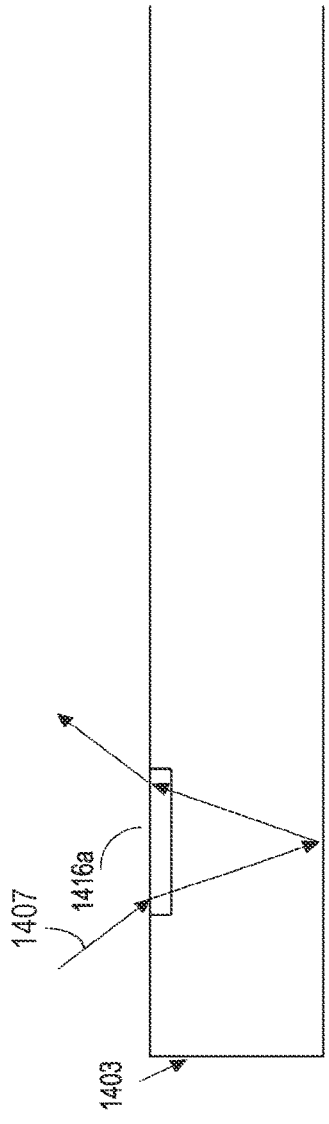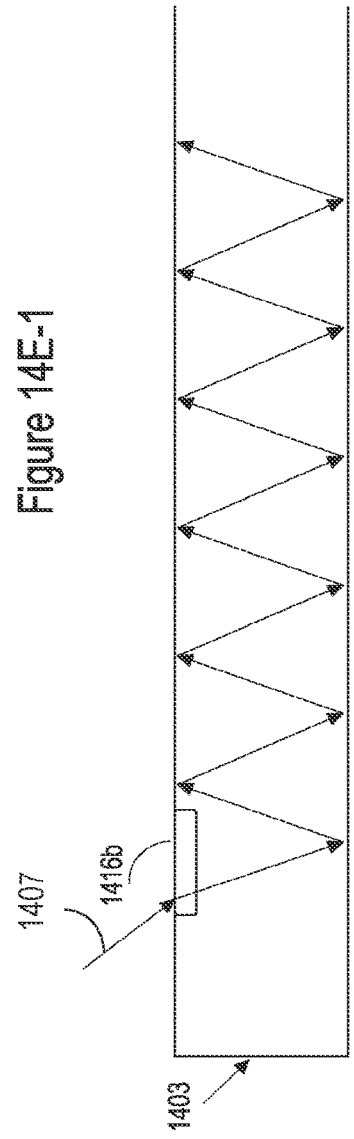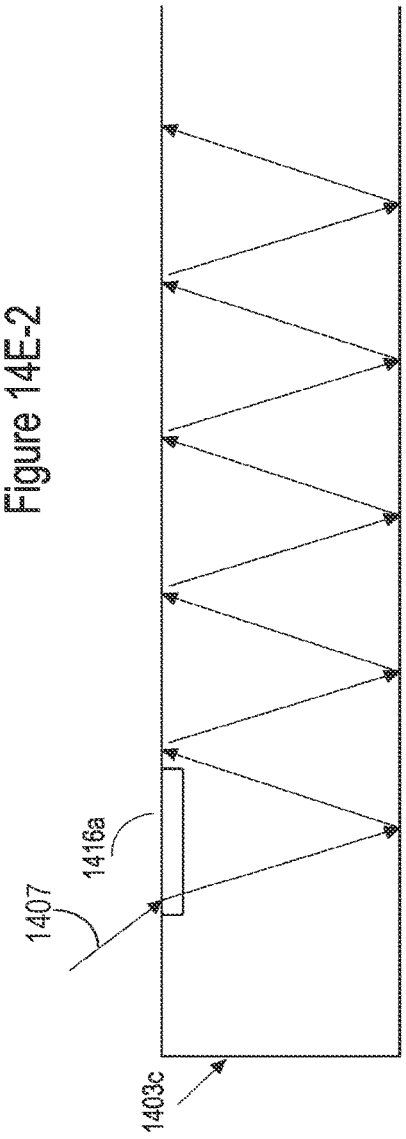

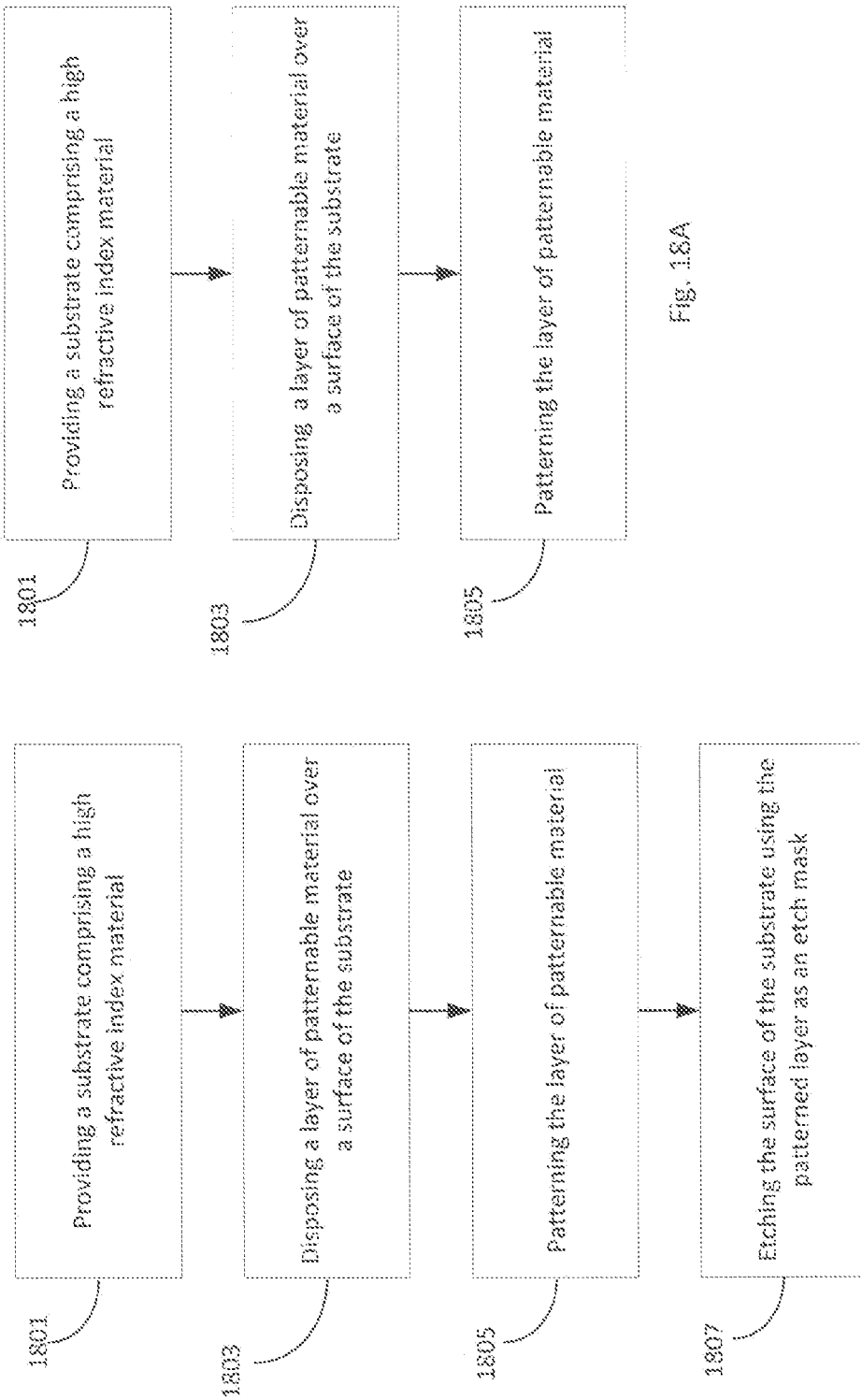

VERY HIGH INDEX EYEPIECE SUBSTRATE-BASED VIEWING OPTICS ASSEMBLY ARCHITECTURES

PRIORITY CLAIM

This application is a US national phase of International Patent Application No. PCT/US2019/021884 filed on Mar. 12, 2019, which claims the priority benefit of U.S. Provisional Patent Application No. 62/641,976 filed on Mar. 12, 2018, each of which is incorporated by reference herein in its entirety.

INCORPORATION BY REFERENCE

This application incorporates by reference the entirety of each of the following patent applications: U.S. Application Publication No. 2018/0284585, published Oct. 4, 2018, titled "LOW-PROFILE BEAM SPLITTER" and U.S. Pat. Application No. 62/474,543, filed on Mar. 21, 2017 and U.S. Pat. Application No. 62/570,995, filed on Oct. 11, 2017; U.S. Application Publication No. 2018/0356639, published Dec. 13, 2018, titled "AUGMENTED REALITY DISPLAY HAVING MULTI-ELEMENT ADAPTIVE LENS FOR CHANGING DEPTH PLANES" and U.S. Pat. Application No. 62/518,539, filed on Jun. 12, 2017 and U.S. Pat. Application No. 62/536,872, filed on Jul. 25, 2017; U.S. patent application Ser. No. 15/796,669, filed on Oct. 27, 2017, published as U.S. Application Publication No. 2018/0120559 on May 2, 2018; U.S. patent application Ser. No. 16/215,477, filed Dec. 10, 2018 and published as U.S. Application Publication No. 2019/0179149 on Jun. 13, 2019, titled "WAVEGUIDE ILLUMINATOR" and U.S. Pat. Application No. 62/597,359 filed on Dec. 11, 2017; U.S. Pat. Application No. 62/624,109, filed on Jan. 30, 2018, published as U.S. Application Publication No. 2019/0179149 on Jun. 13, 2019; and U.S. patent application Ser. No. 16/262,659, published as U.S. Application Publication No. 2019/0235252 on Aug. 1, 2019, and U.S. Pat. Application No. 62/624,762, filed on Jan. 31, 2018. The contents of each of the above-identified application is hereby incorporated by reference.

BACKGROUND

Field

This application is related to viewing optics assemblies, and more specifically to viewing optics assembly architectures configured to utilize very high refractive index lightguide substrates. The viewing optics assemblies can be used in optical systems, including augmented reality imaging and visualization systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

A head mounted display system may be configured to project light to an eye of a user to display augmented reality image content in a vision field of the user. The head-mounted display system may include a frame that is configured to be supported on a head of the user. The head-mounted display system may also include an eyepiece disposed on the frame. At least a portion of the eyepiece may be transparent and/or disposed at a location in front of the user's eye when the user wears the head-mounted display such that the transparent portion transmits light from the environment in front of the user to the user's eye to provide a view of that environment in front of the user. The eyepiece may include one or more waveguides disposed to direct light into the user's eye to form augmented reality image content.

Various embodiments of the head mounted display system comprise at least one projector having one or more pupils that output light (e.g., image light) having a plurality of colors or ranges of wavelengths (e.g., two or three colors or ranges of wavelengths) to produce different color images or image components such as red image components, green image components and blue image components. Such images components can be combined to provide virtually full color imagery. These color components can be directed into the eye of the user to display augmented reality or virtual image content. In some implementations, the eyepiece in the head mounted display system comprising a waveguide assembly comprising a plurality of waveguides stacked over each other.

In various implementations of display devices contemplated in this application include one or more waveguides comprising materials with refractive index greater than refractive index of glass. For example, one or more waveguides in various embodiments of display devices contemplated in this application can comprise Lithium Niobate (LiNbO$_3$) or silicon carbide (SiC). In various embodiments, one or more waveguides in various embodiments of display devices contemplated in this application can comprise materials that are transparent to visible light and have a refractive index greater than refractive index of glass (e.g., refractive index greater than or equal to about 1.79). One or more waveguides comprising materials with relatively high refractive index (e.g., refractive index greater than refractive index of glass and/or refractive index greater than or equal to about 1.79) can advantageously enlarge the field of view of the image content from the projector(s) that is output to the user's eye by the one or more waveguides as compared to waveguides comprising glass and/or materials with refractive index less than about 1.79. Advantageously, in various implementations of display devices, multiple colors or wavelengths of light (e.g., red, green and/or blue wavelengths of light) can be concurrently in-coupled into and guided within a single waveguide comprising materials with relatively high refractive index (e.g., refractive index greater than refractive index of glass and/or refractive index greater than or equal to about 1.79) and be and out-coupled therefrom with similar angular output for each color or wavelength into the user's eye. Accordingly, as opposed to using three waveguides, for example, one for each of three colors (e.g., red, green, and blue), a single waveguide may be employed to propagate three color components of images from the projector(s). Such reduction in the number of waveguides may potentially have one or more advantage such as for example reducing weight, overall eyepiece thickness, complexity, form factor and/or increase optical transmission and/or image quality.

In some implementations, instead of three colors, two colors components of the image content from the projector(s) can be in-coupled into and guided within a single waveguide and out-coupled to the user's eye. In some such designs, two waveguides may be used to accommodate three colors. For example, a first waveguide can receive and guide therein two colors (e.g., red and green, red and blue, or green and blue), and the second waveguide can receive, guide and output to the user the third color (e.g., blue, green, and red, respectively). In some implementations, a first waveguide can receive and guide therein two colors (e.g., red and green, red and blue, green and blue), and the second waveguide can receive, guide and output to the viewer a single third color or color components (e.g., blue, green, and red, respectively). In other implementations, a first waveguide can receive and guide therein two colors (e.g., red and green), and the second waveguide can receive, guide and out-couple to the viewer two color or color components wherein one of the color components is different than the image color components (e.g., green and blue) guided in the first waveguide. Using two waveguides, instead of three (e.g., per depth or depth plane), still may reduce thickness, complexity and potentially provide one or more of the advantages discussed herein.

Likewise, different waveguides in the plurality of waveguides may include an in-coupling optical element configured to in-couple light of one of the colors or plurality of ranges of wavelengths from the light outputted from the pupil of the projector(s). In some implementations, for example, a single in-coupling optical element in a waveguide is used to couple three colors or color components into the waveguide to be guided therein. In some implementations, a single in-coupling optical element in a waveguide is used to couple two colors or color components into the waveguide to be guided therein. In other implementations, different in-coupling optical elements are used to couple respective different colors or color components into a single waveguide to be guided therein. For example, three in-coupling optical elements may be used to couple three respective colors or color components into single waveguide. Similarly, two in-coupling optical elements may be used to couple two respective colors or color components into single waveguide.

Accordingly, in one or more implementations, two or more colors (e.g., two or three colors) can be coupled into a single waveguide comprising materials with relatively high refractive index (e.g., refractive index greater than refractive index of glass and/or refractive index greater than or equal to about 1.79) using one or more in-coupling optical elements such that the incoupled two or more colors can propagate within the single waveguide comprising materials with relatively high refractive index (e.g., refractive index greater than refractive index of glass and/or refractive index greater than or equal to about 1.79) via total-internal reflection and be out-coupled to the viewer for to present virtual image content. In some implementations, a single in-coupling optical element can be configured to receive light of two or more colors containing image information from an imaging system (e.g., a projection device) and in-couple the received light of two or more colors containing image information into a single waveguide comprising materials with relatively high refractive index (e.g., refractive index greater than refractive index of glass and/or refractive index greater than or equal to about 1.79) such that the light of two or more colors containing image information propagates through the single waveguide by total internal reflection and be out-coupled to the viewer for to present virtual image content. In some implementations, two or more in-coupling optical elements can be configured to receive light of two or more colors containing image information from an imaging system (e.g., a projection device) and in-couple the received light of two or more colors containing image information into a single waveguide comprising materials with relatively high refractive index (e.g., refractive index greater than refractive index of glass and/or refractive index greater than or equal to about 1.79) such that the light of two or more colors containing image information propagates through the single waveguide by total internal reflection and be out-coupled to the viewer for to present virtual image content. The one or more in-coupling optical elements can be aligned with one or more exit pupils of the projector or imaging system that emits the light of two or more colors containing image information.

The systems, methods and devices disclosed herein each have several innovative aspects, no single one of which is solely responsible for the desirable attributes disclosed herein. A variety of example systems and methods are provided below.

Embodiment 1: A display system comprising:
an image projection device configured to emit a multiplexed light stream comprising a first light steam of a first color, a second light stream of a second color; and a third light stream of a third color, said first, second, and third colors being different, said first, second, and third light streams comprising image content; and
a waveguide comprising a material having a refractive index greater than 1.79, said waveguide configured to receive the multiplexed light stream emitted from the image projection device such that the first light stream, the second light stream and the third light stream are guided within the waveguide by multiple total internal reflections.

Embodiment 2: The display system of Embodiment 1, wherein the waveguide comprises a material having a refractive index greater than or equal to 2.2.

Embodiment 3: The display system of any of Embodiments 1-2, wherein the waveguide comprises a material having a refractive index greater than or equal to 2.3.

Embodiment 4: The display system of any of Embodiments 1-3, wherein the waveguide comprises Lithium Niobate.

Embodiment 5: The display system of any of Embodiments 1-4, wherein the waveguide has a field of view greater than about 30 degrees in a horizontal direction and greater than about 24 degrees in the vertical direction.

Embodiment 6: The display system of Embodiment 5, Wherein the field of view of the waveguide is about 45 degrees in the horizontal direction and about 56 degrees in the vertical direction.

Embodiment 7: The display system of any of Embodiments 1-6, further comprising at least one vari-focal optical element disposed to receive the multiplexed light stream output from the waveguide such that at least of portion of said multiplexed light stream is directed to a user's eye, said vari-focal optical element configured to vary the depth from which light from the waveguide appears to originate.

Embodiment 8: The display system of any of Embodiments 1-6, wherein the multiplexed light stream comprises a first multiplexed light stream comprising image information associated with a first depth plane.

Embodiment 9: The display system of Embodiment 8, wherein said waveguide comprises a first waveguide associated with the first depth plane, wherein light emitted from the first waveguide is configured to direct said first multiplexed light stream to a viewer to produce an image appearing to originate from the first depth plane.

Embodiment 10: The display system of any of Embodiments 8-9, wherein the image projection device is further configured to output a second multiplexed light stream comprising image information associated with a second depth plane, the second multiplexed light stream comprising a plurality of light streams having the first color, the second color and the third color, said first, second, and third colors being different.

Embodiment 11: The display system of Embodiment 10, further comprising:
a second waveguide associated with the second depth plane, the second waveguide comprising a material having refractive index greater than 1.79, the second waveguide configured to receive the second multiplexed light stream emitted from the image projection device such that the plurality of light streams associated with the second multiplexed light stream are guided through the second waveguide by multiple total internal reflections.

Embodiment 12: The display system of Embodiment 11, wherein light emitted from the second waveguide is configured to direct said second multiplexed light stream to a viewer to produce an image appearing to originate from the first depth plane.

Embodiment 13: The display system of any of Embodiments 11-12, wherein the second waveguide is including in an eyepiece of a head mounted display.

Embodiment 14: The display system of any of Embodiments 9-13, wherein the first waveguide is included in an eyepiece of a head mounted display.

Embodiment 15: The display system of any of Embodiments 1-7, wherein the waveguide is included in an eyepiece of a head mounted display.

Embodiment 16: The display system of any of Embodiments 1-7, and 15, further comprising an in-coupling optical element configured to receive the multiplexed light stream emitted from the image projection device and in-couple each of the first light stream, the second light stream and the third light stream into the waveguide to be guided therein by multiple total internal reflections.

Embodiment 17: The display system of any of Embodiments 1-16, wherein the image projection device comprises a light modulating device.

Embodiment 18: A display system comprising:
an image projection device configured to emit a multiplexed light stream comprising a first light stream of a first color, a second light stream of a second color; and a third light stream of a third color, said first, second, and third colors being different, said first, second, and third light streams comprising image content; and
first and second waveguides comprising material having a refractive index greater than 1.79, wherein the first waveguide is configured to receive the first color and the second color, and the second waveguide is configured to receive the third color, different colors or combination of colors being coupled into the two waveguides, such that the first and second light streams are guided within the first waveguide by multiple total internal reflections and the third light stream is guided within the second waveguide by multiple total internal reflections.

Embodiment 19: The display system of Embodiment 18, wherein the second waveguide is also configured to receive the first color, such that the first light stream is guided within the second waveguide by multiple total internal reflections.

Embodiment 20: The display system of Embodiment 18, wherein the second waveguide is also configured to receive the second color such that the second light stream is guided within the second waveguide by multiple total internal reflections.

Embodiment 21: The display system of Embodiment 18, wherein the second waveguide is not configured to in-couple the first or second colors such that the third light stream primarily is guided within the second waveguide by multiple total internal reflections.

Embodiment 22: The display system of any of Embodiments 18-21, further comprising a first in-coupling optical element in said first waveguide configured to in-couple both said the first and second light streams into said first waveguide such that said first and second light streams are guided within said first waveguide by multiple total internal reflections.

Embodiment 23: The display system of any of Embodiments 18-21, further comprising a first and second in-coupling optical elements in said first waveguide configured to in-couple both said the first and second light streams into said first waveguide, respectively, such that said first and second light streams are guided within said first waveguide by multiple total internal reflections.

Embodiment 24: The display system of any of Embodiments 18-21, further comprising a third in-coupling optical element in said second waveguide configured to in-couple said the third light stream into said second waveguide such that said third light stream is guided within said second waveguide by multiple total internal reflections.

Embodiment 25: The display system of any of Embodiments 24, wherein said third in-coupling optical element is also configured to in-couple either said first or second light streams into said second waveguide such that either said first or second light streams are guided within said second waveguide by multiple total internal reflections.

Embodiment 26: The display system of any of Embodiments 24, further comprising a fourth in-coupling optical element configured to in-couple either said first or second light streams into said second waveguide such that either said first or second light streams are guided within said second waveguide by multiple total internal reflections.

Embodiment 27: A method of manufacturing a diffractive optical element, the method comprising:
  providing a substrate comprising material having a refractive index greater than 1.79 that is transparent to visible light;
  disposing a patternable layer over a surface of the substrate;
  patterning the patternable layer, the pattern comprising a plurality of features; and
  etching the surface of the substrate through the patternable layer to fabricate structures on the surface of the substrate, wherein the structures comprise diffractive feature configured to diffract visible light.

Embodiment 28: The method of Embodiment 27, wherein the transparent material comprises LiNbO$_3$.

Embodiment 29: The method of Embodiments 27 or 28, wherein disposing the patternable layer over the surface of the substrate comprises jet-depositing the patternable layer over the surface of the substrate.

Embodiment 30: The method of any of Embodiments 27-29, wherein the surface of the substrate is discharged prior to disposing the patternable layer.

Embodiment 31: The method of any of Embodiments 27-30, wherein the patternable layer comprises a resist or a polymer.

Embodiment 32: A method of manufacturing a diffractive optical element, the method comprising:
  providing a substrate comprising material having a refractive index greater than 1.79 that is transparent to visible light;
  disposing a patternable layer over a surface of the substrate; and
  patterning the patternable layer, the pattern comprising a plurality of features, wherein the plurality of features of the patterned patternable layer are configured to diffract visible light into the substrate to be guided therein or to diffract visible light guided within the substrate out of the substrate.

Embodiment 33: The method of Embodiment 32, wherein the transparent material comprises LiNbO$_3$.

Embodiment 34: The method of Embodiments 32 or 33, wherein disposing the patternable layer over the surface of the substrate comprises jet-depositing the patternable layer over the surface of the substrate.

Embodiment 35: The method of any of Embodiments 32-34, wherein the surface of the substrate is discharged prior to disposing the patternable layer.

Embodiment 36: The method of any of Embodiments 32-35, wherein the patternable layer comprises a resist or a polymer.

Embodiment 37: A method of manufacturing a diffractive optical element, the method comprising:
  providing a substrate comprising material having a refractive index greater than 1.79 that is transparent to visible light;
  jet-depositing the patternable layer over a surface of the substrate; and patterning the patternable layer, the pattern comprising a plurality of features.

Embodiment 38: The method of Embodiment 37, wherein the transparent material comprises LiNbO$_3$.

Embodiment 39: The method of Embodiments 37 or 38, wherein the surface of the substrate is discharged prior to disposing the patternable layer.

Embodiment 40: The method of any of Embodiments 37-39, wherein the patternable layer comprises a resist or a polymer.

Embodiment 41: A waveguide for propagating image content therein by total internal reflection, said waveguide comprising:
  a substrate comprising material having a refractive index greater than 1.79 that is transparent to visible light, said substrate capable of propagating image content therein by total internal reflection;
  a layer over a surface of the substrate, said layer comprising material having an index of refraction lower than said substrate, said layer comprising a pattern comprising a plurality of features,
  wherein the plurality of features of the patterned patternable layer are configured to diffract visible light into the substrate to be guided therein or to diffract visible light guided within the substrate out of the substrate.

Embodiment 42: The waveguide of Embodiment 41, wherein the transparent material comprises LiNbO$_3$.

Embodiment 43: The waveguide of Embodiments 41 or 42, wherein the surface of the substrate is discharged prior to disposing the patternable layer.

Embodiment 44: The waveguide of any of Embodiments 41-43, wherein the patternable layer comprises a resist.

Embodiment 45: The waveguide of any of Embodiments 41-44, wherein the patternable layer comprises a polymer.

Embodiment 46: A head mounted display device comprising:
  an eyepiece comprising at least one waveguide comprising a material having a refractive index greater than 1.79, the waveguide comprising a first major surface, a second major surface opposite the first major surface and a plurality of edges between the first and the second major surfaces; and
  a plurality of diffractive features formed in at least one of the first major surface or the second major surface.

Embodiment 47: The head mounted display device of Embodiment 46, wherein the plurality of diffractive features are formed in at least one of the first major surface or the second major surface by etching at least one of the first major surface or the second major surface.

Embodiment 48: The head mounted display device of Embodiments 46 or 47, wherein the waveguide comprises a material having a refractive index greater than 2.2.

Embodiment 49: The head mounted display device of any of Embodiments 46-48, wherein the waveguide comprises lithium niobate.

Embodiment 50: The head mounted display device of any of Embodiments 46-48, wherein the waveguide comprises silicon carbide.

Embodiment 51: The head mounted display device of any of Embodiments 46-50, wherein at least some of the plurality of diffractive features are configured to in-couple incident image light such that the in-coupled image light propagates through the waveguide by multiple total internal reflections at the first and the second major surface.

Embodiment 52: The head mounted display device of any of Embodiments 46-52, further comprising a variable focusing lens between the waveguide and a viewer, wherein the variable focus lens is configured to vary a focal plane of image light propagating through the waveguide by multiple total internal reflections at the first and the second major surface that is out-coupled from the waveguide towards the viewer.

Embodiment 53: The head mounted display device of Embodiment 52, wherein the variable focus lens comprises a negative lens.

Embodiment 54: The head mounted display device of any of Embodiments 52-53, wherein the variable focus lens comprises a liquid filled lens.

Embodiment 55: The head mounted display device of any of Embodiments 52-53, wherein the variable focus lens comprises a liquid crystal.

Embodiment 56: The head mounted display device of any of Embodiments 52, 53, or 55, wherein the variable focus lens comprises a geometric phase lens.

Embodiment 57: The head mounted display device of any of Embodiments 46-51, further comprising a negative lens between the waveguide and a viewer such that the negative lens receives light propagating through the waveguide by multiple total internal reflections at the first and the second major surface that is out-coupled from the waveguide towards the viewer.

Embodiment 58: The head mounted display device of Embodiment 57, wherein the negative lens comprises a static lens.

Embodiment 59: The head mounted display device of Embodiments 57 or 58, wherein the waveguide and the negative lens are included in a stacked waveguide assembly.

Embodiment 60: The head mounted display device of any of Embodiments 57-59, further comprising an additional waveguide paired with an additional negative lens.

Embodiment 61: The head mounted display device of any of Embodiments 57-60, further comprising a positive lens disposed between the waveguide and the real world.

Embodiment 62: The head mounted display device of any of Embodiments 46-61, further comprising a polarizer stacked with the waveguide.

Embodiment 63: The head mounted display device of any of Embodiments 46-62, Wherein at least some of the plurality of diffractive features are configured to out-couple image light propagating through the waveguide by multiple total internal reflections at the first and the second major surface towards the viewer.

Embodiment 64: The head mounted display device of any of Embodiments 46-62, further comprising an imaging system configured to provide image light.

Embodiment 65: The head mounted display device of Embodiment 64, wherein the imaging system is outside the field of view of a viewer viewing the waveguide.

Embodiment 66: The head mounted display device of any of Embodiments 64-65, wherein the imaging system comprises:

an illumination system;

a modulating element configured to receive unmodulated light from the illumination system; and a projection optics system configured to transmit image light output by the modulating element.

Embodiment 67: The head mounted display device of Embodiment 66, wherein the modulating element is reflective.

Embodiment 68: The head mounted display device of Embodiment 67, wherein unmodulated image light from the illumination system is transmitted towards the reflective modulating element through the projection optics system, reflected from the modulating element and transmitted back through the projection optics and into the waveguide.

Embodiment 69: The head mounted display device of any of Embodiments 66-68, wherein the illumination system comprises:

a light source configured to output visible light;

a light pipe configured to receive the visible light output from the light source; and a light redirecting element, wherein the light pipe is configured to convey the light output from the light source towards the light redirecting element by multiple total internal reflections; and wherein the light redirecting element is configured to redirect light propagating in the light pipe towards the modulating element.

Embodiment 70: The head mounted display device of Embodiment 69, wherein the light source comprises a plurality of light emitting elements configured to emit light in a plurality of colors.

Embodiment 71: The head mounted display device of Embodiment 70, wherein the plurality of light emitting elements comprise a light emitting diode or a laser.

Embodiment 72: The head mounted display device of any of Embodiments 70-71, further comprising an optical element configured to combine light emitted by the plurality of light emitting elements.

Embodiment 73: The head mounted display device of Embodiment 72, wherein the optical element is a dichroic beam combiner.

Embodiment 74: The head mounted display device of any of Embodiments 69-73, wherein the light redirecting element is configured to redirect light propagating in the light pipe towards the modulating element through the waveguide.

Embodiment 75: The head mounted display device of any of Embodiments 69-74, wherein the waveguide further comprises a light conditioning optic configured to tailor a distribution of the light redirected by the light redirecting element.

Embodiment 76: A head mounted display device comprising: an image projection device; and an eyepiece comprising a waveguide comprising silicon carbide, the waveguide comprising a first major surface, a second major surface opposite the first major surface and a plurality of edges between the first and the second major surfaces, wherein the waveguide is configured to receive and light from the image projection device therein to direct images into an eye of the wearer of the head mounted display.

Embodiment 77: The head mounted display device of Embodiment 76, further comprising a plurality of diffractive features disposed on at least one of the first major surface or the second major surface.

Embodiment 78: The head mounted display device of Embodiment 77, Wherein the plurality of diffractive features are formed in at least one of the first major surface or the second major surface by etching at least one of the first major surface or the second major surface.

Embodiment 79: The head mounted display device of any of Embodiments 77-78, Wherein at least some of the plurality of diffractive features are configured to in-couple incident image light such that the in-coupled image light propagates through the waveguide by multiple total internal reflections at the first and the second major surface.

Embodiment 80: The head mounted display device of any of Embodiments 76-79, further comprising a variable focusing lens between the waveguide and a viewer, wherein the variable focus lens is configured to vary a focal plane of image light propagating through the waveguide by multiple total internal reflections at the first and the second major surface that is out-coupled from the waveguide towards the viewer.

Embodiment 81: The head mounted display device of Embodiment 80, wherein the variable focus lens comprises a negative lens.

Embodiment 82: The head mounted display device of any of Embodiments 80-81, wherein the variable focus lens comprises a liquid filled lens.

Embodiment 83: The head mounted display device of any of Embodiment 80-81, wherein the variable focus lens comprises a liquid crystal.

Embodiment 84: The head mounted display device of any of Embodiments 80, 81, or 83, wherein the variable focus lens comprises a geometric phase lens.

Embodiment 85: The head mounted display device of any of Embodiments 76-79, further comprising a negative lens between the waveguide and a viewer such that the negative lens receives light propagating through the waveguide by multiple total internal reflections at the first and the second major surface that is out-coupled from the waveguide towards the viewer.

Embodiment 86: The head mounted display device of Embodiment 85, wherein the negative lens comprises a static lens.

Embodiment 87: The head mounted display device of Embodiments 85 or 86, wherein the waveguide and the negative lens are included in a stacked waveguide assembly.

Embodiment 88: The head mounted display device of any of Embodiments 85-87, further comprising an additional waveguide paired with an additional negative lens.

Embodiment 89: The head mounted display device of any of Embodiments 85-88, further comprising a positive lens disposed between the waveguide and the real world.

Embodiment 90: The head mounted display device of any of Embodiments 76-89, further comprising a polarizer stacked with the waveguide.

Embodiment 91: The head mounted display device of any of Embodiments 76-90, wherein at least some of the plurality of diffractive features are configured to out-couple image light propagating through the waveguide by multiple total internal reflections at the first and the second major surface towards the viewer.

Embodiment 92: The head mounted display device of any of Embodiments 76-91, further comprising an imaging system configured to provide image light.

Embodiment 93: The head mounted display device of Embodiment 92, wherein the imaging system is outside the field of view of a viewer viewing the waveguide.

Embodiment 94: The head mounted display device of any of Embodiments 92-93, wherein the imaging system comprises:
   an illumination system;
   a modulating element configured to receive unmodulated light from the illumination system; and
   a projection optics system configured to transmit image light output by the modulating element.

Embodiment 95: The head mounted display device of Embodiment 94, wherein the modulating element is reflective.

Embodiment 96: The head mounted display device of Embodiment 95, wherein unmodulated image light from the illumination system is transmitted towards the reflective modulating element through the projection optics system, reflected from the modulating element and transmitted back through the projection optics and into the waveguide.

Embodiment 97: The head mounted display device of any of Embodiments 94-96, wherein the illumination system comprises:
   a light source configured to output visible light;
   a light pipe configured to receive the visible light output from the light source; and
   a light redirecting element,
   wherein the light pipe is configured to convey the light output from the light source towards the light redirecting element by multiple total internal reflections; and
   wherein the light redirecting element is configured to redirect light propagating in the light pipe towards the modulating element.

Embodiment 98: The head mounted display device of Embodiment 98, wherein the light source comprises a plurality of light emitting elements configured to emit light in a plurality of colors.

Embodiment 99: The head mounted display device of Embodiment 98, wherein the plurality of light emitting elements comprise a light emitting diode or a laser.

Embodiment 100: The head mounted display device of any of Embodiments 98-99, further comprising an optical element configured to combine light emitted by the plurality of light emitting elements.

Embodiment 101: The head mounted display device of Embodiment 100, wherein the optical element is a dichroic beam combiner.

Embodiment 102: The head mounted display device of any of Embodiments 98-101, wherein the light redirecting element is configured to redirect light propagating in the light pipe towards the modulating element through the waveguide.

Embodiment 103: The head mounted display device of any of Embodiments 98-102, wherein the waveguide further comprises a light conditioning optic configured to tailor a distribution of the light redirected by the light redirecting element.

Embodiment 104: A display system comprising: an image injection device configured to emit multiplexed light stream comprising a first light stream comprising image content associated with a first color, a second light stream comprising image content associated with a second color; and a third light stream comprising image content associated with a third color;
   a waveguide comprising a material having a refractive index greater than 139; and
   a first in-coupling optical element configured to receive the multiplexed light stream emitted from the image injection device and in-couple the multiplexed light stream such that the first light stream, the second light stream and the third light stream propagate through the waveguide by multiple total internal reflections.

Embodiment 105: The display system of Embodiment 104, wherein the waveguide comprises a material having a refractive index greater than or equal to 2.2.

Embodiment 106: The display system of any of Embodiments 104-105, wherein the waveguide comprises a material having a refractive index greater than or equal to 2.3.

Embodiment 107: The display system of any of Embodiments 104-106, wherein the waveguide comprises Lithium Niobate or silicon carbide.

Embodiment 108: The display system of any of Embodiments 104-107, wherein the waveguide has a field of view greater than about 30 degrees in a horizontal direction and about 24.7 degrees in the vertical direction.

Embodiment 109: The display system of Embodiment 108, wherein the field of view of the waveguide is about 45.9 degrees in the horizontal direction and about 56.1 degrees in the vertical direction.

Embodiment 110: The display system of any of Embodiments 104-109, wherein the multiplexed light stream comprises image information associated with a first depth plane.

Embodiment 111: The display system of Embodiment 110, wherein the waveguide is associated with the first depth plane, and wherein light emitted from the waveguide is configured to produce an image appearing to originate from the first depth plane.

Embodiment 112: The display system of any of Embodiments 110-111, wherein the image injection device is further configured to output a second multiplexed light stream comprising image information associated with a second depth plane, the second multiplexed light stream comprising a plurality of light streams associated with the first color, the second color and the third color.

Embodiment 113: The display system of Embodiment 112, further comprising:
  a second waveguide associated with the second depth plane, the second waveguide comprising a material having refractive index greater than 1.79; and
  a second in-coupling optical element configured to receive the second multiplexed light stream emitted from the image injection device and in-couple the second multiplexed light stream such that the plurality of light streams propagate through the second waveguide by multiple total internal reflections.

Embodiment 114: The display system of Embodiment 113, wherein light emitted from the second waveguide is configured to produce an image appearing to originate from the second depth plane.

Embodiment 115: The display system of any of Embodiments 114-115, wherein the second waveguide is including in an eyepiece of a head mounted display.

Embodiment 116: The display system of any of Embodiments 104-115, wherein the waveguide is included in an eyepiece of a head mounted display.

Embodiment 117: The display system of any of Embodiments 115-116, wherein the head mounted display comprises an eyewear.

Embodiment 118: The display system of any of Embodiments 104-117, wherein the image injection device comprises a light modulating device.

Embodiment 119: A display system comprising:
  an image injection device configured to emit multiplexed light stream comprising a first light stream comprising image content associated with a first color, a second light stream comprising image content associated with a second color; and a third light stream comprising image content associated with a third color;
  a waveguide comprising a material having a refractive index greater than 1.79; and
  a first plurality of in-coupling optical elements configured to receive the multiplexed light stream emitted from the image injection device and in-couple the multiplexed light stream such that the first light stream, the second light stream and the third light stream propagate through the waveguide by multiple total internal reflections.

Embodiment 120: The display system of Embodiment 119, wherein the waveguide comprises a material having a refractive index greater than or equal to 2.2.

Embodiment 121: The display system of any of Embodiments 119-120, wherein the waveguide comprises a material having a refractive index greater than or equal to 2.3.

Embodiment 122: The display system of any of Embodiments 119-121, wherein the waveguide comprises Lithium Niobate or silicon carbide.

Embodiment 123: The display system of any of Embodiments 119-122, wherein the waveguide has a field of view greater than about 30 degrees in a horizontal direction and about 24.7 degrees in the vertical direction.

Embodiment 124: The display system of Embodiment 123, wherein the field of view of the waveguide is about 45.9 degrees in the horizontal direction and about 56.1 degrees in the vertical direction.

Embodiment 125: The display system of any of Embodiments 119-124, wherein the first plurality of in-coupling optical elements comprises:
  a first in-coupling optical element configured to in-couple the first light stream;
  a second in-coupling optical element configured to in-couple the second light stream; and
  a third in-coupling optical element configured to in-couple the third light stream;

Embodiment 126: The display system of any of Embodiments 119-125, wherein the multiplexed light stream comprises image information associated with a first depth plane.

Embodiment 127: The display system of Embodiment 126, wherein the waveguide is associated with the first depth plane, and wherein light emitted from the waveguide is configured to produce an image appearing to originate from the first depth plane.

Embodiment 128: The display system of any of Embodiments 125-127, wherein the image injection device is further configured to output a second multiplexed light stream comprising image information associated with a second depth plane, the second multiplexed light stream comprising a plurality of light streams associated with the first color, the second color and the third color.

Embodiment 129: The display system of Embodiment 128, further comprising:
  a second waveguide associated with the second depth plane, the second waveguide comprising a material having refractive index greater than 1.79; and
  a second plurality in-coupling optical element configured to receive the second multiplexed light stream emitted from the image injection device and in-couple the second multiplexed light stream such that the plurality of light streams propagate through the second waveguide by multiple total internal reflections.

Embodiment 130: The display system of Embodiment 129, wherein light emitted from the second waveguide is configured to produce an image appearing to originate from the second depth plane.

Embodiment 131: The display system of any of Embodiments 129-130, wherein the second waveguide is including in an eyepiece of a head mounted display.

Embodiment 132: The display system of any of Embodiments 119-131, wherein the waveguide is included in an eyepiece of a head mounted display.

Embodiment 133: The display system of any of Embodiments 131-132, wherein the head mounted display comprises an eyewear.

Embodiment 134: The display system of any of Embodiments 119-133, wherein the image injection device comprises a light modulating device.

Embodiment 135: A display system comprising:
- an image injection device configured to emit multiplexed light stream comprising a first light stream comprising image content associated with a first color, a second light stream comprising image content associated with a second color; and a third light stream comprising image content associated with a third color;
- a first waveguide comprising a material having a refractive index greater than 1.79;
- a second waveguide comprising a material having a refractive index greater than 1.79; a first in-coupling optical element configured to receive the multiplexed light stream emitted from the image injection device and in-couple the first light stream and the second light stream into the first waveguide such that the first light stream and the second light stream propagate through the first waveguide by multiple total internal reflections; and
- a second in-coupling optical element configured to receive the multiplexed light stream emitted from the image injection device and in-couple the third light stream into the second waveguide such that the third light stream propagates through the second waveguide by multiple total internal reflections.

Embodiment 136: The display system of Embodiment 135, wherein the second in-coupling optical element is further configured to in-couple the first light stream or the second light stream into the second waveguide such that the first light stream or the second light propagates through the first waveguide by multiple total internal reflections.

Embodiment 137: The display system of any of Embodiments 135-136, wherein at least one of the first waveguide and the second waveguide comprises a material having a refractive index greater than or equal to 2.2.

Embodiment 138: The display system of any of Embodiments 135-137, wherein at least one of the first waveguide and the second waveguide comprises a material having a refractive index greater than or equal to 2.3.

Embodiment 139: The display system of any of Embodiments 135-137, wherein at least one of the first waveguide and the second waveguide comprises Lithium Niobate or silicon carbide.

Embodiment 140: The display system of any of Embodiments 135-139, wherein at least one of the first waveguide and the second waveguide has a field of view greater than about 30 degrees in a horizontal direction and about 24.7 degrees in the vertical direction.

Embodiment 141: The display system of Embodiment 140, wherein the field of view of at least one of the first waveguide and the second waveguide is about 45.9 degrees in the horizontal direction and about 56.1 degrees in the vertical direction.

Embodiment 142: The display system of any of Embodiments 135-141, wherein the multiplexed light stream comprises image information associated with a first depth plane.

Embodiment 143: The display system of Embodiment 142, wherein the first waveguide and the second waveguide are associated with the first depth plane, and wherein light emitted from the first waveguide and the second waveguide is configured to produce an image appearing to originate from the first depth plane.

Embodiment 144: The display system of any of Embodiments 135-143, wherein the image injection device is further configured to output a second multiplexed light stream comprising image information associated with a second depth plane, the second multiplexed light stream comprising a plurality of light streams associated with the first color, the second color and the third color.

Embodiment 145: The display system of Embodiment 144, further comprising:
- two waveguides associated with the second depth plane, the two waveguides comprising a material with refractive index greater than 1.79;
- a third in-coupling optical element configured to receive second the multiplexed light stream emitted from the image injection device and in-couple light streams associated with the first color and the second color into a first of the two waveguides such that the light streams associated with the first color and the second color propagate through the first of the two waveguides by multiple total internal reflections; and
- a fourth in-coupling optical element configured to receive the multiplexed light stream emitted from the image injection device and in-couple light stream associated with the third color into a second of the two waveguides such that the light stream associated with the third color propagates through the second of the two waveguides by multiple total internal reflections.

Embodiment 146: The display system of Embodiment 145, wherein the fourth in-coupling optical element is further configured in-couple light stream associated with the first color or the second color into a second of the two waveguides such that the light stream associated with the first color or the second color propagates through the second of the two waveguides by multiple total internal reflections.

Embodiment 147: The display system of any of Embodiments 145-146, wherein light emitted from the two waveguides is configured to produce an image appearing to originate from the second depth plane.

Embodiment 148: The display system of any of Embodiments 145-147, wherein the two waveguides associated with the second depth plane are including in an eyepiece of a head mounted display.

Embodiment 149: The display system of any of Embodiments 135-148, wherein the first waveguide and the second waveguide are included in an eyepiece of a head mounted display.

Embodiment 150: The display system of any of Embodiments 148-149, wherein the head mounted display comprises an eyewear.

Embodiment 151: The display system of any of Embodiments 135-150, wherein the image injection device comprises a light modulating device.

Embodiment 152: A display system comprising:
- an image injection device configured to emit multiplexed light stream comprising a first light stream comprising image content associated with a first color, a second light stream comprising image content associated with a second color; and a third light stream comprising image content associated with a third color;
- a first waveguide comprising a material having a refractive index greater than 1.79;
- a second waveguide comprising a material having a refractive index greater than 139;
- a first in-coupling optical element configured to receive the multiplexed light stream emitted from the image injection device and in-couple the first light stream into the first waveguide such that the first light stream propagates through the first waveguide by multiple total internal reflections;
- a second in-coupling optical element configured to receive the multiplexed light stream emitted from the image injection device and in-couple the second light stream into the first waveguide such that the second light stream propagates through the first waveguide by multiple total internal reflections; and a third in-coupling optical element configured to receive the multiplexed light stream emitted from the image injection device and in-couple the third light stream into the second waveguide such that the third light stream propagates through the second waveguide by multiple total internal reflections.

Embodiment 153: The display system of Embodiment 152, wherein the third in-coupling optical element is further configured to in-couple the first light stream or the second light stream into the second waveguide such that the first light stream or the second light propagates through the first waveguide by multiple total internal reflections.

Embodiment 154: The display system of Embodiment 152, further comprising a fourth in-coupling optical element configured to in-couple the first light stream or the second light stream into the second waveguide such that the first light stream or the second light propagates through the first waveguide by multiple total internal reflections.

Embodiment 155: The display system of any of Embodiments 152-154, wherein at least one of the first waveguide and the second waveguide comprises a material having a refractive index greater than or equal to 2.2.

Embodiment 156: The display system of any of Embodiments 152-155, wherein at least one of the first waveguide and the second waveguide comprises a material having a refractive index greater than or equal to 2.3.

Embodiment 157: The display system of any of Embodiments 152-156, wherein at least one of the first waveguide and the second waveguide comprises Lithium Niobate or silicon carbide.

Embodiment 158: The display system of any of Embodiments 152-157, wherein at least one of the first waveguide and the second waveguide has a field of view greater than about 30 degrees in a horizontal direction and about 24.7 degrees in the vertical direction.

Embodiment 159: The display system of Embodiment 158, wherein the field of view of at least one of the first waveguide and the second waveguide is about 45.9 degrees in the horizontal direction and about 56.1 degrees in the vertical direction.

Embodiment 160: The display system of any of Embodiments 152-159, wherein the multiplexed light stream comprises image information associated with a first depth plane.

Embodiment 161: The display system of Embodiment 160, wherein the first waveguide and the second waveguide are associated with the first depth plane, and wherein light emitted from the first waveguide and the second waveguide is configured to produce an image appearing to originate from the first depth plane.

Embodiment 162: The display system of any of Embodiments 152-161, wherein the image injection device is further configured to output a second multiplexed light stream comprising image information associated with a second depth plane, the second multiplexed light stream comprising a plurality of light streams associated with the first color, the second color and the third color.

Embodiment 163: The display system of Embodiment 162, further comprising:

two waveguides associated with the second depth plane, the two waveguides comprising a material with refractive index greater than 1.79;

a fifth in-coupling optical element configured to receive second the multiplexed light stream emitted from the image injection device and in-couple light streams associated with the first color and the second color into a first of the two waveguides such that the light streams associated with the first color and the second color propagate through the first of the two waveguides by multiple total internal reflections; and a sixth in-coupling optical element configured to receive the multiplexed light stream emitted from the image injection device and in-couple light stream associated with the third color into a second of the two waveguides such that the light stream associated with the third color propagates through the second of the two waveguides by multiple total internal reflections.

Embodiment 164: The display system of Embodiment 163, wherein the sixth in-coupling optical element is further configured in-couple light stream associated with the first color or the second color into a second of the two waveguides such that the light stream associated with the first color or the second color propagates through the second of the two waveguides by multiple total internal reflections.

Embodiment 165: The display system of any of Embodiments 163-165, wherein light emitted from the two waveguides is configured to produce an image appearing to originate from the second depth plane.

Embodiment 166: The display system of any of Embodiments 163-165, wherein the two waveguides associated with the second depth plane are including in an eyepiece of a head mounted display.

Embodiment 167: The display system of any of Embodiments 152-166, wherein the first waveguide and the second waveguide are included in an eyepiece of a head mounted display.

Embodiment 168: The display system of any of Embodiments 166-167, wherein the head mounted display comprises an eyewear.

Embodiment 169: The display system of any of Embodiments 152-168, wherein the image injection device comprises a light modulating device.

Embodiment 170: A method of manufacturing a diffractive optical element, the method comprising:

providing a substrate comprising material having a refractive index greater than 1.79 that is transparent to visible light;

disposing a patternable layer over a surface of the substrate;

patterning the patternable layer, the pattern comprising a plurality of features; and etching the surface of the substrate through the patternable layer to fabricate structures on the surface of the substrate, wherein the structures comprise diffractive feature configured to diffract visible light.

Embodiment 171: The method of Embodiment 170, wherein the transparent material comprises $LiNbO_3$ or silicon carbide.

Embodiment 172: The method of Embodiment 170, wherein disposing the patternable layer over the surface of the substrate comprises jet-depositing the patternable layer over the surface of the substrate.

Embodiment 173: The method of Embodiment 170, wherein the surface of the substrate is discharged prior to disposing the patternable layer.

Embodiment 174: The method of Embodiment 170, wherein the patternable layer comprises a resist or a polymer.

Embodiment 175: A method of manufacturing a diffractive optical element, the method comprising:
  providing a substrate comprising material having a refractive index greater than 1.79 that is transparent to visible light;
  disposing a patternable layer over a surface of the substrate; and
  patterning the patternable layer, the pattern comprising a plurality of features, wherein the plurality of features of the patterned patternable layer are configured to diffract visible light.

Embodiment 176: The method of Embodiment 175, wherein the transparent material comprises $LiNbO_3$ or silicon carbide.

Embodiment 177: The method of Embodiment 175, wherein disposing the patternable layer over the surface of the substrate comprises jet-depositing the patternable layer over the surface of the substrate.

Embodiment 178: The method of Embodiment 175, wherein the surface of the substrate is discharged prior to disposing the patternable layer.

Embodiment 179: The method of Embodiment 175, wherein the patternable layer comprises a resist or a polymer.

Embodiment 180: The display system of any of Embodiments 1-26, wherein said waveguide material comprises silicon carbide.

Embodiment 181: The method of any of Embodiments 27-40, wherein said transparent material comprises silicon carbide.

Embodiment 182: The waveguide of any of Embodiments 41-45, wherein said transparent material comprises silicon carbide.

Embodiment 183: A head mounted display device comprising:
  an image projection device; and
  an eyepiece comprising a waveguide comprising a material having a refractive index greater than 1.79, the waveguide comprising a first major surface, a second major surface opposite the first major surface and a plurality of edges between the first and the second major surfaces,
  wherein the waveguide is configured to receive and guide light from the image projection device therein to direct images into an eye of the wearer of the head mounted display.

Embodiment 184: The head mounted display device of Embodiment 183, wherein the waveguide material has a refractive index greater than or equal to 2.2.

Embodiment 185: The head mounted display device of any of Embodiments 183-184, wherein the waveguide material has a refractive index greater than or equal to 2.3.

Embodiment 186: The head mounted display device of any of Embodiments 183-185, wherein the material comprises Lithium Niobate.

Embodiment 187: The head mounted display device of any of Embodiments 183-185, wherein the material comprises Silicon Carbide.

Embodiment 188: The head mounted display device of any of Embodiments 183-187, wherein the waveguide has a field of view greater than about 30 degrees in a horizontal direction and greater than about 24 degrees in the vertical direction.

Embodiment 189: The head mounted display device of Embodiment 188, wherein the field of view of the waveguide is about 45 degrees in the horizontal direction and about 56 degrees in the vertical direction.

Embodiment 190: The head mounted display device of any of Embodiments 183-189, further comprising a plurality of diffractive features disposed on at least one of the first major surface or the second major surface.

Embodiment 191: The head mounted display device of Embodiment 190, wherein the plurality of diffractive features are formed in at least one of the first major surface or the second major surface by etching at least one of the first major surface or the second major surface.

Embodiment 192: The head mounted display device of any of Embodiments 183-191, wherein at least some of the plurality of diffractive features are configured to in-couple incident image light such that the in-coupled image light propagates through the waveguide by multiple total internal reflections at the first and the second major surface.

Embodiment 193: The head mounted display device of any of Embodiments 183-192, further comprising a variable focusing lens between the waveguide and a viewer, wherein the variable focus lens is configured to vary a focal plane of image light propagating through the waveguide by multiple total internal reflections at the first and the second major surface that is out-coupled from the waveguide towards the viewer.

Embodiment 194: The head mounted display device of Embodiment 193, wherein the variable focus lens comprises a negative lens.

Embodiment 195: The head mounted display device of any of Embodiments 193-194, wherein the variable focus lens comprises a liquid filled lens.

Embodiment 196: The head mounted display device of any of Embodiment 193-195, wherein the variable focus lens comprises a liquid crystal.

Embodiment 197: The head mounted display device of any of Embodiments 193, 194, or 196, wherein the variable focus lens comprises a geometric phase lens.

Embodiment 198: The head mounted display device of any of Embodiments 183-192, further comprising a negative lens between the waveguide and a viewer such that the negative lens receives light propagating through the waveguide by multiple total internal reflections at the first and the second major surface that is out-coupled from the waveguide towards the viewer.

Embodiment 199: The head mounted display device of Embodiment 198, wherein the negative lens comprises a static lens.

Embodiment 200: The head mounted display device of Embodiments 198 or 199, wherein the waveguide and the negative lens are included in a stacked waveguide assembly.

Embodiment 201: The head mounted display device of any of Embodiments 198-200, further comprising an additional waveguide paired with an additional negative lens.

Embodiment 202: The head mounted display device of any of Embodiments 198-201, further comprising a positive lens disposed between the waveguide and the real world.

Embodiment 203: The head mounted display device of any of Embodiments 183-202, further comprising a polarizer stacked with the waveguide.

Embodiment 204: The head mounted display device of any of Embodiments 183-203, wherein at least some of the plurality of diffractive features are configured to out-couple image light propagating through the waveguide by multiple total internal reflections at the first and the second major surface towards the viewer.

Embodiment 205: The head mounted display device of any of Embodiments 183-204, further comprising an imaging system configured to provide image light.

Embodiment 206: The head mounted display device of Embodiment 205, wherein the imaging system is outside the field of view of a viewer viewing the waveguide.

Embodiment 207: The head mounted display device of any of Embodiments 205-206, Wherein the imaging system comprises:
- an illumination system;
- a modulating element configured to receive unmodulated light from the illumination system; and
- a projection optics system configured to transmit image light output by the modulating element.

Embodiment 208: The head mounted display device of Embodiment 207, wherein the modulating element is reflective.

Embodiment 209: The head mounted display device of Embodiment 208, wherein unmodulated image light from the illumination system is transmitted towards the reflective modulating element through the projection optics system, reflected from the modulating element and transmitted back through the projection optics and into the waveguide.

Embodiment 210: The head mounted display device of any of Embodiments 207-209, wherein the illumination system comprises:
- a light source configured to output visible light;
- a light pipe configured to receive the visible light output from the light source; and
- a light redirecting element,
- wherein the light pipe is configured to convey the light output from the light source towards the light redirecting element by multiple total internal reflections; and
- wherein the light redirecting element is configured to redirect light propagating in the light pipe towards the modulating element.

Embodiment 211: The head mounted display device of Embodiment 210, wherein the light source comprises a plurality of light emitting elements configured to emit light in a plurality of colors.

Embodiment 212: The head mounted display device of Embodiment 211, wherein the plurality of light emitting elements comprise a light emitting diode or a laser.

Embodiment 213: The head mounted display device of any of Embodiments 211-212, further comprising an optical element configured to combine light emitted by the plurality of light emitting elements.

Embodiment 214: The head mounted display device of Embodiment 213, wherein the optical element is a dichroic beam combiner.

Embodiment 215: The head mounted display device of any of Embodiments 210-214, wherein the light redirecting element is configured to redirect light propagating in the light pipe towards the modulating element through the waveguide.

Embodiment 216: The head mounted display device of any of Embodiments 210-215, wherein the waveguide further comprises a light conditioning optic configured to tailor a distribution of the light redirected by the light redirecting element.

Embodiment 217: The head mounted display device of any of Embodiments 183-216, further comprising a diffraction grating in or on the waveguide.

BRIEF DESCRIPTION OF THE DRAWINGS

FIG. 10 illustrates an example of a display system comprising an imaging system, a waveguide comprising a high refractive index material, and a plurality of variable focus elements and comprising, for example, liquid filled lenses, configured to provide for images as if originating from multiple depth planes or depths.

FIG. 11 illustrates an example of a display system comprising an imaging system, a waveguide comprising a high refractive index material, and a plurality of variable focus elements and comprising, for example, geometric-phase (GP) lenses, configured to provide for images as if originating from multiple depth planes or depths.

FIG. 14A illustrates a display system having a constrained working distance for configuring first and second waveguides groups for two depth planes comprising three waveguides each. FIG. 14B illustrates a similar a display system as shown in FIG. 14A additionally including lenses included with the first and second waveguides groups.

FIG. 14C illustrates a display system having improved working distance for configuring waveguides according to some embodiments.

FIGS. 14D-1, 14D-2, 14D-3 14E3-1, 14E-2, and 14E-3 illustrate various design considerations for configuring a working distance of a display system according to some embodiments.

FIGS. 18A and 18B illustrate flowcharts for two different methods of fabricating diffractive gratings on the surface of a substrate (e.g., a waveguide) comprising a high refractive index material.

The drawings are provided to illustrate example embodiments and are not intended to limit the scope of the disclosure. Like reference numerals refer to like parts throughout.

DETAILED DESCRIPTION

Figure 1:
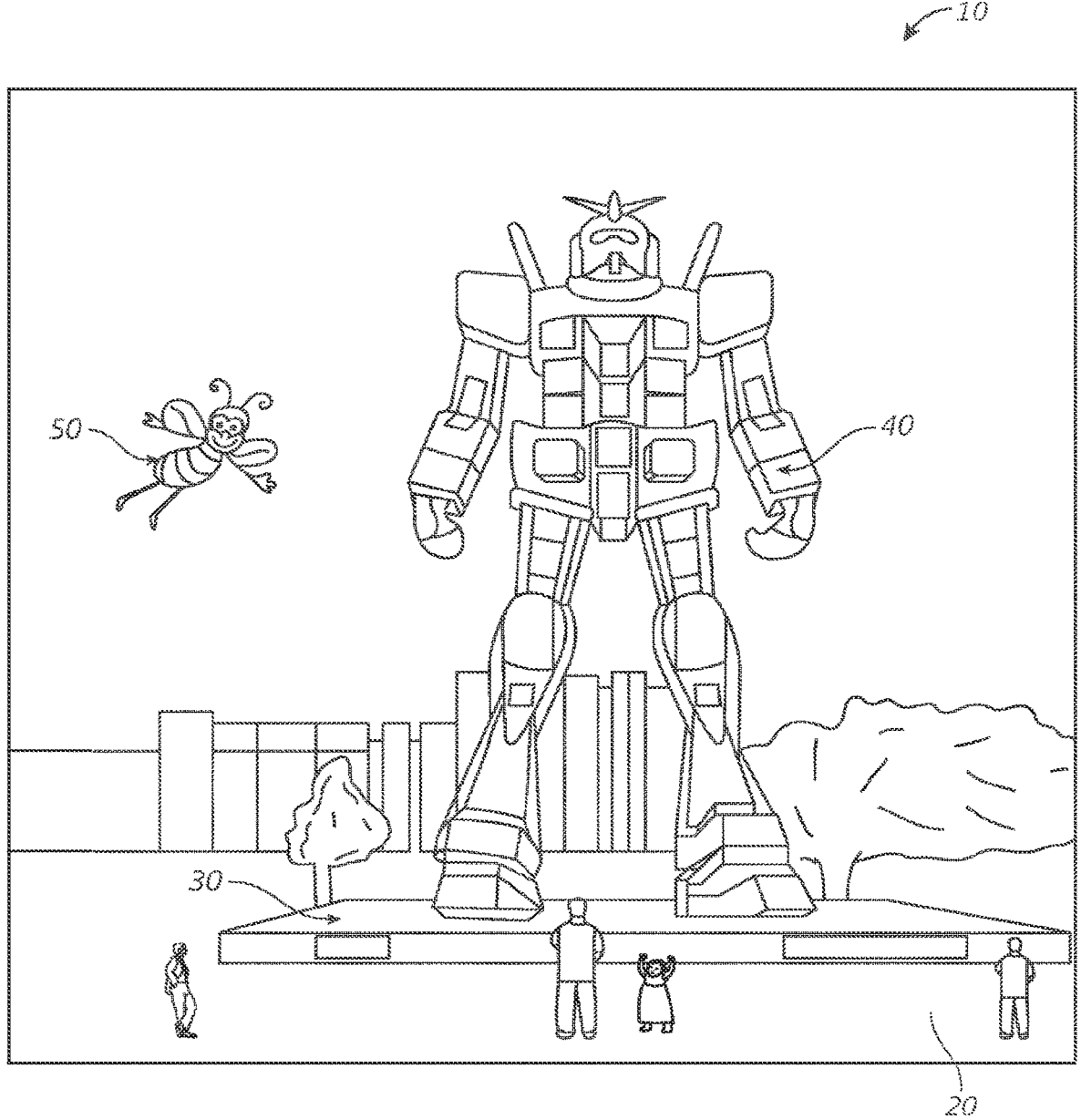
FIG. 1 illustrates a user's view of augmented reality (AR) through an AR device, according to some embodiments.

VR and AR experiences may be provided by display systems having displays in which images corresponding to a plurality of depth planes are provided to a viewer. The images may be relayed by exit pupils from a projector, the exit pupils associated with a particular display optic (such as a waveguide) configured to display the image from a particular depth plane. The display system thereby helps provide the user with depth cues based on the accommodation of the eye, or similarly provides accommodation cues based on the depth of the images or virtual content. The accommodation of the eye may bring into focus different content located on different depth planes in a scene. As discussed herein, such depth cues aid in providing credible perceptions of depth by the viewer.

In some configurations, a full color image may be formed for the various depth planes by overlaying component images that each have a particular component color. For example, red, green, and blue images may each be outputted to form each full color image. As a result, each depth plane may have multiple component color images associated with it. As disclosed herein, the component color images may be outputted using waveguides that in-couple light containing image information, distribute the in-coupled light across the waveguides, and then outcoupled light towards a viewer. Light may be in-coupled into the waveguide using in-coupling optical elements, such as diffractive elements (e.g., diffractive gratings), and then outcoupled out of the waveguide using outcoupling optical elements, which may also be diffractive elements such as gratings.

In many cases, it is desirable that display systems that provide VR and AR experience, such as, for example, mixed reality, or augmented reality (AR), near-eye displays be lightweight, low-cost, have a small form-factor, have a wide virtual image field of view, and be as transparent as possible to at least visible wavelengths of light. In addition, in various implementations, it is desirable to have configurations that present virtual image information in multiple focal planes (for example, two or more) in order to be practical for a wide variety of applications without exceeding an acceptable allowance for vergence-accommodation mismatch. The multiple focal planes can also be referred to herein as multiple depth planes or depths (e.g., at which the image content appears to originate). There are a number of architectures for achieving subsets of these goals, but relatively few that address all of them comprehensively. To achieve many of the objectives identified above, it can be desirable to pursue architectures that incorporate a small or even the smallest possible imaging system, such as, for example, a microdisplay (e.g., projector) comprising the desired number of pixels for the given field of view. It may also be desirable to use a small, reduced or the fewest number of eyepiece layers needed to convey the desired number of focal (or depth) planes or depths. Additionally, efficient, transparent and/or low cost focal elements responsible for imaging the designed focal or depth planes at their intended positions, and a compact eyepiece design to achieve the desired field of view and small form-factor with the light weight and high optical quality may be desired.

One architectural class of the numerous combinations of viewing optical elements that can be used to produce a mixed reality light-field incorporates static optical elements on both sides of an infinity-focused eyepiece and that serve to present the viewer with a non-powered real-world view in conjunction with a virtual image that is at some position (e.g., depth) other than infinity. This can be accomplished through use of a positive/negative lens combination in which both lenses have equal power.

One group of compact eyepiece solutions incorporates a light-guide hosting leaky-gratings (such as an exit pupil expander ("EPE") orthogonal pupil expander ("OPE") configuration) that re-direct and replicate an input pupil from an imaging system to produce a wide field of view with a large pupil to facilitate comfortable, flexible multi-IPD (inter-pupillary distance) viewing and eye-motion. In this application, the terms light-guide and waveguide can be used interchangeably. In various embodiments, the light-guide can comprise nano-structure or microstructure gratings. In some embodiments, the eyepiece comprises gratings or diffractive optical elements that form the combination EPE/OPE on both sides (e.g., major surfaces, front and back, etc.) of the light-guide; in some embodiments the gratings or diffractive optical elements comprise a combined pupil expander (one that both spreads and out-couples light) formed on a single surface of the light-guide.

A compact imaging system for producing images, such as, for example, a microdisplay may comprise a spatial light modulator, an optical system (e.g., projection optics) to project the image formed by the spatial light modulator and an illumination module to illuminate the spatial light modulator for producing an image. Other microdisplay technologies such as multicore or single core optical fibers, or micro LED displays may also be used as the light source or image source. It may be desirable that the illumination module be compact, reduced or minimal heating to the optical elements of the microdisplay.

The optical system (e.g., the projection optics) may be configured to produce a output pupil of the microdisplay. Without any loss of generality, the output pupil can correspond to a pupil of the optical system through which light exits the optical system. Light emitted from the output pupil of the microdisplay can be made to intersect or could be proximal to an incoupling element (e.g., a grating) on the light-guide of the eyepiece. A number of microdisplay solutions can be configured to produce separate sub-pupils for image light of different colors emitted from the imaging system have been described and demonstrated. For example, one embodiment of an imaging system has a first set of three separate output sub-pupils to output light corresponding to the red, green, and blue image components for a first depth or focal plane and a second set of three separate output sub-pupils to output light corresponding to the red, green, and blue image components for a second depth or focal plane. In some implementations, three input sub-pupils may be included in the eyepiece for each depth plane to receive red, green and blue light from one or more light-sources. Such system, however, can be bulky and may not be practical for achieving the objective of small architectural form-factor and reduced bulk/weight.

The waveguide(s) in the eyepeice may comprise a light-guide material with a specific index of refraction suitable for hosting the range of field angles desirable for the system field of view. It may be preferred to have a separate eyepiece layer employed for each of red, green, and blue image components, due to, for example, the inability of a single eyepiece layer to host all of the grating vectors and field angles desired to display all three colors superimposed upon one another. However, the cost of production of a waveguide stack of an eyepiece of a head-mounted VR and/or AR device can increase as the number of waveguides in the waveguide stack increases. The cost of production of a waveguide stack of an eyepiece of a head-mounted VR and/or AR device can also depend on the handedness of the waveguide stack (e.g., "left" or "right"). For example, the production cost to manufacture different waveguide stacks configured to be positioned in front of a right eye and a left eye can be higher than a single waveguide stack that can be positioned in front of a left eye and a single waveguide stack that can be positioned in front of the right eye. As discussed above, various implementations of a waveguide stack of an eyepiece of a head-mounted VR and/or AR device can comprise 6 separate designs and 6 separate waveguides. The costs of manufacturing and assembling such a waveguide stack can be further increased due to increased costs of monitoring the quality of the various waveguides of the waveguide stack during manufacturing and assembly process. The costs of manufacturing and assembling such a waveguide stack can be further increased due to the higher potential that a waveguide stack comprising a larger number of waveguides may be rejected if the quality of a single waveguide of the waveguide stack does not meet the standards. Furthermore, there is an increased potential for reduced optical quality, because each chromatic component is desired to produce its image co-incident in x, y and z with the others. Additionally, variation in total thickness of waveguide stacks comprising 6 waveguides can independently change the position of pixels of each of the chromatic components, and potentially resulting in certain chromatic pixels being de-focused. Computationally expensive calibration/image-warping may be implemented to correct the variation in chromatic components as a result of variation in thickness. For these reasons, it may be desirable to have a waveguide stack with fewer waveguides, such as, for example, one or two waveguides that can support propagation of a plurality of, such as three, different colored image components (e.g., red, green and blue image components).

With a wearable computing system wherein power consumption is a priority, increased or maximum optical throughput of the virtual image light may be desirable. In addition, it also may be desirable to produce a system that increases or maximizes visibility of the external environment to the wearer of the wearable computing system, for example to facilitate eye-contact with others. It may also be desirable for the wearer of the wearable computing system or the operator of the mixed or augmented reality system to be able to perceive the real world with as reduced or as little attenuation as possible to avoid hazards and facilitate workaday comfort and function. Without relying on any particular theory, the transmissivity of light from the external environment (e.g., the real world) may be decreased and/or be compromised as the number of optical interfaces between the wearer's eye and the real world increases. For this additional reason, it may be desirable to reduce or minimize the number of waveguide layers in a waveguide and/or other optical elements that can scatter and/or absorb light from the external environment, in the waveguide stack of the eyepiece, which is positioned between the wearer's eye and the real world.

Additionally, in general higher indices of refraction provide larger fields of view. Accordingly, in some designs described herein, the substrates may have an index of refraction of approximately 1.79 or higher. One such material is Lithium Niobate ($LiNbO_3$), a crystalline material, available in thin wafer form, with an index of refraction of approximately 2.3 in visible wavelengths. Another high refractive index material contemplated in this application is silicon carbide (SiC). SiC is a high refractive index material that at least partially transmits visible light. Accordingly, one or more waveguides comprising SiC can be integrated in a display device (e.g., incorporated in an eyepiece of a head-mounted display device). Due to the high refractive index, two or more different colors of light propagating through a waveguide comprising SiC via total internal reflection can be emitted towards a viewer with a wide field of view. Waveguides comprising SiC can have additional advantages of being scratch resistant and/or harder to break due to the high hardness factor (e.g., approximately 9-10 Mohs)), which can be beneficial for eyewear that is susceptible to being dropped or otherwise mishandled.

Various implementations described herein, therefore include eyepieces comprising waveguides comprising materials with high refractive index materials (e.g., materials with refractive index greater than the refractive index of glass and/or materials with refractive index greater than or equal to about 1.79) that can support guided propagation of a plurality of different colored image components (e.g., red, green and blue image components) in a one single waveguide or in two waveguides with at least one waveguide supporting guided propagation of two color components. For example, two or more different colored light streams comprising image information (e.g., red, green and blue colored image streams comprising image information) can be in-coupled into one waveguide comprising a material with a refractive index greater than about 1.79 and/or 2.2 (e.g., Lithium Niobate) such that they propagate via total internal reflection within that waveguide. Additionally, the field of view of display devices comprising one or more waveguides with high refractive index materials (e.g., materials with refractive index greater than the refractive index of glass and/or materials with refractive index greater than or equal to about 1.79) can be greater than the field of view of display devices comprising one or more glass waveguides or one or more waveguides comprising materials having refractive index less than about 1.79.

Accordingly, various implementations of display device described herein, comprise one or more waveguides comprising materials with high refractive index materials (e.g., materials with refractive index greater than the refractive index of glass and/or materials with refractive index greater than or equal to about 1.79) that can efficiently in-couple red, green and blue image light emitted from an imaging system (e.g., a microdisplay and/or projector) and project red, green and blue images towards a viewer with an increased field of view. For example, in some implementations of display devices described in this application, a single waveguide comprising materials with high refractive index materials (e.g., materials with refractive index greater than the refractive index of glass and/or materials with refractive index greater than or equal to about 1.79) can efficiently in-couple two colors, for example, red and green or green and blue or red and blue image light or image components emitted from an imaging system (e.g., a microdisplay and/or projector) and project those images (e.g., red and green or green and blue or red and blue images) towards a viewer with an increased field of view. In some implementations of display devices described in this application, a single waveguide comprising materials with high refractive index materials (e.g., materials with refractive index greater than the refractive index of glass and/or materials with refractive index greater than or equal to about 1.79) can efficiently in-couple three colors, for example, red, green, and blue image light or image components emitted from an imaging system (e.g., a microdisplay and/or projector) and project those images (e.g., red, green and blue images) towards a viewer with an increased field of view.

Reference will now be made to the figures, in which like reference numerals refer to like parts throughout.

Figure 2:
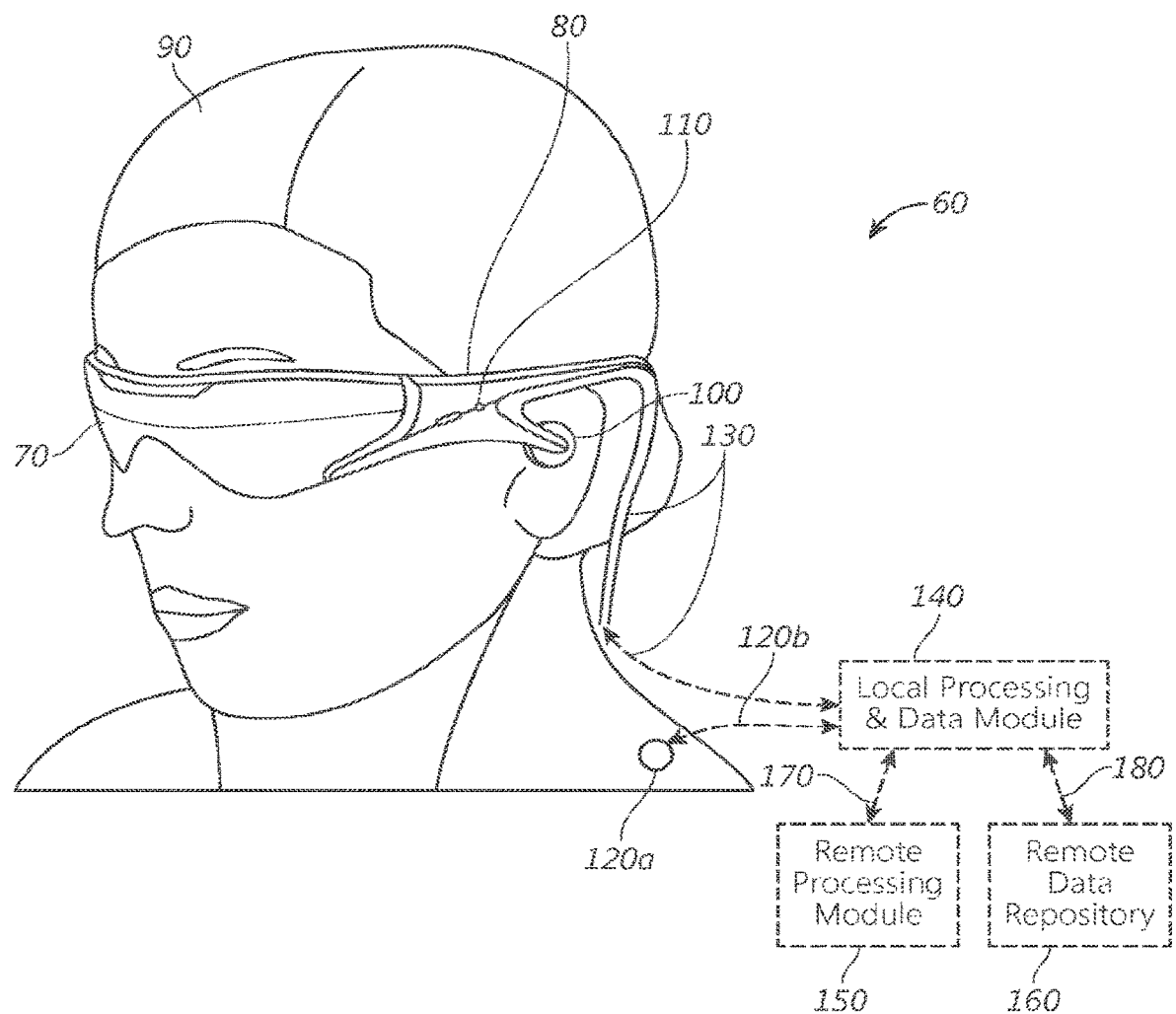
FIG. 2 illustrates an example of wearable display system, according to some embodiments.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (Which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
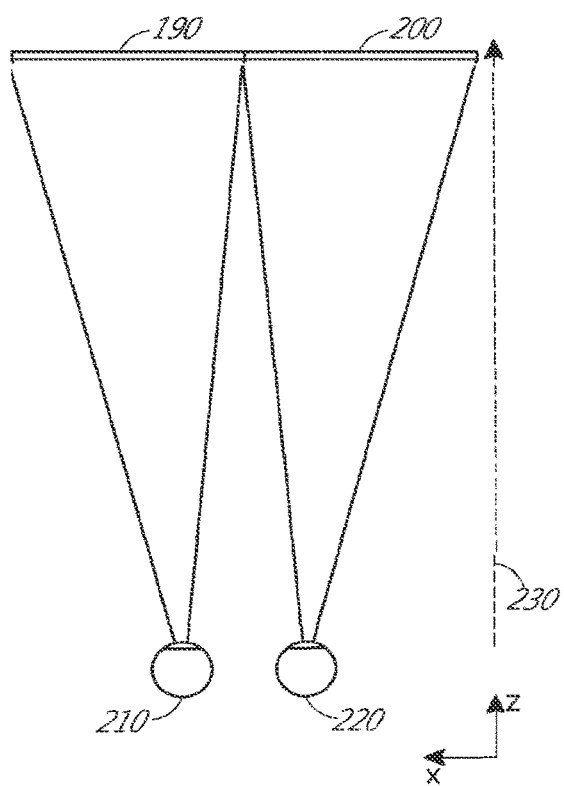
FIG. 3 illustrates a display system for simulating three-dimensional imagery for a user, according to some embodiments.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200 one for each eye 210, 220 are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
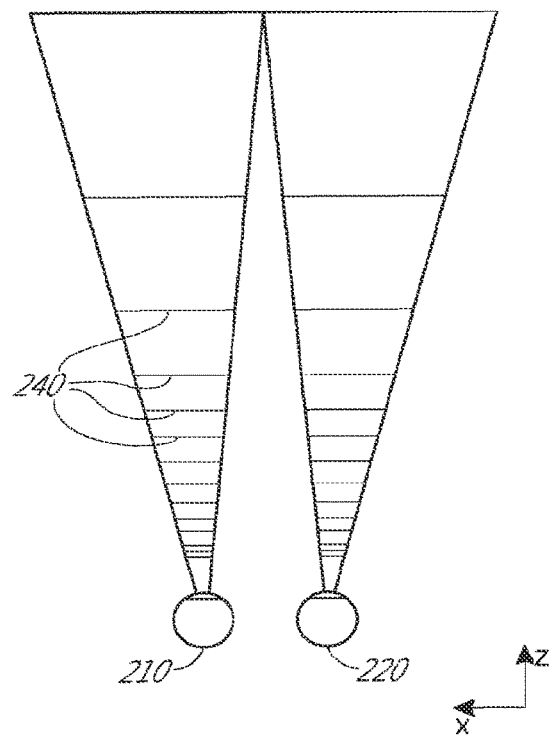
FIG. 4 illustrates aspects of an approach for simulating three-dimensional imagery using multiple depth planes, according to some embodiments.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
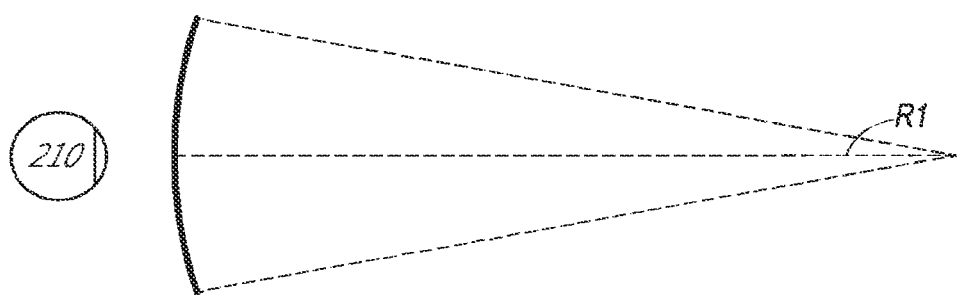
FIGS. 5A-5C illustrate relationships between radius of curvature and focal radius, according to some embodiments.
Figure 5B:
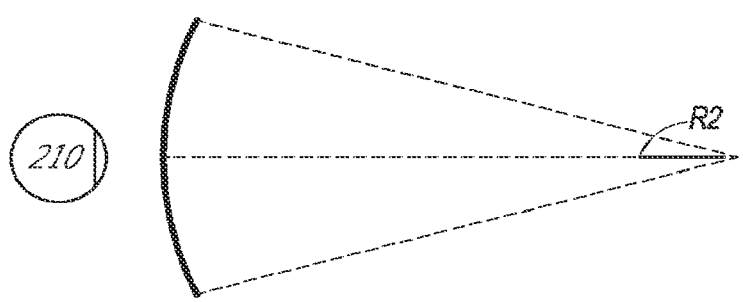
Figure 5C:
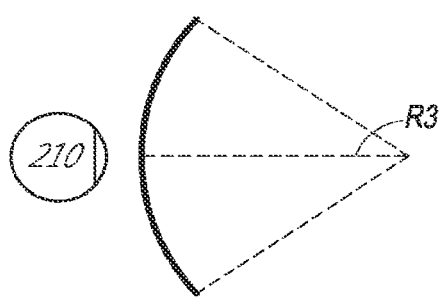

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
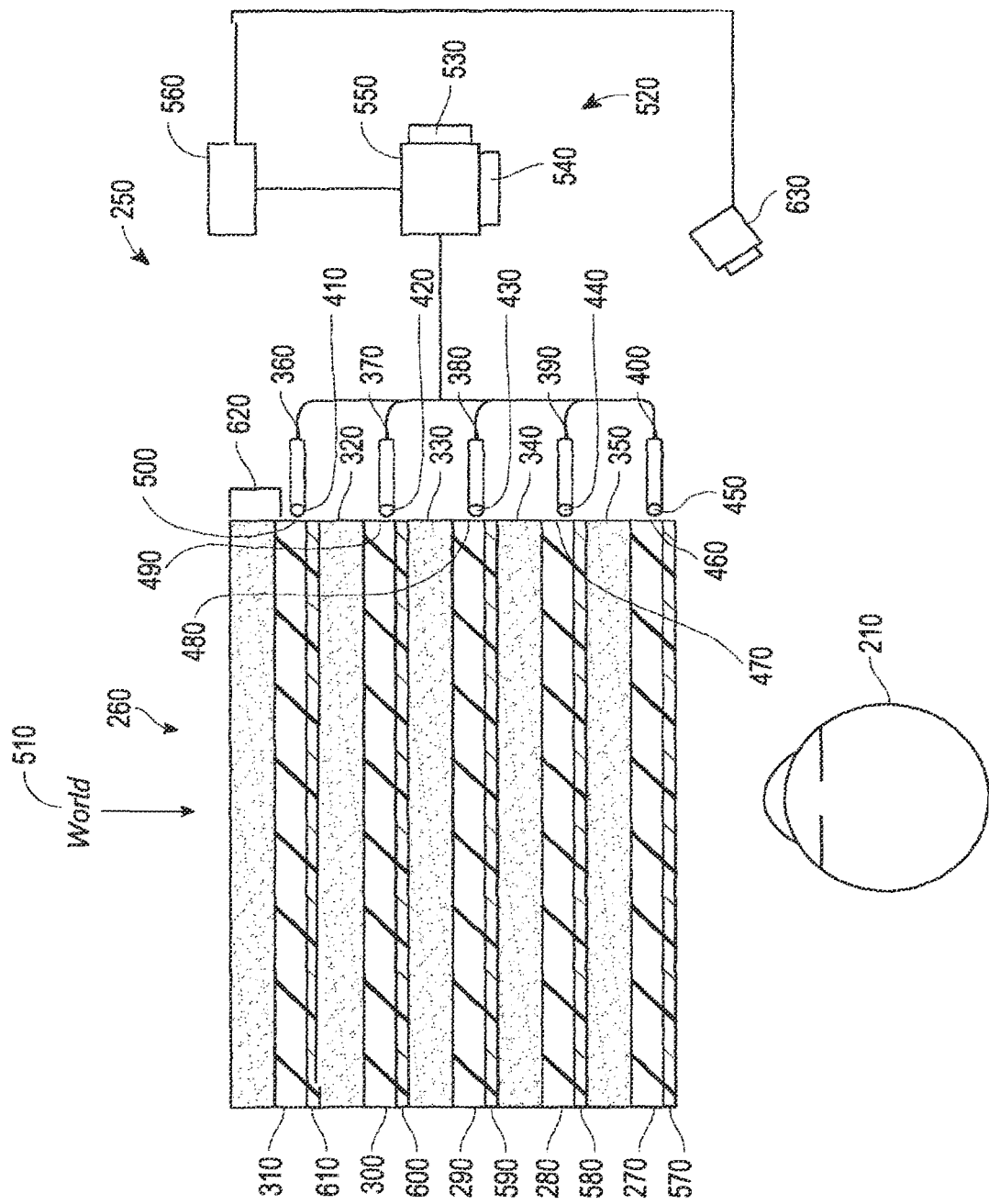
FIG. 6 illustrates an example of a waveguide stack for outputting image information to a user, according to some embodiments.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments. In addition, the waveguide assembly 260 may also be referred to as an eyepiece.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray, divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 540, which may include a light emitter, such as a light emitting diode (LED). The light from the light module 540 may be directed to and modified by a light modulator 530, e.g., a spatial light modulator, via a beam splitter 550. The light modulator 530 may be configured to change the perceived intensity of the light injected into the waveguides 270, 280, 290, 300, 310. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 540 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 540, and the light modulator 530. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via UR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630. In some embodiments, one camera assembly 630 may be utilized for each eye, to separately monitor each eye.

Figure 7:
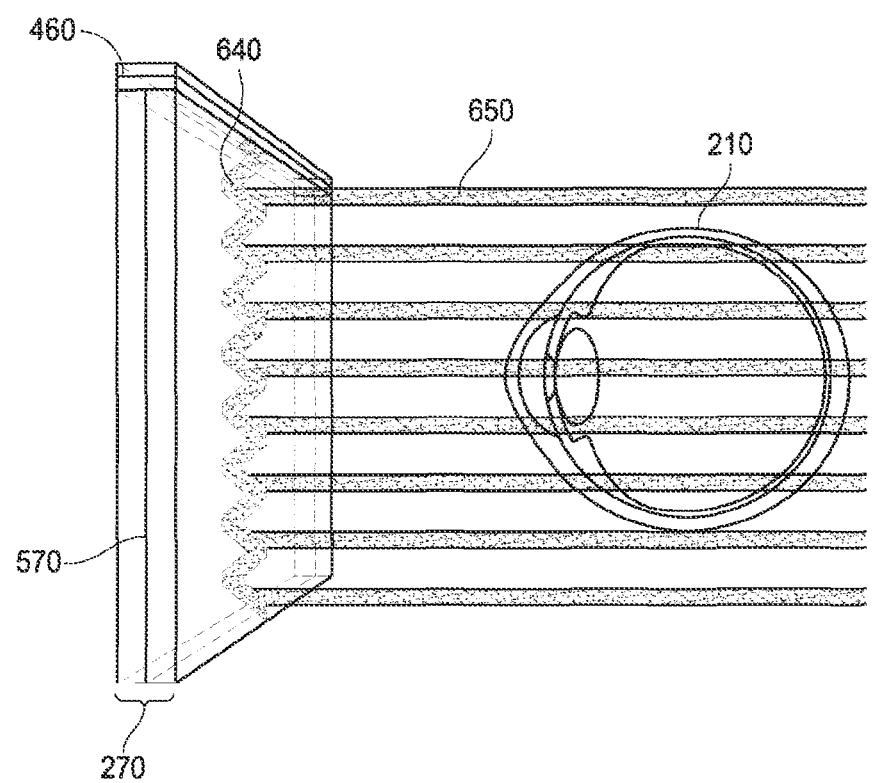
FIG. 7 illustrates an example of exit beams outputted by a waveguide, according to some embodiments.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
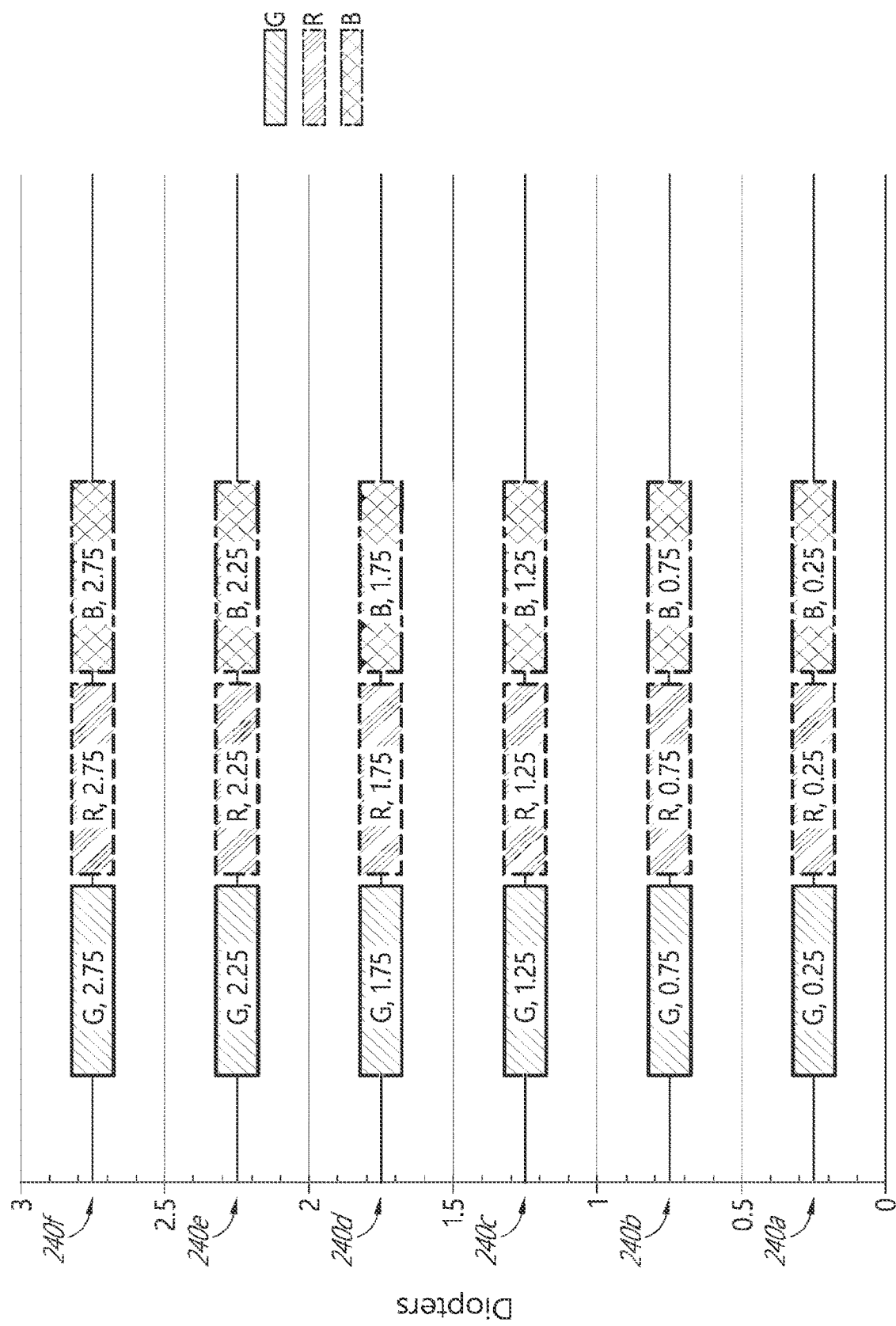
FIG. 8 illustrates an example of a stacked waveguide assembly in which each depth plane includes images formed using multiple different component colors, according to some embodiments.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and Be Just as examples, the numbers following each of these letters indicate diopters (l/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 540 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
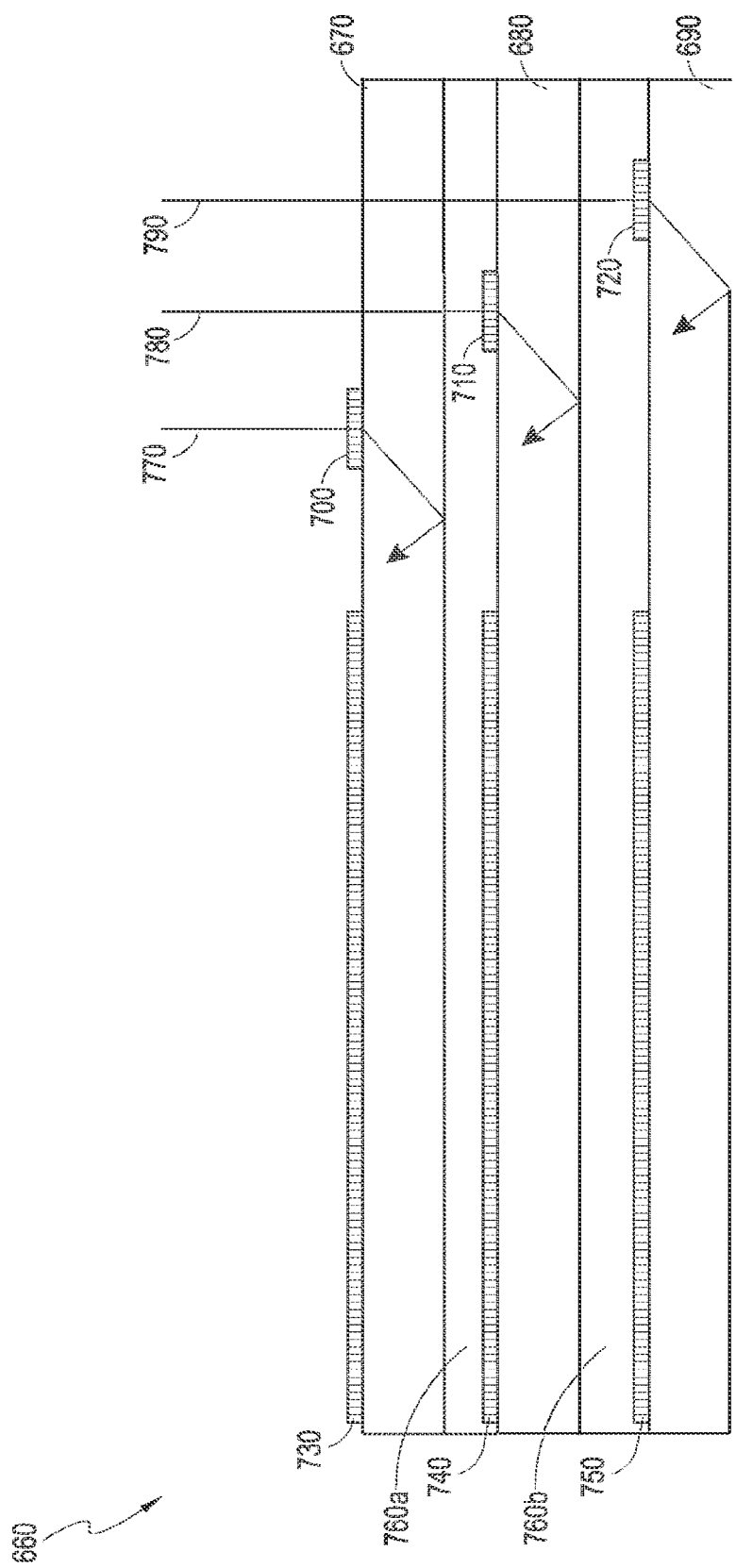
FIG. 9A illustrates a cross-sectional side view of an example of a set of stacked waveguides that each includes an in-coupling optical element, according to some embodiments.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. The waveguide 670 is forward of, or closer to a source of image light than the waveguide 680, and the waveguide 690 is rearward of, or farther from the source of image light than the waveguide 680. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). A illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may, separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6). The light rays 770, 780, 790 may constitute image light, light encoded with image information. For example, the light may have been spatially modulated or otherwise provided with different intensities and/or different wavelengths at different locations to, e.g., form pixels forming an image.

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
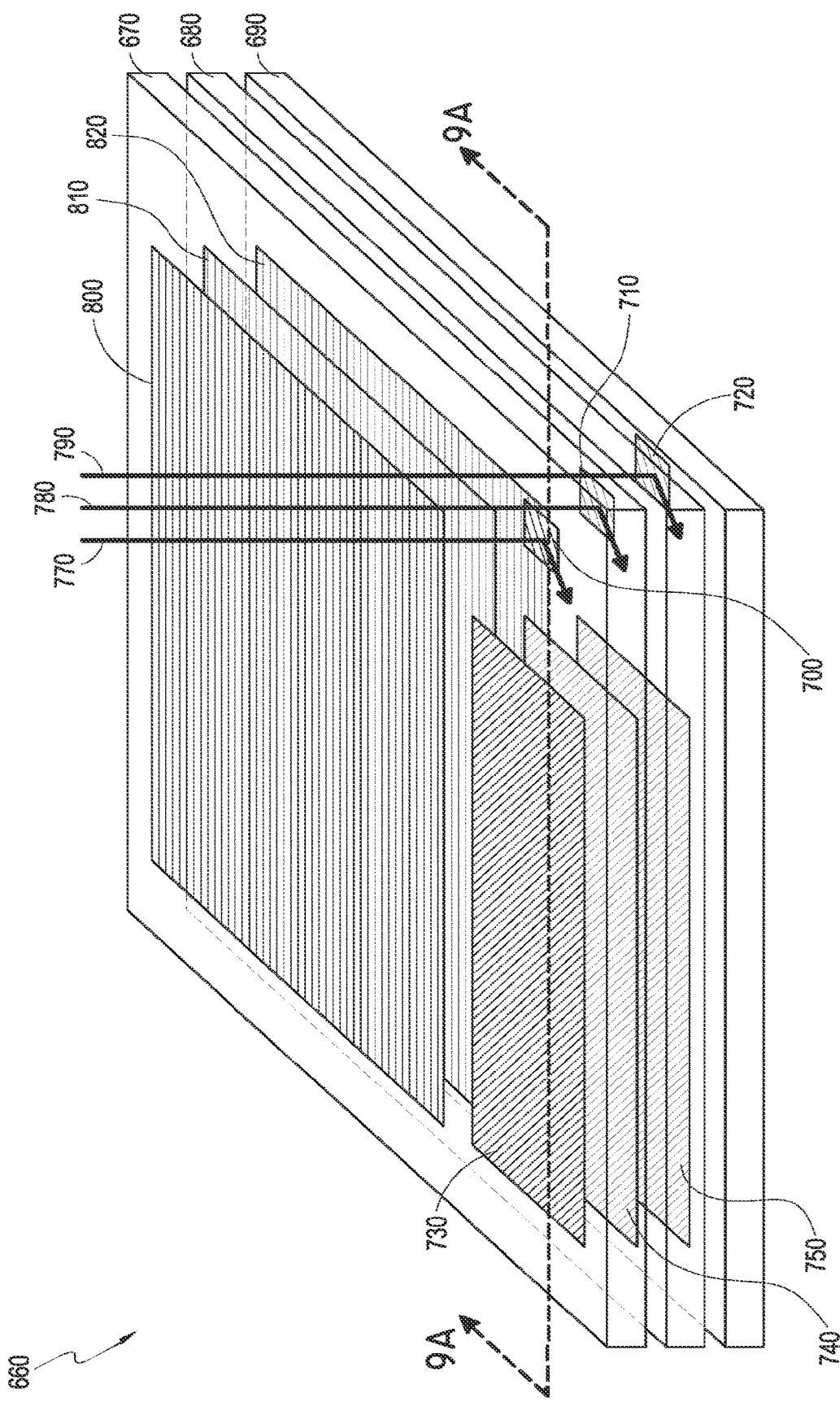
FIG. 9B illustrates a perspective view of an example of the set of stacked waveguides of FIG. 9A, according to some embodiments.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
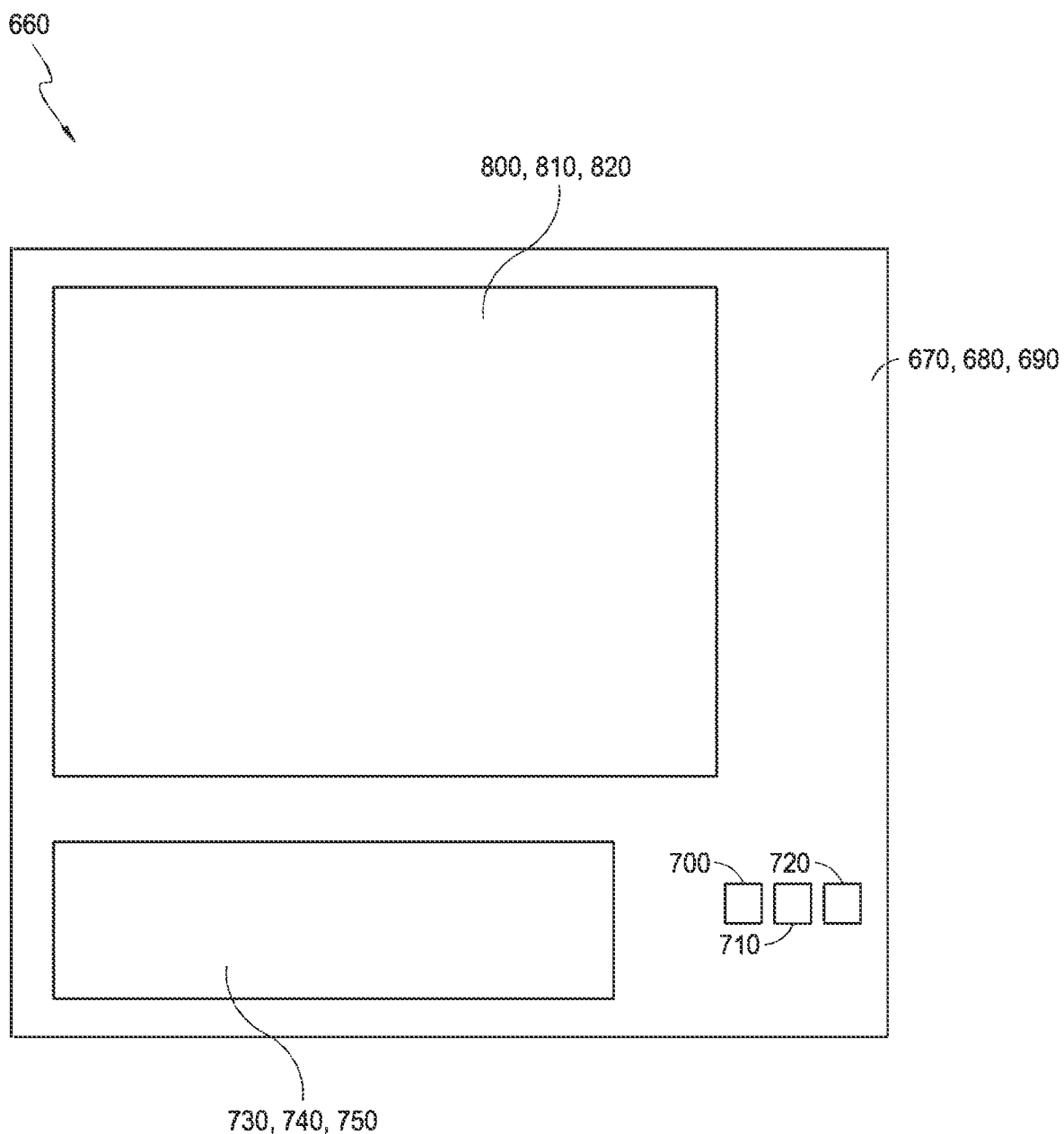
FIG. 9C illustrates a top-down plan view of an example of the set of stacked waveguides of FIGS. 9A and 9B, according to some embodiments.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different sources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted or split pupil system, and the in-coupling optical elements within these arrangements may correspond to sub pupils.

As discussed above, various embodiments of the display system 60 or the display system 250 can comprise waveguides with high refractive index materials. For example, various embodiments of the display system 60 or the display system 250 can comprise one or more waveguides with materials having refractive index greater than refractive index of glass. In various embodiments of the display system 60 or the display system 250 can comprise one or more waveguides with materials having refractive index greater than or equal to about 1.79 and less than or equal to about 4.5. For example, various embodiments of the display system 60 or the display system 250 can comprise one or more waveguides with materials having refractive index greater than or equal to 1.8 and less than or equal to 2.1, greater than or equal to 2.1 and less than or equal to 2.2, greater than or equal to 2.2 and less than or equal to 2.3, greater than or equal to 2.3 and less than or equal to 2.4, greater than or equal to 2.4 and less than or equal to 2.5, greater than or equal to 2.5 and less than or equal to 2.6, greater than or equal to 2.6 and less than or equal to 2.7, greater than or equal to 2.7 and less than or equal to 2.8, greater than or equal to 2.8 and less than or equal to 2.9, greater than or equal to 2.9 and less than or equal to 3.0, greater than or equal to 3.0 and less than or equal to 3.1, greater than or equal to 3.1 and less than or equal to 3.2, greater than or equal to 3.2 and less than or equal to 3.3, greater than or equal to 3.3 and less than or equal to 3.4, greater than or equal to 3.4 and less than or equal to 3.5, greater than or equal to 3.5 and less than or equal to 3.6, greater than or equal to 3.6 and less than or equal to 3.7, greater than or equal to 3.7 and less than or equal to 3.8, greater than or equal to 3.8 and less than or equal to 3.9, greater than or equal to 3.9 and less than or equal to 4.0, greater than or equal to 4.0 and less than or equal to 4.2, greater than or equal to 4.0 and less than or equal to 4.4, greater than or equal to 4.0 and less than or equal to 4.5, or any value in any range/sub-range defined by these values. Without any loss of generality, the high refractive index materials contemplated in this application can be transparent to visible light. For example, the high refractive index materials contemplated in some implementations in this application can be configured to transmit visible light in a spectral range between about 450 nm and about 750 nm with efficiency greater than or equal to about 80% or 90%. Fresnel reflection may occur, however, at the interface of the waveguide in certain implementations.

As discussed above, various embodiments of display system 60 or the display system 250 comprising one or more waveguides with high refractive index materials (e.g., with refractive index greater than refractive index of glass and/or with refractive index greater than or equal to about 1.79) can have increased field of view as compared to embodiments of display system 60 or the display system 250 comprising one or more waveguides with glass and/or materials with refractive index less than about 1.79. Furthermore, as discussed above, multiple colors or wavelengths of light (e.g., two or possibly three colors) can be concurrently coupled into a single waveguide comprising a high refractive index material. Accordingly, various embodiments of display system 60 or the display system 250 can comprise different waveguides associated with different depth planes. In some implementations, a waveguide associated with a depth plane can comprise a high refractive index material such that different colors such as three colors (e.g., red, green and blue wavelengths) of incident light can be coupled into that single waveguide and guide therein. Accordingly, the associated waveguide has the ability to project a multicolored image comprising light of different wavelengths (e.g., red, green and blue wavelengths) towards a viewer. Similarly, in some implementations, one waveguide associated with a depth plane can comprise a high refractive index material such that different colors such as two colors (e.g., red and green or green and blue wavelengths) of incident light can be coupled into that single waveguide and guide therein. Another waveguide associated with that depth plane may be configured such that at least one different color (e.g., blue, or red, respectively) can be coupled into that single waveguide and guided therein. This waveguide may also comprise a high refractive index material. The combination of waveguides for that depth plane or depth therefore has the ability to project a multicolored image comprising light of different wavelengths (e.g., red, green and blue wavelengths) towards a viewer. One or more other waveguides configurations may be used for other depth planes or depths. The various high refractive index materials contemplated in this application comprise materials such as, for example, lithium niobate ($LiNbO_3$) having a refractive index of about 2.3 or silicon carbide have an index of refraction above 2.7, or other similar materials and possibly even material having higher refractive indices.

As discussed above, one or more waveguides in various implementations of display system 60 or the display system 250 can comprise in-coupling optical elements (e.g., in-coupling optical elements 700, 710, 720) to in-couple light into one or more waveguides and/or out-coupling optical elements (e.g., 570, 580, 590, 800, 810, 820) from the one or more waveguides. In various embodiments of display system 60 or the display system 250, one or more waveguides can comprise light distributing elements (e.g., light distributing elements 730, 740, 750). In various embodiments, the light distributing elements (e.g., light distributing elements 730, 740, 750) can be configured as orthogonal pupil expanders (OPEs) and/or the out-coupling elements (e.g., 800, 810, 820) can be configured as exit pupil expanders (EPEs), or as a combined pupil expander (CPE) exhibiting the functionality of both orthogonal expansion and out-coupling. Eyepieces may include any one or combination of in-coupling optical elements (ICGs), orthogonal pupil expanders (OPEs), exit pupil expanders (EPEs), and combined pupil expanders (CPEs). Accordingly, a wide range of configurations are possible. For example, some eyepieces do not include an orthogonal pupil expander (OPEs). The in-coupling optical elements, the out-coupling optical elements and the light distributing elements can comprise diffractive features. The diffractive optical elements can comprise micro-scale and/or nano-scale features. Without any loss of generality, the in-coupling optical elements, the out-coupling optical elements and/or the light distributing elements can be provided on one or both surfaces (e.g., major surface, front and back surface, etc.) of the waveguides in different embodiments of the display system 60 or the display system 250. For example, various embodiments of waveguides described in this application can have diffractive structures disposed on both surfaces (e.g., major surface, front and back surface, etc.) of a waveguide, or all disposed on a single surface and even overlapping on a single surface.

Use of one or more waveguides comprising high refractive index materials (e.g., refractive index greater than the refractive index of glass and/or refractive index greater than about 1.79) in a viewing optics assembly architecture for a mixed reality system can advantageously provide for waveguide stacks with reduced number of optical interfaces and waveguide layers and potentially allow use of low-cost, light weight virtual image focal distance shifting elements, increase or maximize transparency of the waveguide stack, reduce or minimize manufacturing costs, or reduce or minimize form-factor, weight and/or mass of the waveguide stack or potentially provide any combination of these features.

Accordingly, various embodiments of display systems (e.g., headmounted AR/VR display devices) described in this application comprise one or more waveguides comprising a high refractive index material (e.g., refractive index greater than 1.79, such as, for example, refractive index greater than or equal to about 2.3). The one or more waveguides comprise top and bottom major surfaces and a plurality of edges between the top and bottom major surfaces. The one or more waveguides can further comprise in-coupling optical elements (e.g., in-coupling optical elements similar to in-coupling optical elements 700, 710, 720) that are configured to in-couple different colored image light emitted from an imaging system (e.g., microdisplay and/or projector) and out-coupling optical elements (e.g., out-coupling optical elements similar to elements 570, 580, 590, 800, 810, 820) that are configured to project in-coupled light towards a wearer's eyes. In some embodiments, the one or more waveguides can further comprise light distributing elements (e.g., light distributing elements similar to light distributing elements 730, 740, 750). As discussed above, one or more of the in-coupling optical elements, out-coupling optical elements, and the light distributing elements can comprise diffraction gratings. In various embodiments, the diffraction gratings can comprise micro-scale or nano-scale features. The diffraction gratings can comprise surface or volume features. Without any loss of generality, the in-coupling optical elements, out-coupling optical elements, and the light distributing elements can be provided on one or both the major surfaces of the one or more waveguides.

As discussed above, in various embodiments of display systems (e.g., headmounted AR/VR display devices) described in this application, one or more in-coupling optical elements can be configured to in-couple two or more different colored light streams including image information emitted from the imaging system (e.g., microdisplay and/or projector) into a single waveguide comprising a high refractive index material (e.g., refractive index greater than 1.79, such as, for example, refractive index greater than or equal to about 2.3) such that the in-coupled light of different colors propagate within the single waveguide by total internal reflection. For example, in some embodiments, first, second, and third (e.g., red, green and blue) colored light streams including image information can be in-coupled into one or two waveguides comprising a high refractive index material (e.g., refractive index greater than 1.79, such as, for example, refractive index greater than or equal to about 2.3) such that the in-coupled first, second, and third (e.g., red, green and blue) light propagate within the corresponding waveguide by total internal reflection. For example, in some such embodiments, the first, second, and third (e.g., red, green and blue) colored light streams including image information can be in-coupled into the single waveguide comprising a high refractive index material (e.g., refractive index greater than 1.79, such as, for example, refractive index greater than or equal to about 2.3).

As discussed above, light projected out of a waveguide comprising high refractive index (e.g., refractive index greater than 1.79, such as, for example, refractive index greater than or equal to about 2.3) can have increased field of view through which light is output by the waveguide and consequently through which the viewer can see virtual image content. The field of view can vary based on the refractive index of the material of the waveguide and the number of wavelengths in-coupled into the waveguide. Table 1A and Table 1B below include calculated values for the vertical and horizontal field of view in degrees provided by various embodiments of waveguides for head-mounted AR/VR display devices comprising material with refractive index between about 1.73 and about 2.3 when light of one (1) or single color, two (2) or dual colors (e.g., green and blue or red and blue) and three (3) or triple colors (e.g., red, green and blue) are in-coupled into the waveguide.

TABLE 1A

Calculated values for vertical and horizontal field of view in degrees provided by a various embodiments of waveguides for a head-mounted AR/VR display device comprising a material with refractive index between about 1.73 and about 2.3 when light of one (1) or single color, two (2) or dual colors (e.g., green and blue or red and blue) and three (3) or triple colors (e.g., red, green and blue) are in-coupled into the waveguide.

| Refractive Index | Single Color | | | | Green/Blue Dual Color | | Red/Blue Dual Color | | Red/Green/Blue Triple Color | |
|---|---|---|---|---|---|---|---|---|---|---|
| | Horizontal | Vertical | Physical Diagonal | Marketing Diagonal | Horizontal | Vertical | Horizontal | Vertical | Horizontal | Vertical |
| 1.73 | 41.6 | 50.9 | 62.7 | 65.8 | 31.0 | 37.9 | 28.5 | 34.8 | 17.3 | 21.1 |
| 1.78 | 44.7 | 54.7 | 66.9 | 70.6 | 33.8 | 41.2 | 31.2 | 38.1 | 19.7 | 24.1 |
| 1.79 | 45.3 | 55.5 | 67.7 | 71.6 | 34.4 | 41.9 | 31.8 | 38.8 | 20.2 | 24.7 |
| 1.85 | 49.0 | 60.1 | 72.7 | 77.5 | 37.7 | 46.0 | 35.0 | 42.8 | 23.2 | 28.2 |
| 1.92 | 53.5 | 65.5 | 78.5 | 84.6 | 41.7 | 50.8 | 38.9 | 47.5 | 26.6 | 32.5 |
| 1.95 | 55.4 | 67.9 | 81.0 | 87.6 | 43.4 | 52.9 | 40.6 | 49.5 | 28.1 | 34.3 |

TABLE 1A-continued

Calculated values for vertical and horizontal field of view in degrees provided by a various embodiments of waveguides for a head-mounted AR/VR display device comprising a material with refractive index between about 1.73 and about 2.3 when light of one (1) or single color, two (2) or dual colors (e.g., green and blue or red and blue) and three (3) or triple colors (e.g., red, green and blue) are in-coupled into the waveguide.

| Refractive | Single Color | | | | Green/Blue Dual Color | | Red/Blue Dual Color | | Red/Green/Blue Triple Color | |
|---|---|---|---|---|---|---|---|---|---|---|
| Index | Horizontal | Vertical | Physical Diagonal | Marketing Diagonal | Horizontal | Vertical | Horizontal | Vertical | Horizontal | Vertical |
| 1.97 | 56.7 | 69.5 | 82.6 | 89.7 | 44.5 | 54.3 | 41.7 | 50.9 | 29.1 | 35.5 |
| 2.05 | 62.0 | 75.9 | 89.1 | 98.0 | 49.2 | 60.0 | 46.2 | 56.4 | 33.1 | 40.4 |
| 2.3 | 79.6 | 97.5 | 109.4 | 125.8 | 64.3 | 78.4 | 60.9 | 74.3 | 45.9 | 56.1 |

TABLE 1B

Calculated values for vertical and horizontal field of view in degrees provided by various embodiments of waveguides for a head-mounted AR/VR display device comprising a material with refractive index between about 1.73 and about 2.3 when light of one (1) or single color, two (2) or dual colors (e.g., green and blue or red and blue) and three (3) or triple colors (e.g., red, green and blue) are in-coupled into the waveguide.

| Refractive | Single Color | | | | Green/Blue Dual Color | | Red/Blue Dual Color | | Red/Green/Blue Triple Color | |
|---|---|---|---|---|---|---|---|---|---|---|
| Index | Horizontal | Vertical | Physical Diagonal | Marketing Diagonal | Horizontal | Vertical | Horizontal | Vertical | Horizontal | Vertical |
| 1.73 | 41.6 | 41.6 | 56.5 | 58.8 | 31.0 | 31.0 | 28.5 | 28.5 | 17.3 | 17.3 |
| 1.78 | 44.7 | 44.7 | 60.3 | 63.2 | 33.8 | 33.8 | 31.2 | 31.2 | 19.7 | 19.7 |
| 1.79 | 45.3 | 45.3 | 61.1 | 64.0 | 34.4 | 34.4 | 31.8 | 31.8 | 20.2 | 20.2 |
| 1.85 | 49.0 | 49.0 | 65.6 | 69.4 | 37.7 | 37.7 | 35.0 | 35.0 | 23.2 | 23.2 |
| 1.92 | 53.5 | 53.5 | 70.9 | 75.6 | 41.7 | 41.7 | 38.9 | 38.9 | 26.6 | 26.6 |
| 1.95 | 55.4 | 55.4 | 73.2 | 78.4 | 43.4 | 43.4 | 40.6 | 40.6 | 28.1 | 28.1 |
| 1.97 | 56.7 | 56.7 | 74.7 | 80.2 | 44.5 | 44.5 | 41.7 | 41.7 | 29.1 | 29.1 |
| 2.05 | 62.0 | 62.0 | 80.7 | 87.7 | 49.2 | 49.2 | 46.2 | 46.2 | 33.1 | 33.1 |
| 2.3 | 79.6 | 79.6 | 99.3 | 112.5 | 64.3 | 64.3 | 60.9 | 60.9 | 45.9 | 45.9 |

It is noted from Tables 1A and 1B that as the refractive index of the material of the waveguide increases, the vertical and horizontal field of view in degrees also increases. For example, waveguides comprising materials having refractive index greater than about 1.79 have a horizontal field of view greater than about 20.2 degrees and a vertical field of view greater than about 20.2 degrees depending on whether light of one (1) or single color, two (2) or dual colors (e.g., green and blue or red and blue) and three (3) or triple colors (e.g., red, green and blue) are in-coupled into the waveguide. It is further noted from Table 1A that the horizontal and vertical field of view in degrees provided by the various embodiments of waveguides of a head-mounted AR/VR display device comprising a material with refractive index of about 2.3 (e.g., Lithium Niobate) when light of all three (3) colors (e.g., red, green and blue) are in-coupled into the waveguide is about 45.9 and 56.1, respectively, which is approximately a diagonal field of view of about 70 degrees. Thus, embodiments of eyepiece comprising waveguide including a material with refractive index of about 2.3 (e.g., Lithium Niobate) or higher (e.g. silicon carbide) are an attractive solution to obtain display devices with an increased field of view.

In addition to having high refractive index, Lithium Niobate has other advantages. For example, Lithium Niobate is commonly available in wafer form, is optically transparent to visible light and has low scatter. Although Lithium Niobate may not have been previously considered a leading candidate as a substrate material on which large area surface relief leaky grating structures such as the grating structures used in ICGs, EPEs and OPEs for mixed-reality eyepieces, gratings can be fabricated as described herein for use in head mounted displays. One reason Lithium Niobate may be less desirable as a substrate material on which grating structures used in ICGs, EPEs and OPEs can be fabricated can be attributed, at least in part, to the difficulty in producing large area grating structures economically. The ferro-electric and pyro-electric properties of Lithium Niobate present difficulties in fabricating large-area grating structures using an etch mask obtained by jet-deposition of a resist layer and patterning the resist layer. Nevertheless, Lithium Niobate processing methods as described herein can be used to fabricate large area grating structures. Additional discussion on methods of fabricating Lithium Niobate is included below.

Such high index waveguides may be advantageously included in optical systems used in head mounted displays such as shown in FIG. 10. FIG. 10 illustrates an example of a display system 1000 comprising an imaging system 1001, a waveguide 1003 comprising a high refractive index material (e.g., refractive index greater than about 1.79), and a plurality of variable focus elements 1005a and 1005b. The imaging system 1001 comprises a projection optics system 1009, illumination optics systems 1011 which provides three colors (e.g. red, green and blue light), and a spatial light modulating element 1013 that modulates the light (e.g., red, green and blue light) emitted from the illumination optics systems 1011 to form light streams including image information. The three different color (e.g., red, green and blue) light streams modulated by the spatial light modulator including image information are output from a single output pupil of the projection optics system 1009. The three different color (e.g. red, green and blue) light streams including image information exiting from the single output pupil of the projection optics system 1009 are received by one or more in-coupling optical elements associated with the waveguide 1003 and diffracted such that the three color (e.g., red, green and blue) light streams including image information is in-coupled into the waveguide 1003. As discussed above, in various implementations, the one or more in-coupling optical elements can be aligned (e.g., vertically aligned) with the single output pupil of the projection optics system 1009 such that at least a portion of the one or more in-coupling optical elements overlaps with the single output pupil of the projection optics system 1009 in a top-down view.

In certain implementations, the imaging system 1001 can comprise a low-mass, compact microdisplay. In some implementations, the imaging system 1001 can comprise either a mixed-color pupil, a closely spaced red-green-blue ("RGB") sub-pupil set, or an internal pupil (as in a MEMs system, where the pupil resides at the scanning mirror plane). In various embodiments, the imaging system 1001 may have features similar to any of the imaging systems discussed below with reference to FIGS. 11-17B.

The waveguide 1003 can comprise a material having a refractive index greater than or equal to about 2.3, such as, for example Lithium Niobate. When the waveguide 1003 comprises Lithium Niobate, the diagonal field of view of light output from the waveguide can be approximately 70° for red, green and blue wavelengths. In some implementations, the display system 1000 can comprise two waveguides instead of a single waveguide 1003. For example, a first of the two waveguides can be configured to in-couple one or two different colored light streams including image information (e.g., red colored image stream or red and green colored image streams) and the second of the two waveguides can be configured to in-couple another one or two different colored light streams including image information (e.g., blue and green colored image streams, or a blue colored image stream, respectively). In some implementations wherein the first waveguide includes two different color light streams, the second of the two waveguides can be configured to in-couple one colored light streams different than the colors in the first waveguide and one light stream the same or a similar color as included in the first waveguide (e.g., green and blue colored image stream or red and blue colored image streams).

The system 1000 can be configured as an infinity-focused system that presents the viewer or the viewer's eye 1007 with a non-powered real-world view along with a virtual image that is at some position other than infinity. The variable focus elements 1005a and 1005b provide the ability to shift the virtual image focal plane. The variable focus element 1005a can be configured as a positive continuously-variable focus element and the variable focus element 1005b can be configured as a negative continuously-variable focus element. In various embodiments, the variable focus elements 1005a and 1005b can comprises a liquid-filled vari-focal lens pair. In some embodiments, the variable focus elements 1005a and 1005b can comprise a liquid-crystal (LC) based pixelated programmable Fresnel lens pair. The negative focus element 1005b can be configured to shift the virtual image position, and the positive focus element 1005a can be configure to neutralize the optical power of the negative focus element 1005b for the real world as seen through the pair of variable focus elements 1005a and 1005b simultaneously. Light projected out of the waveguide 1003 only traverses the negative focus element 1005b. This approach and combination of elements can produce a continuum of focal planes, depth planes or depths, depending on the specific capabilities of the vari-focal elements 1005a and 1005b. Example near and far planes are shown in FIG. 10. A switch or control module is schematically show coordinating the spatial light modulator 1013 with the vari-focal elements 1005a and 1005b such the various images are presented at the appropriate depths. The integrated stack, comprising the variable focus elements 1005a and 1005b and the single waveguide 1003 can be made to be sufficiently thin, and low mass depending primarily on the capability to miniaturize the variable focus elements 1005a and 1005b. Without any loss of generality, the integrated stack, comprising the variable focus elements 1005a and 1005b and the single waveguide 1003 can be referred to as an eyepiece when the display system 1000 is included in a head mounted display. In some implementations, the eyepiece may be an infinity focused eyepiece, designed to have a focus in the far distance in at least one state.

The design of the display system 1000 illustrated in FIG. 10 can advantageously provide a substantially small microdisplay, since only a single pupil with mixed color is used, and focal plane shifting is accomplished entirely by the liquid-lens pair or liquid crystal ("LC")-based programmable lens pair. However, in some implementations, the weight of the display system 1000 may be increased as a result of the increased weight of liquid-lens or programmable Fresnel lens systems. Additionally, the use of liquid-lens or programmable Fresnel lens systems may increase optical distortion. Additionally, the thickness of the integrated stack comprising the waveguide 1003 and the variable focus elements 1005a and 1005b can be increased due to the frame required to support the variable focus elements 1005a and 1005b.

FIG. 11 illustrates another embodiment of a display system 1100. The display system 1100 employs the imaging system 1001 discussed above as well as the waveguide 1003. Accordingly, various elements of the display system 1100 may be similar to the corresponding elements of the display system 1000. In the display system 1100, a switchable geometric-phase (GP) lens stack is used as the variable focus elements 1005a and 1005b instead of the liquid filled lens pair or the LC based pixelated programmable Fresnel lens pair. The display system 1100 can be potentially thinner and lighter than that display system 1000. However, because the geometric-phase (GP) lens stack operates only on polarized light, the display system 1100 can include a polarizer to filter the real-world light entering the system. The incorporation of the polarizer can cause a reduction in the brightness of the real-world light entering the system. For example, the incorporation of the polarizer can cause a reduction in the brightness of approximately 50% in some embodiments. Coupled with other losses from the GP lens stack total throughput of real-world light may be below 30% in some implementations. Additionally, scattering from the lenses in the GP lens stack may reduce optical performance below desirable levels in some embodiments. In addition, the attenuative properties of the display system 1100 may result in at least a partial inability of people in the vicinity to see the wearer's eyes thereby making eye-contact more difficult, potentially similar to the scenario of a person wearing sunglasses. The display system 1100 may also result in other artifacts induced by leakage of undiffracted light, and may involve use of switchable waveplates to change the relative optical power spanning the 2-4 available depth planes. In some embodiments, the display system 1100 can comprise two waveguides instead of a single waveguide 1003. A first of the two waveguides, for example, can be configured to in-couple one or two different colored light streams including image information (e.g., red colored image stream or red and green colored image streams) and the second of the two waveguides can be configured to in-couple another one or two different colored light streams including image information (e.g., blue and green colored image streams or blue colored image stream, respectively). In some implementations wherein the first waveguide includes two different color light streams, the second of the two waveguides can be configured to in-couple one colored light streams different than the colors in the first waveguide and one light stream the same or a similar color as included in the first waveguide (e.g., green and blue colored image stream or red and blue colored image streams).

Figure 12:
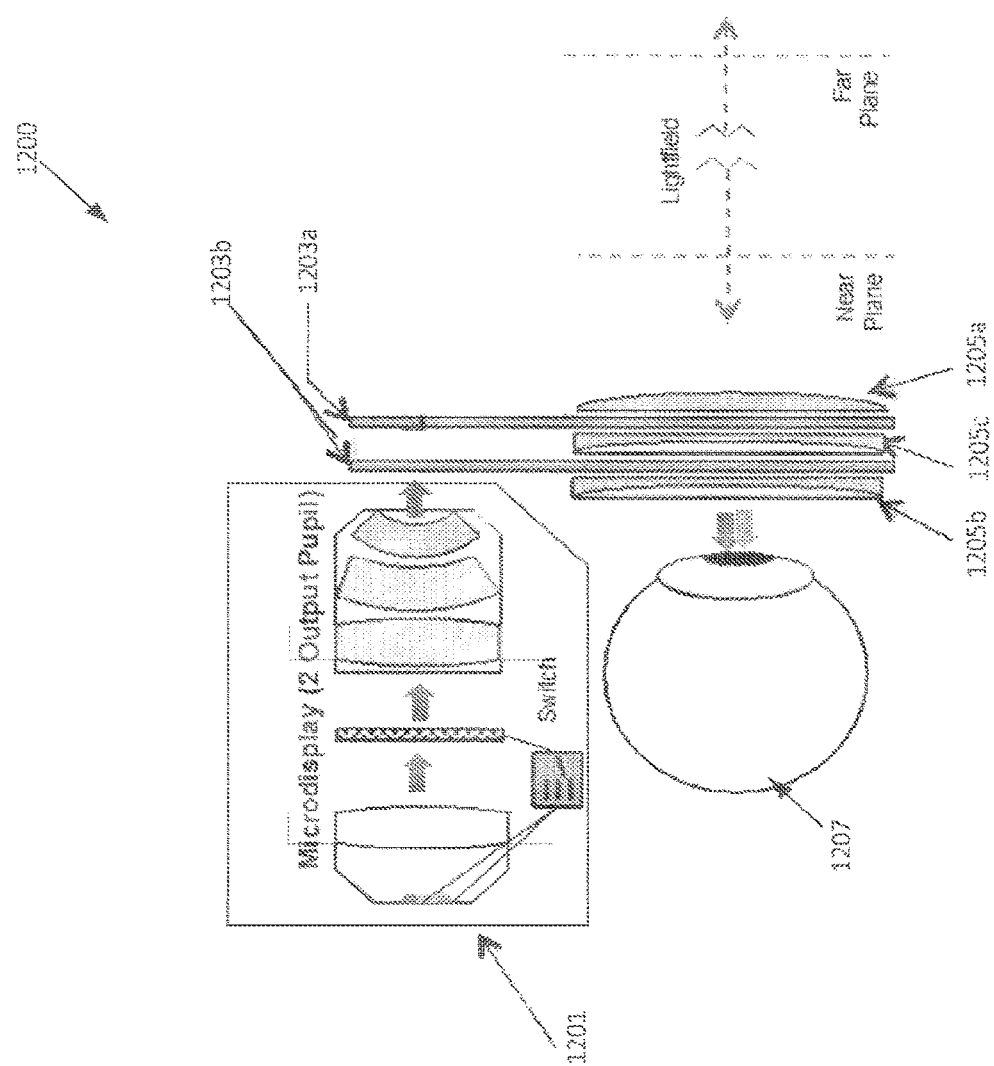
FIG. 12 illustrates an example of a display system comprising an imaging system and two waveguides comprising a high refractive index material, the two waveguides included in a waveguide assembly configured to provide at least one focal plane or depth.

FIG. 12 illustrates another embodiment of a display system 1200 comprising an imaging system 1201 and a waveguide comprising a high refractive index material. Various components of the imaging system 1201 can be similar to the corresponding components of the imaging system 1001. However, the projection optics system 1209 is configured to have two output pupils each configured to emit three colors, for example, first, second and third colors (e.g., red, green, and blue). A first output projector exit pupil is configured to emit the first, second, third (e.g., red, green and blue) light streams comprising image information for a first depth or focal plane, and a second projector exit pupil is configured to emit first, second, third (e.g., red, green and blue) light streams comprising image information for a second depth or focal plane. The first, second, third (e.g., red, green and blue) light streams comprising image information for a first depth or focal plane emitted from the first output pupil is in-coupled into a first waveguide 1203a of a waveguide assembly 1203. The first, second, third (e.g., red, green and blue) light stream comprising image information for a second depth or focal plane emitted from the second output pupil is in-coupled into a second waveguide 1203b of a waveguide assembly 1203. Accordingly, the embodiment of the display system 1200 is configured as a two depth-plane system, in which each depth plane is addressed by an independent waveguide pairing (a pairing of a waveguide with an optical power component such as a refractive lens or an optical element disposed on a surface of the waveguide to impart optical power associated with a depth plane). The waveguides 1203a and 1203b can be identical to each other in some embodiments. Similar to the waveguide 1003, the waveguides 1203a and 1203b can comprise a material having a high refractive index (e.g., refractive index greater than about 1.79, such as, for example, about 2.3). For example, in some embodiments, the waveguides 1203a and 1203b can comprise Lithium Niobate or silicon carbide. Similar to the waveguide 1003, the waveguides 1203a and 1203b can be infinity-focused. The variability in the focal position of light emitted from the waveguides 1203a and 1203b can be provided by static refractive lenses 1205a, 1205b, and 1205c (e.g., thin refractive lenses), for example, similar to those used in commonly in spectacles. The static refractive lens 1205b is positioned between the first waveguide 1203a and the wearer's eye 1207, the static refractive lens 1205c is positioned between the first waveguide 1203a and second waveguide 1203b, and the static refractive lens 1205a is positioned between the external world and the second waveguide 1203b. In some implementations, the gap between the first waveguide 1203a and the second waveguide 1203b can be sufficiently large to accommodate the static refractive lens 1205c but sufficiently small to reduce the form factor of the eyepiece comprising the waveguides 1203a and 1203b, and provide flexibility in working distance configurations and tolerances. For example, the gap between the first waveguide 1203a and the second waveguide 1203b can be between about 1.0 mm and about 1.5 mm in some implementations.

The refractive lenses 1205b and 1205c can be configured as negative powered lenses and the refractive lens 1205a is configured as positive powered lens. In the embodiment of the display system 1200 illustrated in FIG. 12, the refractive lens 1205b is a plano-concave lens having an optical power of −0.5 Diopter; the refractive lens 1205c is a plano-concave lens having an optical power of −1.5 Diopter; and the refractive lens 1205a is a plano-convex lens having an optical power of +2.0 Diopter. In some embodiments, the static refractive lenses may be molded. In some embodiments, the static refractive lenses can be formed by other manufacturing techniques. In some embodiments the static refractive lenses can be mass-produced from polymer (e.g., high refractive index polymers). In various embodiments, anti-reflection layer can be disposed over the static refractive lenses comprising polymer. For example, in some embodiments, the static refractive lenses comprising polymer can be coated with an anti-reflection layer/coating using inexpensive methods. Light from the first waveguide 1203a passes through the single negative refractive lens 1205b, and is focused at a distance according to the optical power of the single negative refractive lens 1205b. Light from the second waveguide 1203b passes through two negative refractive lenses 1205b and 1205c and is focused at a distance according to the combined optical power of the two negative refractive lenses 1205b and 1205c. The outer positive refractive lens 1205a negates the combination of the two negative refractive lenses 1205b and 1205c, resulting in a real world view that is not affected by lenses 1205b and 1205c.

The embodiment of the display system 1200 illustrated in FIG. 12 can make use of a multi-pupil microdisplay in order to address each layer independently (and thus, each depth plane or depth can have unique image content). As discussed above, in the example, the imaging system 1201 comprises two RGB-mixed output pupils that output image content for the two depth planes. It should be recognized that in various embodiments, the imaging system 1201 can be configured to output red (R), green (G) and blue (B) color components of the image for a particular depth plane through geometrically offset and separated R, G and B sub-pupils or at least partially-combined RGB sub-pupils (where at least two colors are input into the same waveguide using the same incoupling optical element). As discussed above, the reduction of the number of output sub-pupils in the imaging system can generally result in a significantly smaller projection optic and correspondingly a smaller imaging system, which can be an advantage for a wearable system. In various embodiments of the display system 1200, the imaging system 1201 can comprise two independent single-pupil microdisplays. The independent single-pupil microdisplays can be LCOS-based single pupil systems or independent MEMS scanner projectors. In such embodiments, each independent single-pupil microdisplay is configured to direct image light to a corresponding waveguide.

In some embodiments, the display system 1200 can comprise two waveguide assemblies for each depth plane instead of one waveguide per depth plane. For each depth plane, a first of the two waveguides can be configured to in-couple one or two different colored light streams including image information for that depth plane (e.g., red colored image stream or red and green colored image streams) and the second of the two waveguides can be configured to in-couple another one or two different colored light streams including image information for that depth plane (e.g., blue and green colored image streams or blue colored image stream, respectively). In some implementations wherein the first waveguide includes two different color light streams, the second of the two waveguides can be configured to in-couple one colored light streams different than the colors in the first waveguide and one light stream the same or a similar color as included in the first waveguide (e.g., green and blue colored image stream or red and blue colored image streams).

Figure 13:
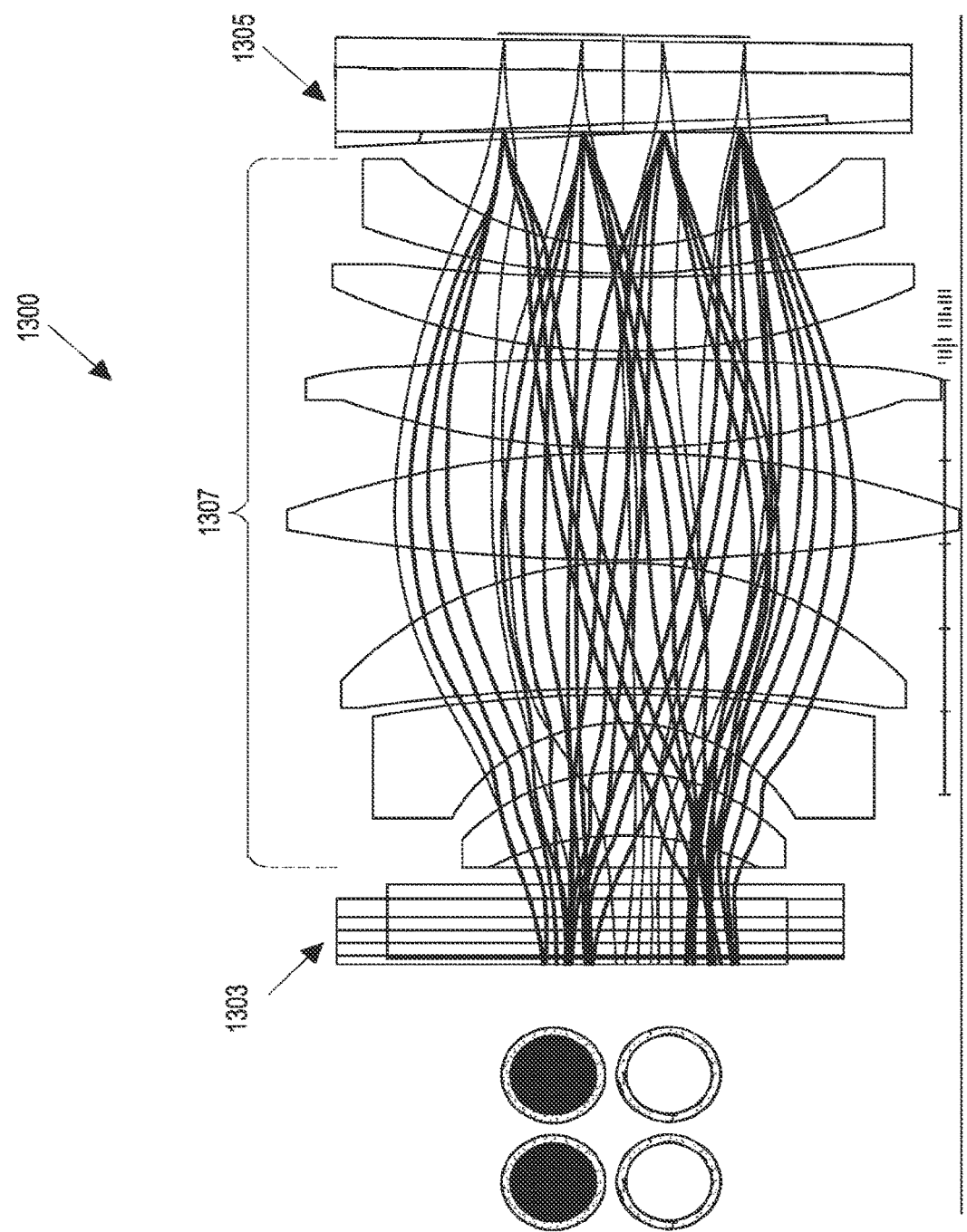
FIG. 13 illustrates an imaging system in which unmodulated illumination is input into the imaging system towards a reflective modulating element through a projection optics system such that modulated light including image information is reflected from the modulating element and transmitted back through the projection optics system towards a waveguide stack.

FIG. 13 illustrates an embodiment of an imaging system 1300 that is configured to provide multi-colored light streams comprising image information to a stack 1303 comprising one or more waveguides disposed on eyewear such as a head-mounted display so as to be positioned in front of a wearer's eye. In some embodiments, the one or more waveguides can comprise a high refractive index material (e.g., refractive index greater than about 1.79). In various embodiments, the stack 1303 can comprise one or more waveguides (e.g., waveguides comprising high refractive index material) for each depth plane. For example, the stack 1303 can comprise one waveguide comprising high refractive index material for each depth plane. The two waveguides can be configured to in-couple image light output from the imaging system 1300 have one or more different wavelengths such that the in-coupled image light propagates within the waveguide by total internal reflection. The one or more waveguides comprising high refractive index material can be further configured to project the in-coupled light to the viewer over a wide field of view (e.g., a horizontal field of view greater than about 20 degrees and a vertical field of view greater than about 20 degrees).

The imaging system is configured as a front lit imaging system in which multi-colored un-modulated illumination light is input into the imaging system via one or more input pupils towards a modulating element 1305 through a projection optics system 1307. The modulating element 1305 is reflective and is front lit by the illumination light from the projection optics system 1307. Modulated light including image information is reflected from the modulating element 1305 and transmitted through the projection optics system 1307 back towards the waveguide stack 1303 through one or more output pupils. In various embodiments, the imaging system 1300 can be configured to have two input pupils each configured to provide multi-colored illumination to produce images for two different depth or focal planes. In some such embodiments, the imaging system 1300 can similarly be configured to have two output pupils each configured to output multi-colored image light for two different depth or focal planes. Multi-colored image light for two different depth or focal planes emitted from the two output pupils can be directed towards the corresponding waveguides of the stack 1303. The imaging system illustrated in FIG. 13 has several advantages including but not limited to small size and/or possibly reduced number of pupils.

Other configurations are possible. For example, the stack 1303 can comprise two waveguides comprising high refractive index material for each depth plane. In one illustrative design, for example, a first of the two waveguides can be configured to in-couple one or more of first, second, or third colors such as red, green and blue colored image light (e.g., red colored image light or red and green colored image light or red and blue colored image light) output from the imaging system 1300 such that the in-coupled image light propagates within the waveguide by total internal reflection; and a second of the two waveguides can be configured to in-couple one or more of the first, second, or third colors such as red, green and blue colored image light (e.g., blue colored image light or blue and green colored image light or blue and red colored image light) output from the imaging system 1300 such that the in-coupled image light propagates within the waveguide by total internal reflection.

As discussed above, the design of the projection optics system (e.g., projection optics system 1107, 1207 and 1307) can be challenging especially when light from the projection optics system is desired to be output by a plurality of waveguides or waveguides assemblies. One difficulty encountered when designing such a projection optics system is a limited working distance (e.g., distance from the last optical surface of the projection optics system to a surface of the relevant waveguide). As discussed above, one advantage of employing waveguides comprising high refractive index material (e.g., refractive index greater than about 1.79) is the reduction in the number of waveguides that is used for each depth or focal plane (e.g., reducing the number of waveguides potentially from three per depth plane to one or two per depth plane). The reduction in the number of waveguides that results from using high refractive index material can provide a gain of additional working distance that can allow projection lens design options that were not practical in systems or eyepieces with large number of waveguides. Such gain of additional working distance and embodiments of display systems configured for an optimal working distance of its components, are further explained below with reference to FIGS. 14A-14E-3.

FIG. 14A illustrates a display system (e.g., an eyepiece of a head-mounted system) having first and second waveguides groups 1401 and 1403 for two depth planes. Each group of waveguides 1401, 1403 has three waveguides configured to receive a plurality of light beams across a wide range of angles from the projection optics, and in-couple said light into the waveguides for propagation by total internal reflection. For example, the plurality of light beams may be first, second, and third colors (such as red, blue and green light comprising image information for that depth plane) across a range of angles associated with a field of view of the display system.

Each waveguide in FIG. 14A may be thought of as having a respective working distance (the distance from the last optical surface of the projection optics system 1405 to a surface of that waveguide proximal to the subpupil, which may be the waveguide surface nearer or father to the projection optics system 1405). As depicted in FIG. 14A, the subpupils for the plurality of light beams at the leftmost and rightmost waveguides are larger as compared to the subpupils at the waveguides closer the to the middle of the waveguide stack, as the light beams are steered by the projection optics by narrowing and then widening light beam bundles carrying the image data at the angles for the field of view. Accordingly, the incoupling elements for those left most and right most waveguides must correspondingly be larger to capture all the light of the respective subpupil.

Large incoupling elements may, however, introduce image efficiency problems, such as reflecting some angles of light incoupled to the waveguide out of the waveguide through the same incoupling elements before propagation by total internal reflection begins. FIG. 14E-1 illustrates an example of a waveguide 1403 comprising an incoupling element 1416a having a size large enough to reflect some of the in-coupled light out of the waveguide 1403 through the same incoupling element 1416a. The phenomenon of outcoupling incoupled light through the same incoupling element is referred to herein as "rebounce". One way to reduce the risk of outcoupling incoupled light through the same incoupling element is to make the incoupling element smaller. FIG. 14E-2 illustrates an example of a waveguide 1403 comprising an incoupling element 1416b having a size smaller than the incoupling element 1416a. However, reducing the size of the incoupling element size solely to reduce the rebounce can reduce the amount of light the incoupling element may receive. For example, if a subpupil at a waveguide is larger than the incoupling element at that same waveguide, then some of the received light that is not incident on the incoupling element will not be incouples and will be lost.

Additionally, at each bounce during total internal reflection, some amount of imperfection in the construction of the waveguide introduces aberration to the light path, such that the greater number of bounces per waveguide, the further image quality degrades. This problem may be reduced with a thicker waveguide that can induce fewer bounces by total internal reflection. FIG. 14E-3 shows an example of a waveguide 1403c that is thicker than the waveguide 1403 of FIGS. 14E-1 and 14E-2. A thicker waveguide can have an incoupling element that is sufficiently large to receive all the incident light 1407 while reducing the risk of outcoupling the incoupled light through the incoupling element. However, increasing thickness for any one waveguide (much less all of them) would place the left most waveguide of the waveguide assembly 1401 FIG. 14A even further from projection optics system 1405 resulting in an even larger subpupil size and requiring an even larger incoupling elements, which would further exacerbate the efficiency problems as described above. As such, and as noted from FIG. 14A, the waveguide assembly of 1401 and 1403 has an overall limited working distance, as any change to a metric of a waveguide (such as thickness of a waveguide, or distance of the waveguide from projection optics system 1405) may negatively affect the subpupil size increase that would result.

FIG. 14B illustrates this if refractive lens 1409a were introduced between waveguide assemblies 1401 and 1403. By placing the refractive lens 1409a between the waveguide assemblies, the subpupil intersection on waveguide assembly 1401 is even further than in FIG. 14A, which would require thinner waveguides to maintain form factor (increasing the number of aberrations in the image by increased bounces) and/or larger incoupling elements to receive all angles at the new subpupil distance (reducing the efficiency of the waveguide). In other words, the placement of refractive lens 1409a which otherwise assists and improves depth cues for the viewer results in degraded image quality from the increased working distance.

By replacing the waveguides of first and second groups 1401 and 1403 with waveguides comprising high refractive index material, the number of waveguides in each group can be reduced from three per depth plane to one per depth plane as shown in FIG. 14C. In some embodiments, the number of waveguides can be reduced from three per depth plane to two per depth plane. This configuration can reduce the working distance of any one waveguide as the overall waveguide assembly is now thinner. Assuming, a waveguide thickness between about 300 and 400 microns per waveguide, FIG. 14C illustrates a recovery or "re-gain" of up to 1.2 mm in working distance as a result of reducing the number of waveguides for each depth plane with the high refractive waveguides of FIG. 14C. The configuration illustrated in FIG. 14C can have several additional advantages from the improved working distance(s). For example, smaller in-coupling gratings can be employed to in-couple light in the waveguides resulting from the smaller working distances (as between the waveguide and the projector); alternatively, because of the smaller beam sizes incident on the waveguides, or the thicknesses of the waveguides may be increased (which may actually increase the working distance) to refine the number of bounces by total internal reflection and reduce the number of angles susceptible to the "rebounce" problem of FIG. 14E-1. Such increase in waveguide thickness, though previously not desired due to the increase in working distance for successive waveguides in a stack, may have negligible performance effects as the working distance was already shortened. As another example, one or more additional depth planes can possibly be incorporated in the system as shown in FIG. 15 below.

Figures 3, 14D:
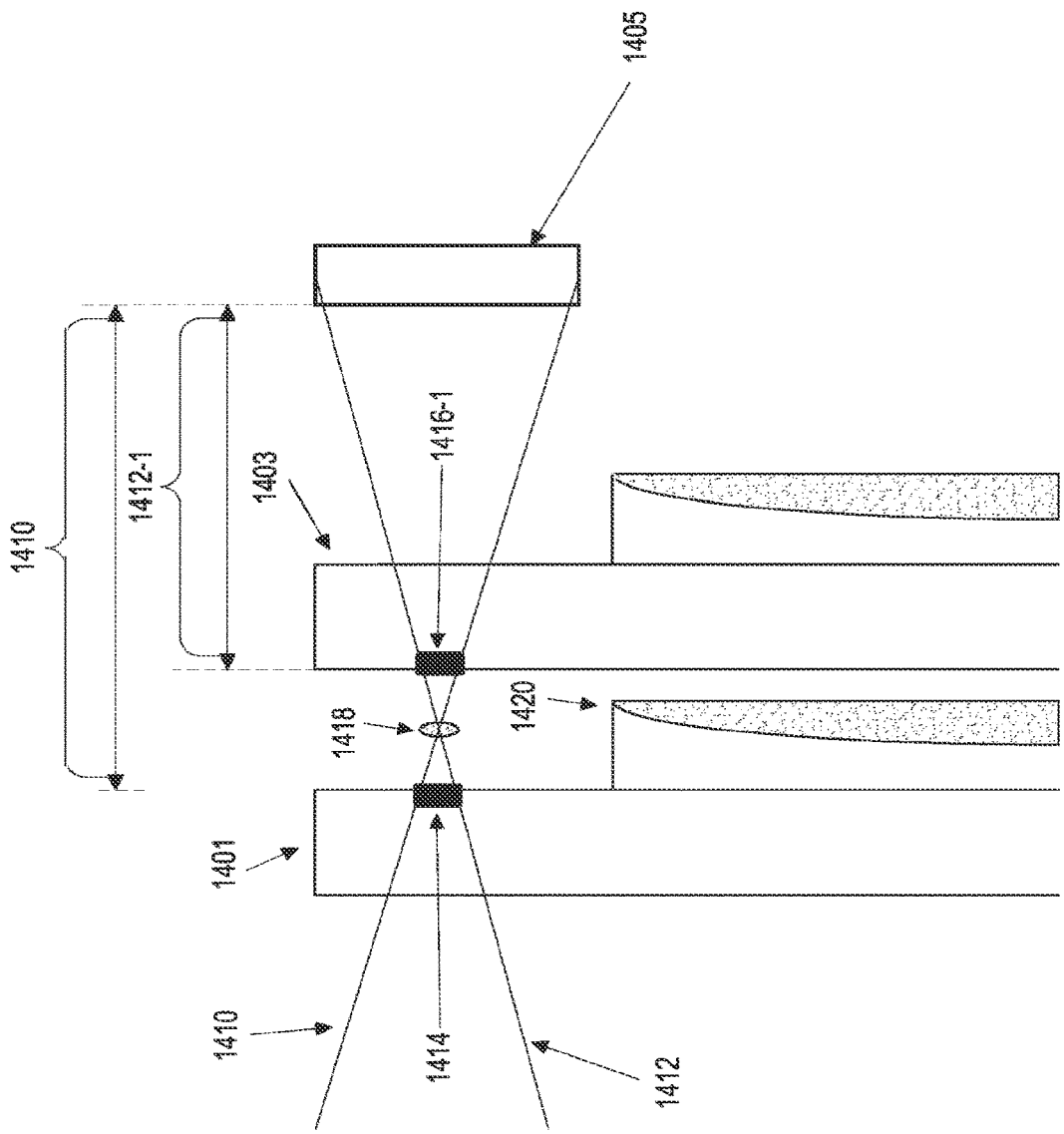
Figure 15:
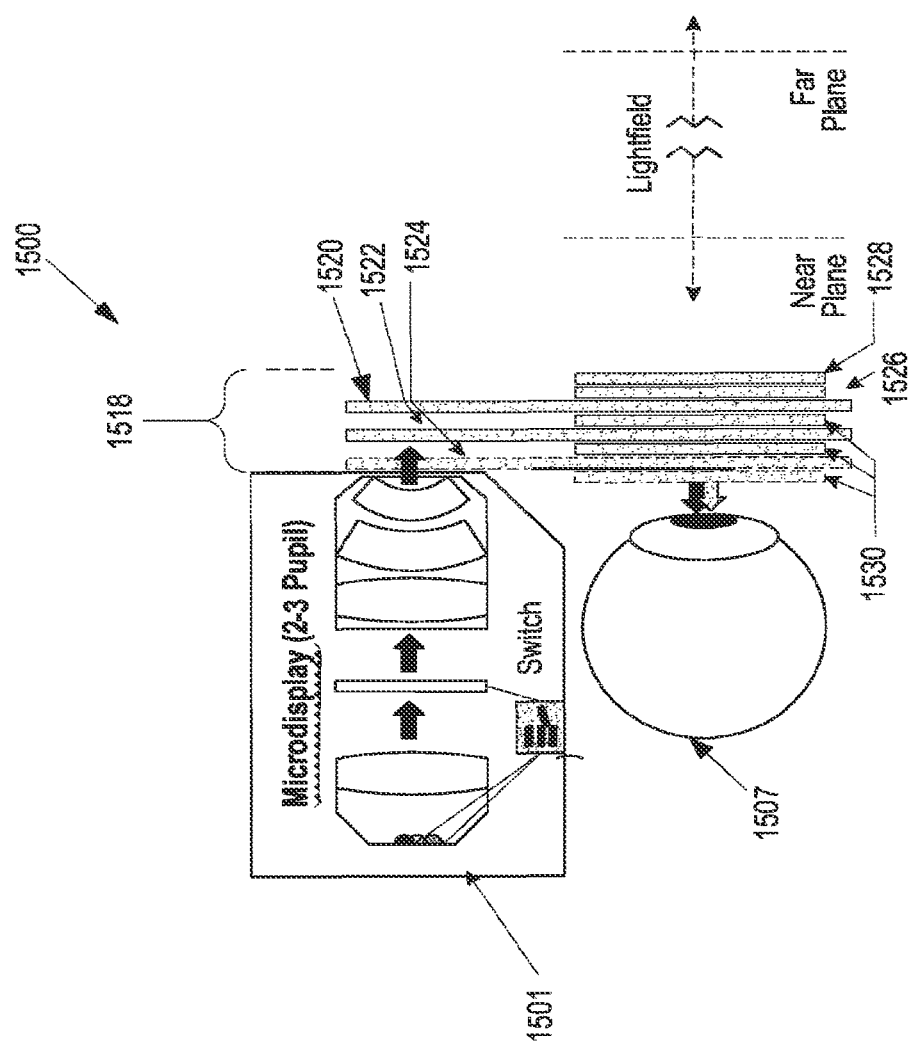
FIG. 15 illustrates an example of a display system comprising an imaging system and three waveguides comprising a high refractive index material, the three waveguides configured to provide three focal planes or depths.

FIGS. 14D-1, 14D-2, and 14D-3 illustrate embodiments of a display system comprising two waveguide pairings (a waveguide and refractive lens). FIG. 14D-1 illustrates a display system having transmissive incoupling elements 1414 and 1416, wherein light passes through the element before the waveguide, whereas FIG. 14D-2 illustrates a display system having reflective incoupling elements 1414-1 and 1416-1, wherein light enters the waveguide before interacting with the element; FIG. 14D-3 illustrates a display system utilizing both transmissive and reflective incoupling elements.

Each of FIGS. 14D-1, 14D-1, and 14D-3 depict a projection optics system having a last lens 1405 for projecting a plurality of light beams from an entire projector (not depicted) at a plurality of angles, the plurality of angles associated with an image having a field of view. The range of angles encompass those from light beam 1412 to light beam 1410. The projection optics system thus creates a narrowing and then widening cone of the plurality of light beams over the range of angles. Though only one range of angles is depicted, it will be appreciated that FIGS. 14D-1, 14D-2, and 14D-3 may operate upon a multi-pupil projector (as in FIG. 14C) as well, and the single pupil of FIGS. 14D-1, 14D-2, and 14D-3 is illustrated for ease of description.

Waveguides 1401 and 1403 intersect the subpupil cone at different locations. Waveguide 1401 is positioned Where the cone is widening, and waveguide 1403 is placed where the cone is narrowing. In some embodiments, a refractive lens is place between waveguides 1401 and 1403.

Incoupling elements (e.g. a diffractive gratings) are positioned on waveguides 1401 and 1403 where a major surface intersects the subpupil. In FIG. 14D-1 depicting transmissive incoupling elements, the incoupling elements are positioned on a surface of the waveguide nearer projection optics system last lens 1405. In FIG. 14D-2 depicting reflective incoupling elements, the incoupling elements are positioned on a surface of the waveguide further projection optics system last lens 1405. It will be appreciated that the size of the incoupling element may depend on which surface the incoupling element is disposed upon, and which waveguide the incoupling element is disposed on. As shown in FIG. 14D-1, incoupling element 1414 is smaller than incoupling element 1416; the opposite is true for FIG. 14D-2. Increasing or decreasing a waveguide working distance 1410 or 1412 may adjust the size of the incoupling element required to capture the range of light beams. FIG. 14D-3 illustrates an embodiment placing the incoupling element on a near or far side to increase or optimize incoupling element size for the respective waveguide. In other words, surface positions of incoupling elements of FIGS. 14D-1 and 14D-2 are not mutually exclusive and may be interchangeable.

Waveguide display systems in the art may place the waveguides as close as possible to the projector to minimize form factor and maximize total efficiency by minimizing incoupling size. By implementing high refractive index waveguides described herein, optimization of working distance may instead be associated with ideal incoupling element sizes and then further optimize a waveguide thickness and the presence of beneficial intermediate optics such as refractive or varifocal lens.

FIG. 14D-1 illustrates a first waveguide 1403 having incoupling element 1416 on a near surface of the waveguide at first working distance 1412 as measured from the incoupling element 1414 to a projection optics system last lens 1405. A second waveguide 1401 having incoupling element 1414 on a near surface of the waveguide is placed at second working distance 1410 as measured from the incoupling element 1414 to a projection optics system last lens 1405. FIGS. 14D-2 and 14D-3 illustrate similar embodiments, with variations on incoupling element surface location and corresponding changes to working distances; notably FIG. 14D-3 may use the first working distance 1412-1 and the second working distance 1410, and not necessarily unique working distances for its particular variable configuration of incoupling element surface disposition.

In some embodiments, at least one refractive lens 1420 is disposed between waveguide 1401 and 1403, the at least one refractive lens 1420 is configured to provide depth cues to light passing through it. In some embodiments, refractive lens 1420 has an optical prescription or optical power. It will be appreciated that in some implementations, the thicker lens 1420 may be, the greater the optical power it may impart, and increases to lens 1420 thickness will increase at least the second working distance as well.

In some embodiments, waveguides 1401 and 1403 (or at least their respective incoupling elements 1414 or 1414-1 and 1416 or 1416-1) are placed on either side of a subpupil transition point 1418 where the range of angles of a plurality of light beams comprising image data of a field of view transition from a narrowing cone to a widening one. In some embodiments, the waveguides (or at least their respective incoupling elements) are placed on a common side of the subpupil transition point 1418. Though FIGS. 14D-1, 14D-2, and 14D-3 illustrate the former, one of skill in the art will appreciate the applicability of the latter from the description provided herein. It is further noted that subpupil transition point 1418, or working distances as applied herein, is not necessarily co-located at the projector's optical pupil.

Benefits of the various systems, architectures and designs discussed herein, such as, for example, the embodiments illustrated in FIGS. 10, 12, 13, 14C, 14D-1 and 14D-2 include but are not limited to: high transparency, relatively small form-factor and thickness (e.g., nominal thickness for eyepiece of less than about 5 mm), reduced manufacturing cost and lower mass as compared to other 2 depth-plane architectures. Mass of a full color eyepiece comprising a single waveguide with a high refractive index material (e.g., refractive index greater than 1.79 and/or refractive index greater than 2.2) can be reduced as compared to a full color eyepiece comprising three glass waveguides due to the consolidation of three waveguides into one.

As discussed above, employing waveguides comprising high refractive index material (e.g., refractive index greater than 1.79 and/or refractive index greater than 2.2) can reduce the number of waveguides per depth plane which allows the possibility to include one or more additional depth planes. FIG. 15 illustrates an embodiment of a display system 1500 comprising an eyepiece comprising a stack 1518 including a plurality of waveguides 1520, 1522 and 1524. Each waveguide 1520, 1522 and 1524 can be associated with a corresponding depth plane. (In some other embodiments, two waveguides can be associated with each depth.) In some implementations, the gaps between the waveguides is about 0.3 mm. The waveguides may comprise substrates about 400 microns in some cases. Light comprising image information for each depth plane can be emitted from one or more output pupils of an imaging system 1501. For example, in the embodiment illustrated in FIG. 15, the imaging system 1501 can comprise three output pupils, each output pupil configured to output multi-colored image light for a corresponding depth plane. (For a similar system used to provide to depth or depth planes as opposed to three, two output pupils may be used.) In various embodiments, the waveguides in the stack 1518 can be infinity focused and can include a fixed distance multi-focal element. In particular, in some such embodiments, the stack 1518 can comprise a plurality of negative static geometric phase 1530 ("GP") lenses (e.g. a liquid crystal polarization grating) that are positioned between the depth planes and the wearer's eye 1507 to vary the focal position of the virtual image projected from the waveguides associated with the different depth planes. The stack 1518 can further comprise a positive GP lens 1526 is disposed between the external world and the wearer's eye 1507 to compensate for the optical power introduced by the negative GP lenses. Using static GP lenses can reduce the thickness and the weight of the stack 1518 as compared to using other types of variable focusing lenses. Many embodiments of GP lenses maybe polarization sensitive. Accordingly, the stack 1518 can further comprises a polarizer 1528 (e.g., a circular polarizer or a polarizer-based variable attenuator comprising, for example, one or more liquid crystal layers and polarizers) to ensure proper functioning of the display system 1500. One drawback of incorporating a polarizer in the stack 1518 is a decrease in optical throughput or brightness. For example, incorporating the polarizer in the stack 1518 can reduce the optical throughput by about 50% in some embodiments. In some embodiments, a combination of liquid crystal based variable attenuator and a polarizer can be integrated in the stack 1518.

This application contemplates variations and combinations of the display systems described above, including hybrid combinations of refractive and diffractive (GP) lenses, and imaging systems.

Figure 16:
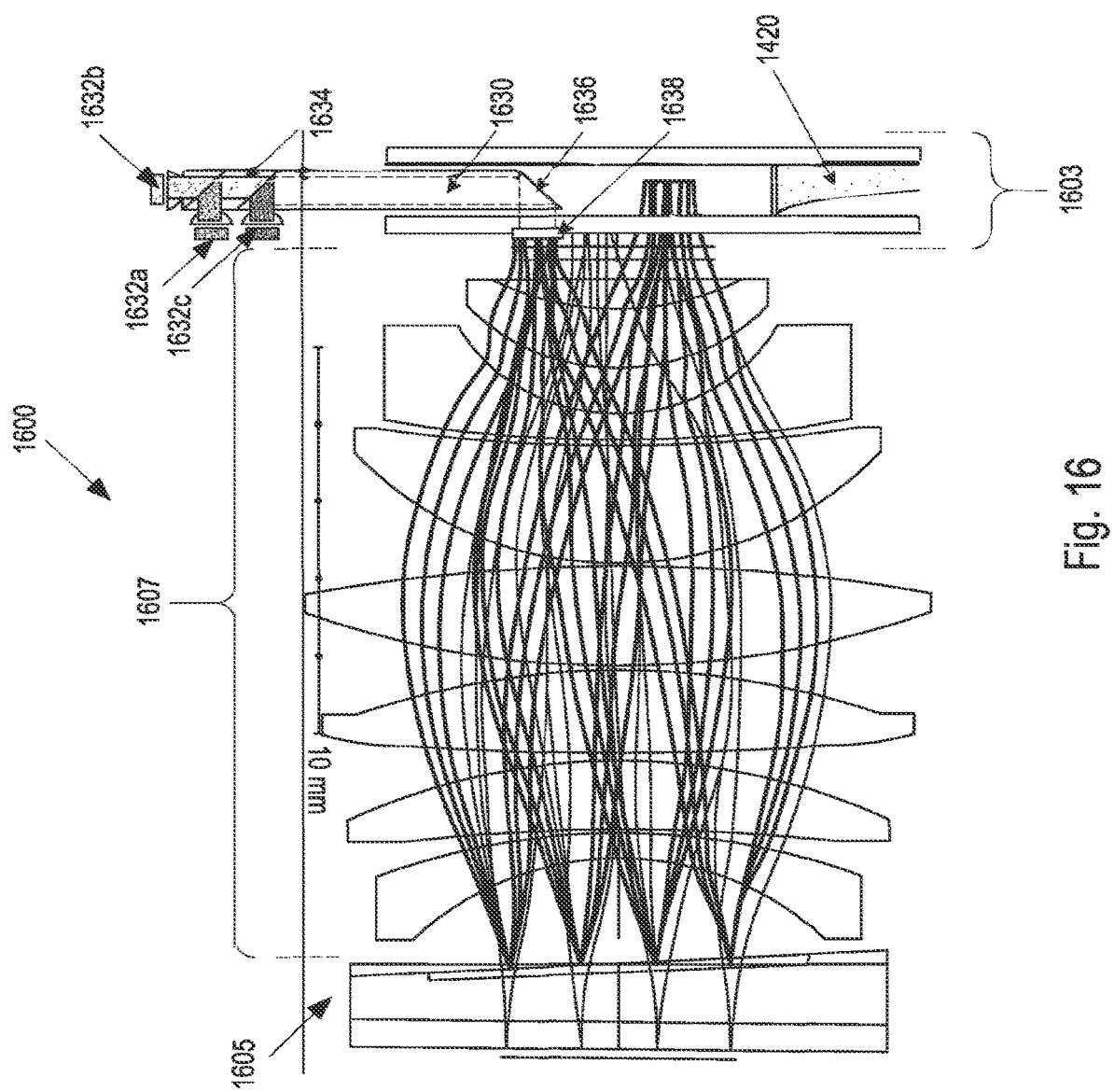
FIG. 16 illustrates an embodiment of a display system comprising an illumination pipe 1630.

In various embodiments of a front-lit imaging system, such as, for example, the imaging system 1300 illustrated in FIG. 13, an illumination pipe or light pipe can be used to provide illumination light to the modulating element 1305 of the imaging system. FIG. 16 illustrates an embodiment of a display system 1600 comprising an illumination pipe 1630. The display system 1600 comprises a stack 1603 comprising one or more waveguides, which can be integrated in eyewear or a head-mounted display. The illumination pipe 1630 may be disposed between waveguide in the stack 1603. The separation of the waveguides, which may in some designs be influenced by the thickness of one or more lens element between the waveguides, may be 1 to 1.2 mm wide in some cases. Light from an imaging system comprising a modulating element 1605 and a projection optics system 1607 is directed towards the stack 1603 and in-coupled into the waveguides using in-coupling optical elements as described herein. The display system 1600 further comprises one or more single or multi-colored individual light sources (e.g., laser or LED) 1632a-1632c. In the illustrated implementation, the individual light sources 1632a-1632c include sources of first, second and third colors such as red, green and blue light. Light from the individual light sources 1632a-1632c is combined with dichroic beam splitters 1634 to produce a white beam and injected into the illumination pipe 1630. In some embodiments, a white light source (e.g., white LED) can be used to directed white light down the illumination pipe 1630. In such embodiments, the beam combining dichroic beam splitter 1634 can be eliminated. The incident white light beam may be redirected with a light redirector or turning element 1636 (e.g., a wedge and/or mirror) to exit the pipe 1630. In some embodiments, this light is redirected in a nominally orthogonal direction with respect to illumination pipe 1630 and/or the major surfaces of the waveguides of the stack 1603 and directed through the one or more waveguides of the stack 1603 towards the modulating element 1605 via the projection optics system 1607. The light is reflected off the modulating element 1605 and modulated light streams are passed back through the projection optics 1607 and in-coupled into waveguides in the stack 1603. In some embodiments, the redirected light can be modified or modulated with conditioning optics 1638 comprising a diverging lens, or a diffractive optical element designed to produce a desired light distribution on the modulating element 1605 after propagation through the projection optics system 1607. The conditioning optics 1638 may comprise a top-hat beam profile diffractive optical element in some implementations. In some cases, the conditioning optics 1638 can efficiently tailor the distribution of the light to any arbitrary design depending on the needs of the display system 1600. The conditioning optics 1638 may be provided on one or both the major surfaces of the waveguide. In some embodiments, conditioning optics comprising diffractive optical elements can be fabricated simultaneously with the in-coupling optical elements and the out-coupling optical elements that are fabricated on the surface of the waveguide. An additional benefit of employing a light pipe illuminator configuration is that it moves the sources of light away from the waveguides, which may be sensitive to thermal fluctuation or high temperature in general.

Figure 17B:
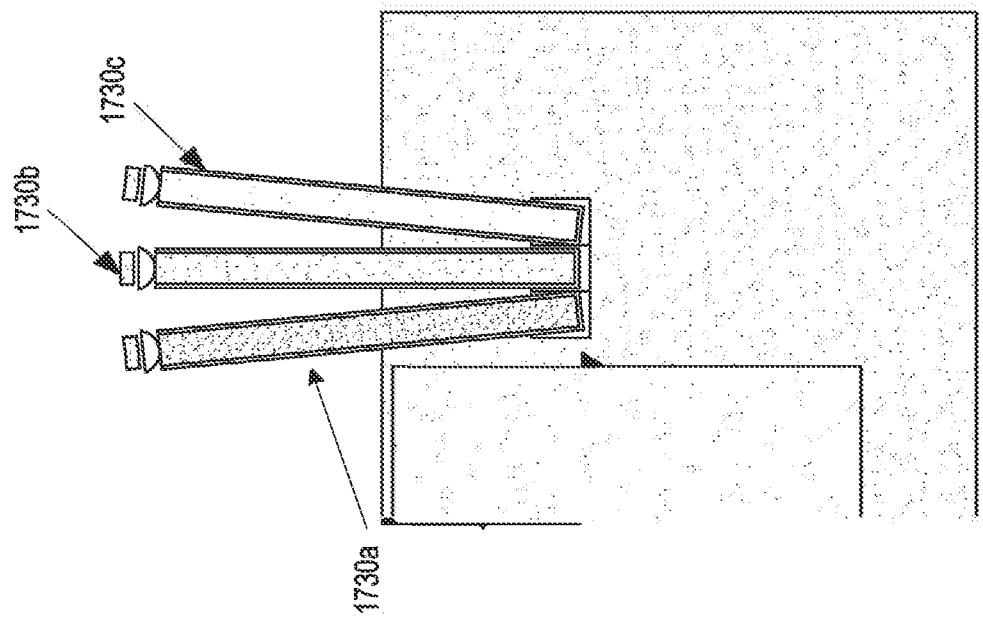
FIGS. 17A and 17B show side-view and top-views including individual illumination pipes that are configured to provide individual colored illumination to an embodiment of an imaging system.
Figure 17A:
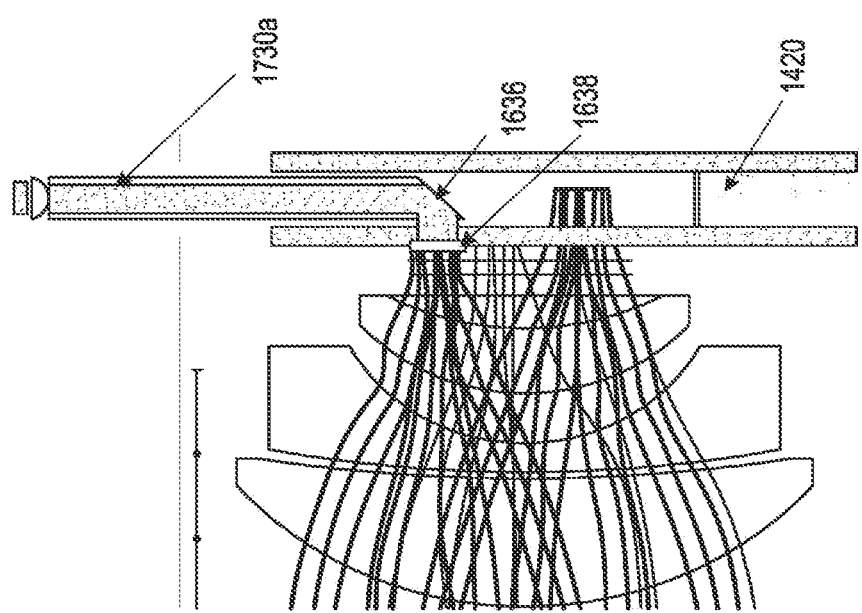

In some embodiments, separate illumination pipes may be used to provide the different colors of illumination light. FIGS. 17A and 17B show side-view and top-views of individual illumination pipes 1730a, 1730b and 1730c that are configured to provide individual colored illumination to the imaging system. In contrast to the design shown in FIG. 16, the dichroic beam splitters 1634 are not used and the light is coupled into the light pipe 1630 from the end of the light pipe in the implementation shown in FIGS. 17A and 17B. In the illustrated implementation, light pipe 1730a is configured to provide a first color (e.g., red color) illumination, light pipe 1730b is configured to provide a first color (e.g., green color) illumination, and light pipe 1730c is configured to provide a third color (e.g., blue color) illumination. Light pipes for any combination of colors could be used. In such an embodiment, separate diffractive optical elements (DOES) that are designed or optimized for each color can be used to condition the illumination light prior to being modulated. Additionally, the in-coupling gratings that receive the image light from the imaging system can also be designed or optimized for each individual color to increase in-coupling efficiency for example. In various embodiments, the waveguides may be tapered to allow closer spacing.

One Waveguide Per Depth Plane

Various embodiments of display devices described above comprise a single waveguide comprising high refractive index material (e.g., refractive index greater than or equal to about 1.79) per depth plane. A multiplexed stream of light comprising light of a first color, a second color and a third color including image information for a depth plane is in-coupled into the waveguide for that depth plane using at least one in-coupling optical element. Without any loss of generality, the first color, the second color and the third color can be selected from a group comprising red, green and blue. In some embodiments, a single in-coupling optical element can be configured to redirect (e.g., diffract) light of the first color, the second color and the third color including image information for the depth plane into the waveguide. In other embodiments, two in-coupling optical elements can be configured to redirect (e.g., diffract) light of the first color, the second color and the third color including image information for the depth plane into the waveguide, different colors or combination of colors being coupled into the waveguide by the two in-coupling optical elements. For example, in some embodiments, a first of the two in-coupling optical elements can be configured to redirect (e.g., diffract) light of the first color and the second color, and a second of the two in-coupling optical elements can be configured to redirect (e.g., diffract) light of the third color, respectively. In other embodiments, a first of the two in-coupling optical elements can be configured to redirect (e.g., diffract) light of the first color and the second color, and a second of the two in-coupling optical elements can be configured to redirect (e.g., diffract) light of the third color and light of one of the first or second colors, respectively. In some embodiments, three in-coupling optical elements, first, second, and third in-coupling optical elements, can be configured to respectively redirect (e.g., diffract) light of the first color, the second color and the third color including image information for the depth plane into the waveguide. For example, in some embodiments, a first of the three in-coupling optical elements can be configured to redirect (e.g., diffract) light of the first color, a second of the three in-coupling optical elements can be configured to redirect (e.g., diffract) light of the second color, and a third of the three in-coupling optical elements can be configured to redirect (e.g., diffract) light of the third color, respectively.

Two Waveguides Per Depth Plane

Various embodiments of display devices described above can comprise two waveguides comprising high refractive index material (e.g., refractive index greater than or equal to about 1.79) per depth plane. A multiplexed stream of light comprising light of a first color, a second color and a third color including image information for a depth plane is in-coupled into the two waveguides, a first and a second, different colors or combination of colors being coupled into the two waveguides. Without any loss of generality, the first color, the second color and the third colors can be selected from a group comprising red, green and blue. In some embodiments, a first waveguide can be configured to receive and guide therein the first color and the second color including image information for the depth plane, and the second waveguide can be configured to receive and guide therein the third color including image information for the depth plane, respectively. In other embodiments, a first waveguide can be configured to receive and guide therein the first color and the second color including image information for the depth plane, and the second waveguide can be configured to receive and guide therein the third color and one of the first or the second colors including image information for the depth plane, respectively. For example, the first waveguide can receive and guide therein red and green, and the second waveguide can receive and guide therein green and blue or red and blue, respectively.

In various implementations, a multiplexed stream of light comprising light of a first color, a second color and a third color including image information for a depth plane is in-coupled into the two waveguides using at least two in-coupling optical element. In some embodiments, a first in-coupling optical element can be configured to redirect (e.g., diffract) light of the first color and the second color including image information for the depth plane into a first waveguide, and a second in-coupling optical element can be configured to redirect (e.g., diffract) light of the third color including image information for the depth plane into a second waveguide, respectively. In some embodiments, the second in-coupling optical element can also be further configured to redirect (e.g., diffract) light of the first color or the second color into the second waveguide. In some embodiments, a first in-coupling optical element can be configured to redirect (e.g., diffract) light of the first color including image information for a depth plane into the first waveguide; and a second in-coupling optical element can be configured to redirect (e.g., diffract) light of the second color including image information for the depth plane into the first waveguide. A third in-coupling optical element can be configured to redirect (e.g., diffract) light of the third color including image information for the depth plane into the second waveguide for that depth plane. In some embodiments, the second in-coupling optical element can be further configured to redirect (e.g., diffract) light of the first color or the second color into the second waveguide. In some other embodiments, a fourth in-coupling optical element can be configured to redirect (e.g., diffract) light of the first color or the second color into the second waveguide.

Methods of Manufacturing Gratings on a High Refractive Index Waveguide

Various embodiments of display devices including a waveguide comprising high refractive index material (e.g., refractive index greater than or equal to about 1.79) contemplated in this application can comprise diffractive structures disposed on a surface of the waveguide. As discussed above, waveguides comprising high refractive index material (e.g., refractive index greater than or equal to about 1.79) with diffractive structures can be configured to in-couple multi-colored light including image information emitted from an imaging system e.g., a microdisplay or projector), distribute in-coupled light along one or more desired directions and/or out-couple the in-coupled light towards a viewer. Different methods of fabricating waveguides comprising high refractive index material (e.g., refractive index greater than or equal to about 1.79) with diffractive features are described below.

FIGS. 18A and 18B illustrate flowcharts for two different methods of fabricating diffractive gratings on the surface of a substrate (e.g., a waveguide) comprising a high refractive index material (e.g., refractive index greater than 1.79). In some implementations, the substrate can comprise lithium niobate ($LiNbO_3$) or silicon carbide (SiC). The method comprises providing a substrate of a high refractive index as shown in block 1801. The method further comprises disposing a layer of a patternable material on the surface of the substrate, as shown in block 1803. In some embodiments, patternable material can comprise a resist. In some embodiments, the patternable material can comprise a polymer. For example, the patternable layer can comprise an ultraviolet (UV) curable polymer. The patternable layer can have a refractive index less than the refractive index of the material of the substrate (e.g., refractive index less 1.79). For example, the refractive index of the patternable layer can be between about 1.2 and about 1.8. In various embodiments, the refractive index of the patternable layer can be greater than or equal to about 1.2 and less than or equal to about 1.3, greater than or equal to about 1.3 and less than or equal to about 1.4, greater than or equal to about 1.4 and less than or equal to about 1.5, greater than or equal to about 1.5 and less than or equal to about 1.6, greater than or equal to about 1.6 and less than or equal to about 1.7, greater than or equal to about 1.7 and less than or equal to about 1.79 or any range/sub-range between any of these values. In various embodiments, the patternable layer can have a thickness between about 10 nm and about 1000 nm.

The patternable layer can be disposed over the surface of the substrate using jet deposition technology (e.g., ink-jet deposition). As discussed above, certain high refractive index materials, such as, for example, Lithium Niobate ($LiNbO_3$) can be piezoelectric, ferroelectric and/or pyroelectric and can develop substantial surface charge as they are prepared for deposition of the patternable material. It may not be practical to dispose the patternable material using jet deposition technology over a charged surface of the substrate. Accordingly, in some embodiments, the charged surface of the substrate comprising a high refractive index material can be discharged prior to disposing the patternable material using jet deposition technology.

The patternable layer can be patterned with a desired (e.g., grating or diffractive optical element) pattern, as shown in block 1805. The patterned layer can be used as an etch mask to etch the surface of the substrate comprising high refractive index material (e.g., refractive index greater than or equal to about 1.79) to fabricate diffractive structures on the surface of the substrate, as shown in block 1807.

In some embodiments, the patterned layer can be retained on the surface of the substrate comprising high refractive index material (e.g., refractive index greater than or equal to about 1.79). In such embodiments, the patterned layer can be configured to function as a diffractive optical element. Accordingly, the patterned layer can be configured as a functional layer.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. M for other details of the present invention, these may be appreciated in connection with the above-referenced patents and publications as well as generally known or appreciated by those with skill in the art. The same may hold true with respect to method-based aspects of the invention in terms of additional acts as commonly or logically employed. In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

Various examples of devices (e.g., optical devices, display devices, illuminators, integrated optical devices, etc.) and systems (e.g., illumination systems) have been provided. Any of these devices and/or systems may be included in a head mounted display system to couple light (e.g., with one or more in-coupling optical elements) into a waveguide and/or eyepiece to form images. In addition, the devices and/or systems may be relatively small (e.g., less than 1 cm) such that one or more of the devices and/or systems may be included in a head mounted display system. For example, the devices and/or systems may be small with respect to the eyepiece (e.g., less than a third of the length and/or width of the eyepiece).

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially exampled as such, one or more features from an example combination may in some cases be excised from the combination, and the exampled combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended examples are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations.

Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following examples. In some cases, the actions recited in the examples may be performed in a different order and still achieve desirable results.

Accordingly, the disclosure are not intended to be limited to the embodiments shown herein, but are to be accorded the widest scope consistent with this disclosure, the principles and the novel features disclosed herein.

What is claimed:

1. A display system comprising:
    an image projection device configured to emit a multiplexed light stream comprising a first light stream of a first color, a second light stream of a second color and a third light stream of a third color, said first, second, and third colors being different, said first, second, and third light streams comprising image content;
    a waveguide comprising a material having a refractive index greater than 1.79, said waveguide configured to receive the multiplexed light stream emitted from the image projection device such that the first light stream, the second light stream and the third light stream are guided within the waveguide by multiple total internal reflections; and
    at least one vari-focal optical element disposed to receive the multiplexed light stream output from the waveguide such that at least of portion of said multiplexed light stream is directed to a user's eye, said vari-focal optical element configured to vary the depth from which light from the waveguide appears to originate.

2. The display system of claim 1, wherein the waveguide comprises a material having a refractive index greater than or equal to 2.2.

3. The display system of claim 1, wherein the waveguide comprises a material having a refractive index greater than or equal to 2.3.

4. The display system of claim 1, wherein the waveguide comprises Lithium Niobate.

5. The display system of claim 1, wherein the waveguide has a field of view greater than about 30 degrees in a horizontal direction and greater than about 24 degrees in the vertical direction.

6. The display system of claim 5, wherein the field of view of the waveguide is about 45 degrees in the horizontal direction and about 56 degrees in the vertical direction.

7. The display system of claim 1, wherein the multiplexed light stream comprises a first multiplexed light stream comprising image information associated with a first depth plane.

8. The display system of claim 7, wherein said waveguide comprises a first waveguide associated with the first depth plane, wherein light emitted from the first waveguide is configured to direct said first multiplexed light stream to a viewer to produce an image appearing to originate from the first depth plane.

9. The display system of claim 7, wherein the image projection device is further configured to output a second multiplexed light stream comprising image information associated with a second depth plane, the second multiplexed light stream comprising a plurality of light streams having the first color, the second color and the third color, said first, second, and third colors being different.

10. The display system of claim 9, further comprising:
    a second waveguide associated with the second depth plane, the second waveguide comprising a material having refractive index greater than 1.79, the second waveguide configured to receive the second multiplexed light stream emitted from the image projection device such that the plurality of light streams associated with the second multiplexed light stream are guided through the second waveguide by multiple total internal reflections.

11. The display system of claim 10, wherein light emitted from the second waveguide is configured to direct said second multiplexed light stream to a viewer to produce an image appearing to originate from the first depth plane.

12. The display system of claim 10, wherein the second waveguide is included in an eyepiece of a head mounted display.

13. The display system of claim 8, wherein the first waveguide is included in an eyepiece of a head mounted display.

14. The display system of claim 1, wherein the waveguide is included in an eyepiece of a head mounted display.

15. The display system of claim 1, further comprising an in-coupling optical element configured to receive the multiplexed light stream emitted from the image projection device and in-couple each of the first light stream, the second light stream and the third light stream into the waveguide to be guided therein by multiple total internal reflections.

16. The display system of claim 1, wherein the image projection device comprises a light modulating device.

17. A display system comprising:
    an image projection device configured to emit a multiplexed light stream comprising a first light stream of a first color, a second light stream of a second color; and a third light stream of a third color, said first, second, and third colors being different, said first, second, and third light streams comprising image content; and
    first and second waveguides comprising material having a refractive index greater than 2.2,
    wherein the first waveguide is configured to receive the first color and the second color, and the second waveguide is configured to receive the third color, different colors or combination of colors being coupled into the two waveguides, such that the first and second light streams are guided within the first waveguide by multiple total internal reflections and the third light stream is guided within the second waveguide by multiple total internal reflections, and
    wherein a separation distance between the first waveguide and the second waveguide is less than or equal to 1.5 mm and greater than or equal to 0.3 mm.

18. The display system of claim 17, comprising:
    at least one vari-focal optical element disposed between the first waveguide and the second waveguide.

19. The display system of claim 17, wherein the separation distance between the first waveguide and the second waveguide is between 1.0 mm and 1.5 mm.

20. The display system of claim 17, wherein each of the first waveguide and second waveguide has a thickness of between 300 and 400 microns.

21. The display system of claim 17, comprising at least one or both of a positive static geometric phase lens and a negative static geometric phase lens positioned between the external world and a user's eye.

22. The display system of claim 21, comprising a positive static geometric phase lens or a negative static geometric phase lens positioned between the first waveguide and the second waveguide.

\* \* \* \* \*